US008393732B2

(12) United States Patent
Yamakaji

(10) Patent No.: US 8,393,732 B2
(45) Date of Patent: Mar. 12, 2013

(54) SPECTACLE LENS EVALUATING METHOD, SPECTACLE LENS DESIGNING METHOD USING SAME, SPECTACLE LENS MANUFACTURING METHOD, SPECTACLE LENS MANUFACTURING SYSTEM, AND SPECTACLE LENS

(75) Inventor: Tetsuma Yamakaji, Tokyo (JP)

(73) Assignee: Hoya Corporation, Tokyo (JP)

( * ) Notice: Subject to any disclaimer, the term of this patent is extended or adjusted under 35 U.S.C. 154(b) by 602 days.

(21) Appl. No.: 12/673,368

(22) PCT Filed: Oct. 30, 2008

(86) PCT No.: PCT/JP2008/069792
§ 371 (c)(1),
(2), (4) Date: Feb. 12, 2010

(87) PCT Pub. No.: WO2009/057709
PCT Pub. Date: May 7, 2009

(65) Prior Publication Data
US 2011/0202421 A1    Aug. 18, 2011

(51) Int. Cl.
*G02C 7/04*    (2006.01)
(52) U.S. Cl. .......... 351/159.01; 351/159.75; 351/159.73
(58) Field of Classification Search .............. 351/159.01, 351/159.41–159.49, 159.73–159.76
See application file for complete search history.

(56) References Cited

U.S. PATENT DOCUMENTS

| 6,012,813 | A | 1/2000 | Qi |
| 6,712,467 | B1 | 3/2004 | Kitani |
| 2002/0140899 | A1 | 10/2002 | Blum et al. |
| 2003/0107702 | A1 | 6/2003 | Yamakaji |
| 2003/0151721 | A1 | 8/2003 | Lai et al. |
| 2004/0179168 | A1 | 9/2004 | Yamakaji |
| 2004/0239875 | A1 | 12/2004 | Yamakaji |
| 2005/0030477 | A1 | 2/2005 | Lai et al. |
| 2005/0041205 | A1 | 2/2005 | Yamakaji |
| 2005/0073648 | A1 | 4/2005 | Toshima et al. |
| 2005/0083485 | A1 | 4/2005 | Toshima et al. |
| 2005/0174535 | A1 | 8/2005 | Lai et al. |
| 2006/0023162 | A1 | 2/2006 | Azar et al. |
| 2006/0176449 | A1 | 8/2006 | Azar et al. |
| 2007/0109498 | A1 | 5/2007 | Lai et al. |
| 2011/0194067 | A1 | 8/2011 | Yamakaji |

FOREIGN PATENT DOCUMENTS

| CN | 1347514 A | 5/2002 |
| CN | 1511270 A | 7/2004 |
| CN | 101842683 A | 9/2010 |

(Continued)

OTHER PUBLICATIONS

U.S. Appl. No. 13/466,776, filed May 8, 2012, Yamakaji.

(Continued)

*Primary Examiner* — Darryl J Collins
(74) *Attorney, Agent, or Firm* — Oblon, Spivak, McClelland, Maier & Neustadt, L.L.P.

(57) ABSTRACT

More appropriate evaluation, design, and manufacture are made feasible by taking visual performances into consideration more appropriately. In order to achieve this object, in the present invention, spectacle lenses are evaluated using a visual acuity function including a factor representing physiological astigma. The physiological astigma herein means astigma in the phenomenon that an improved visual acuity is yielded when slight astigma is present in the region where the accommodation power is lower than the region indicating the range of positive relative accommodation power in which the accommodation power increases among the relative accommodation power as adaptable accommodation power in a state that convergence does not change.

20 Claims, 44 Drawing Sheets

FOREIGN PATENT DOCUMENTS

| | | |
|---|---|---|
| JP | 11 72754 | 3/1999 |
| JP | 2000 111846 | 4/2000 |
| JP | 2000 186978 | 7/2000 |
| JP | 2001 209012 | 8/2001 |
| JP | 2003 504665 | 2/2003 |
| JP | 2004 102248 | 4/2004 |
| JP | 2005 516717 | 6/2005 |
| WO | 00 62116 | 10/2000 |
| WO | 02 088828 | 11/2002 |
| WO | 03 057021 | 7/2003 |
| WO | 03 057038 | 7/2003 |
| WO | 2004 018988 | 3/2004 |
| WO | 2006 014624 | 2/2006 |

OTHER PUBLICATIONS

U.S. Appl. No. 12/673,252, filed Feb. 12, 2010, Yamakaji.

PETERS DIAGRAM (RELATION BETWEEN REFRACTIVE ERROR AND VISUAL ACUITY (FRACTIONAL VISUAL ACUITY) : AT AGES 25 TO 35)

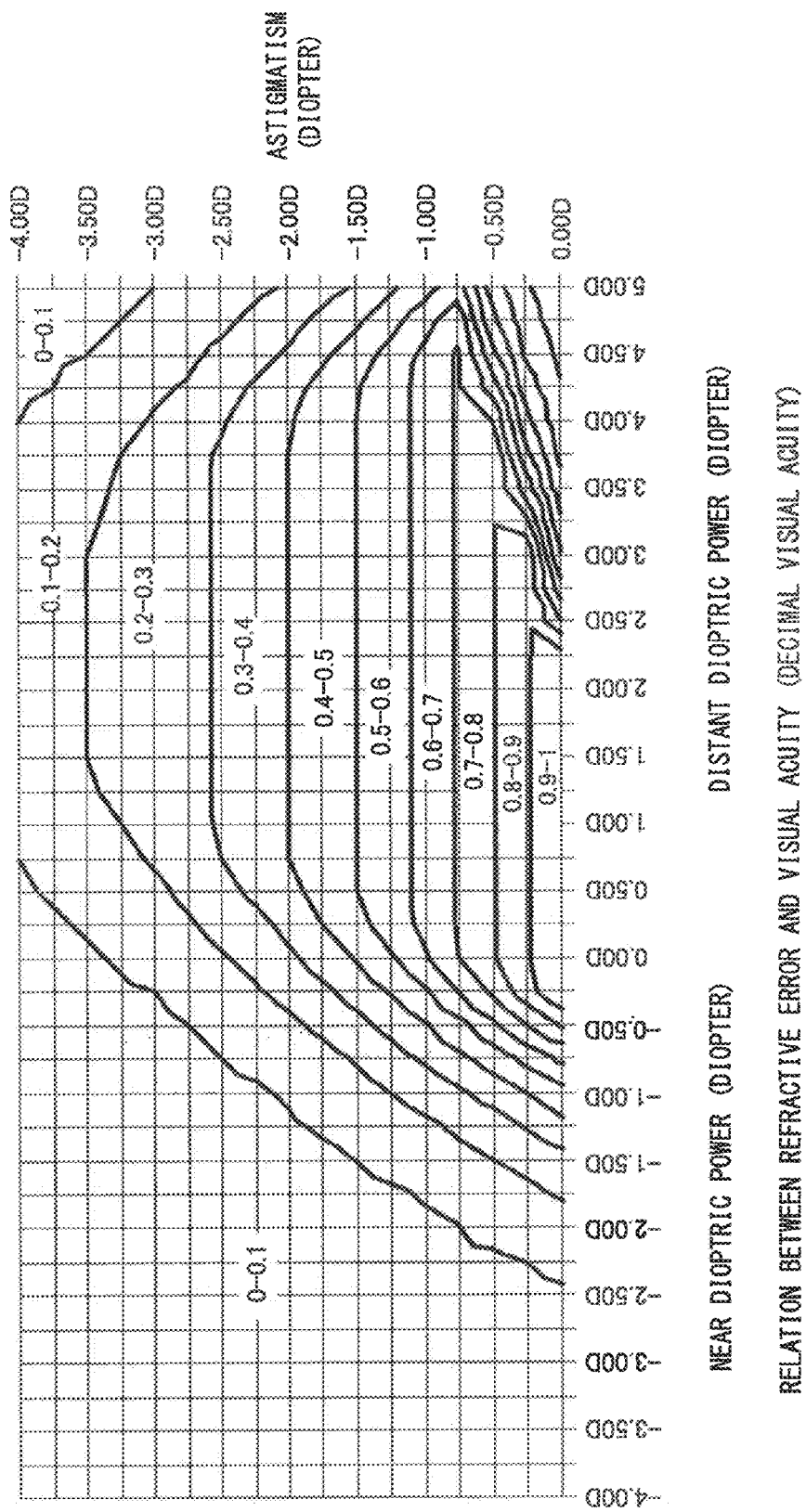
FIG. 4
RELATION BETWEEN REFRACTIVE ERROR AND VISUAL ACUITY (DECIMAL VISUAL ACUITY)

RELATION BETWEEN REFRACTIVE ERROR AND VISUAL ACUITY

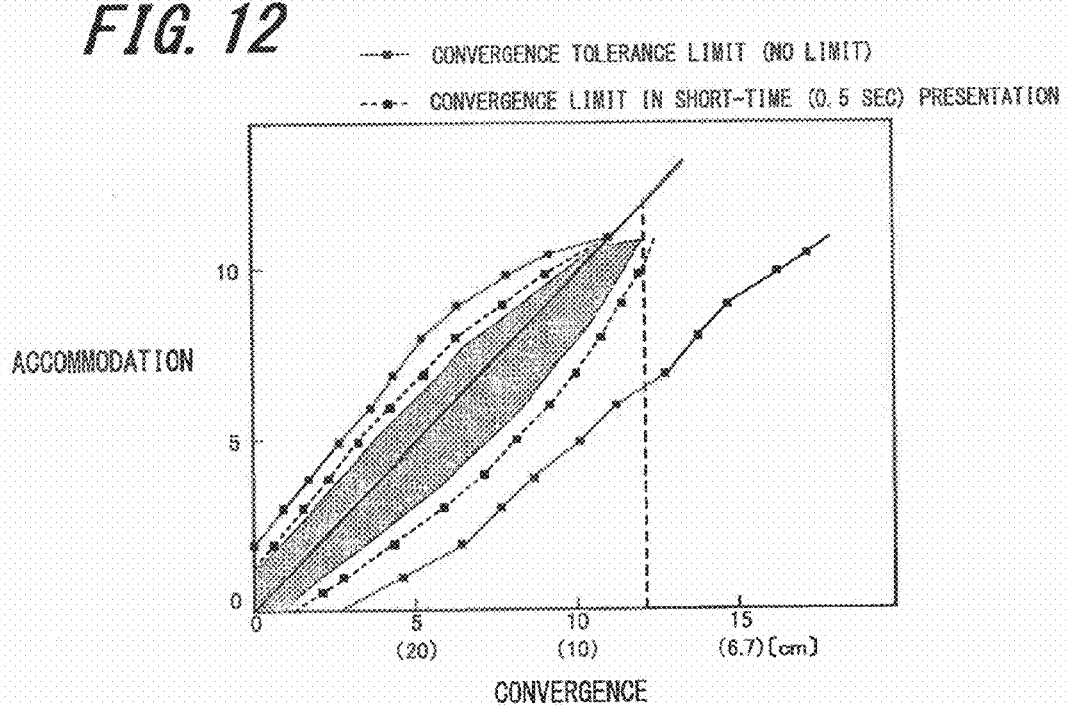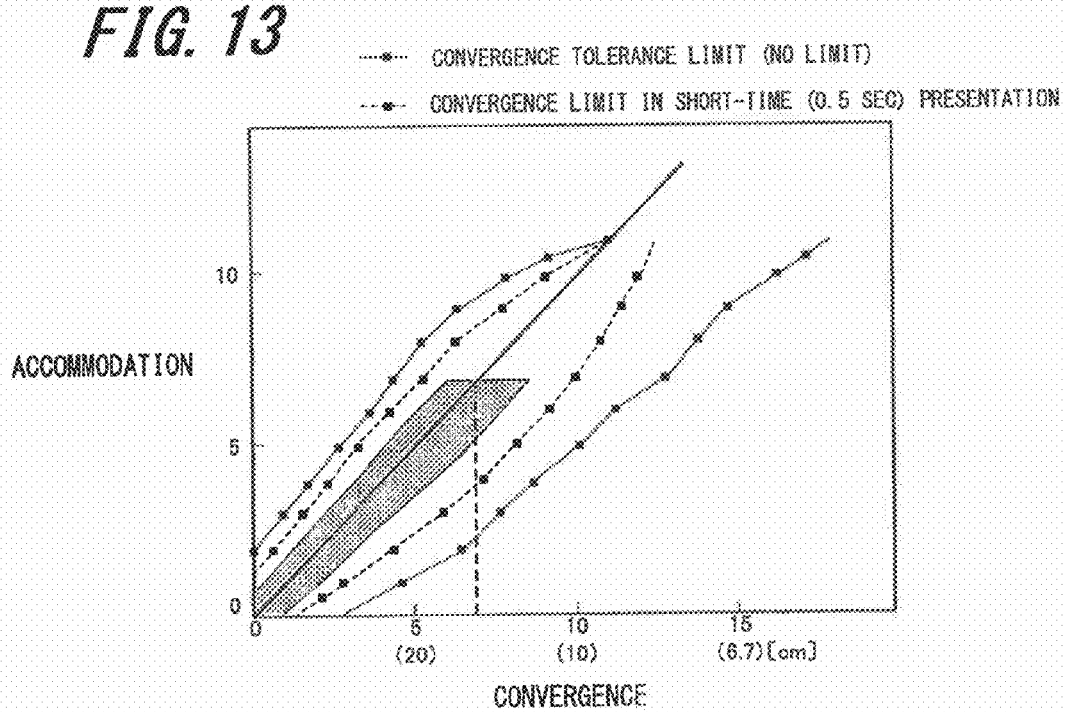

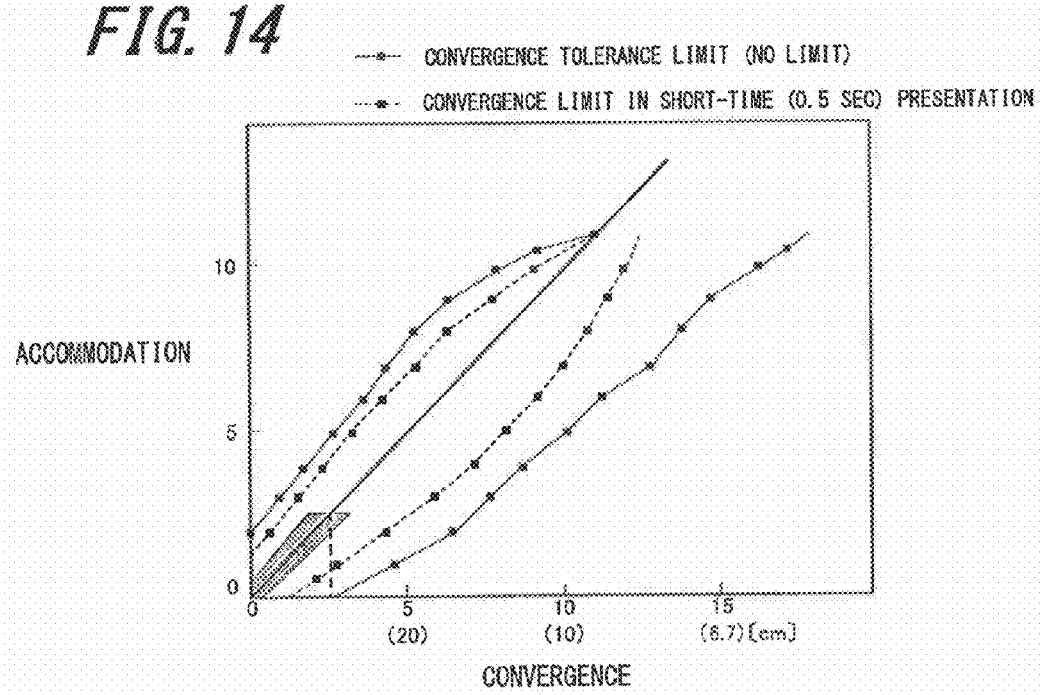
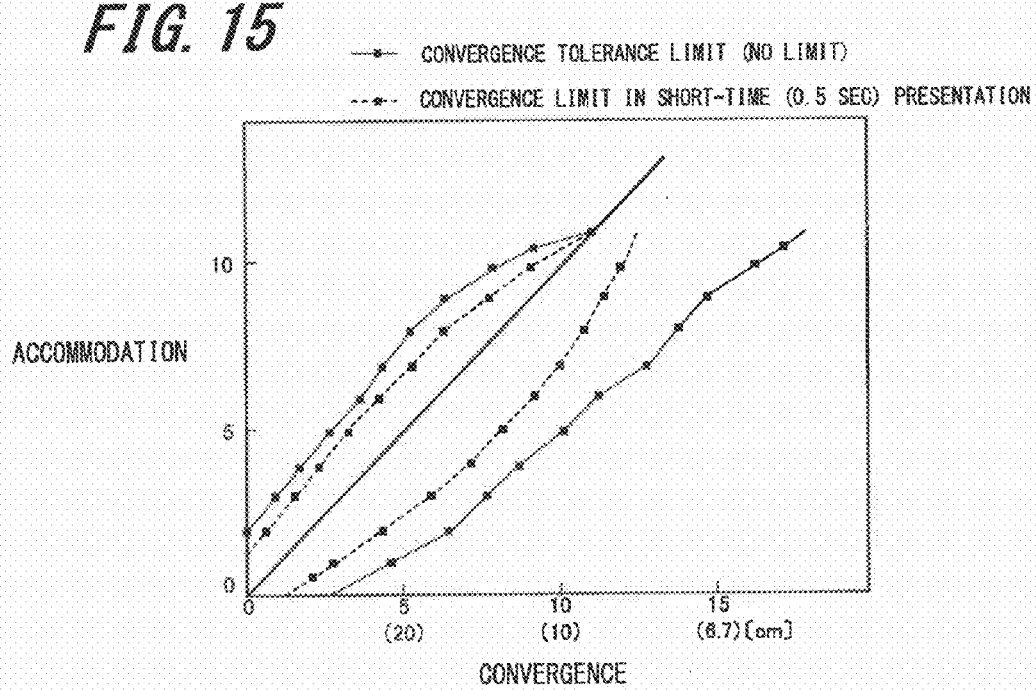

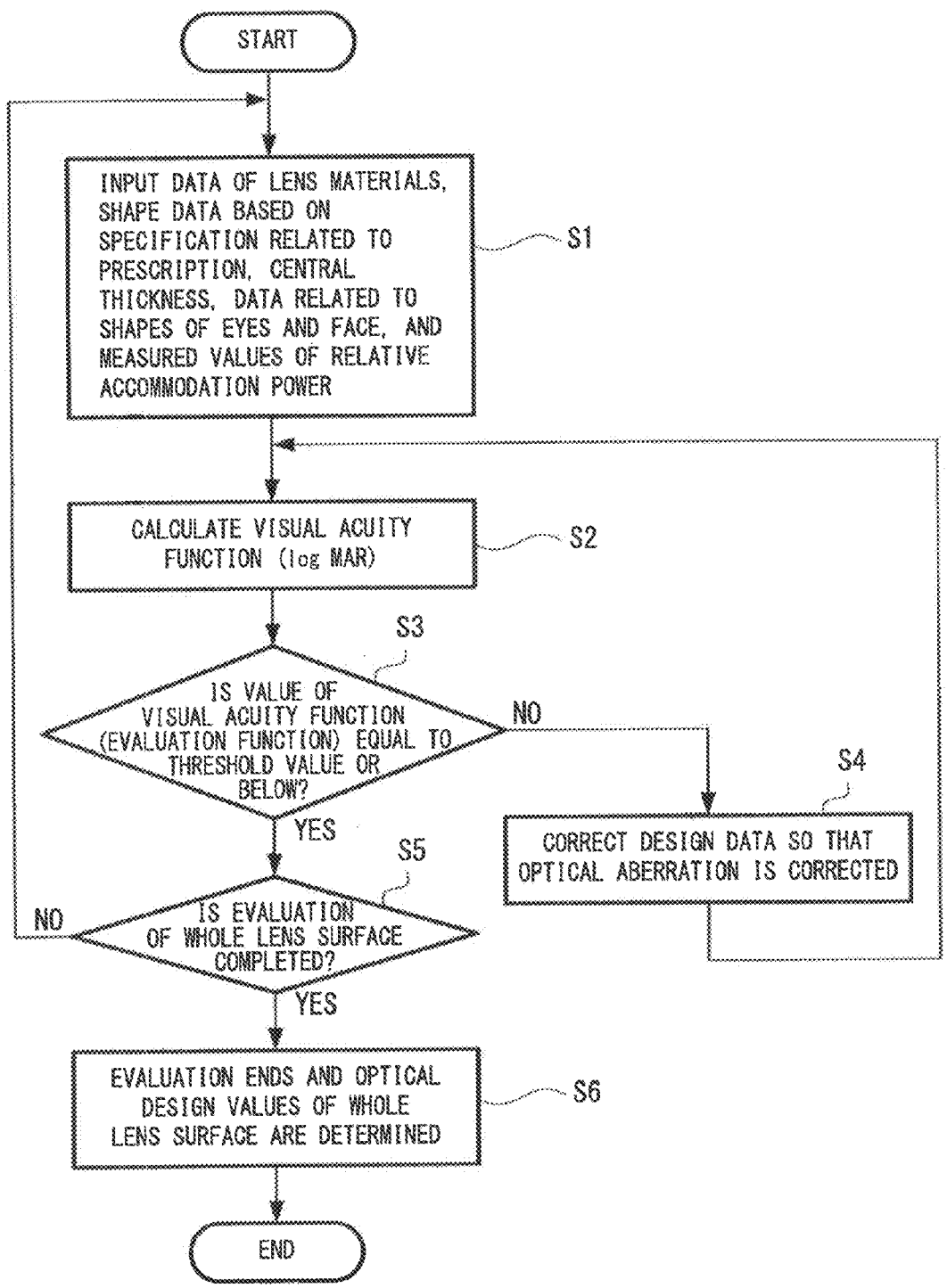

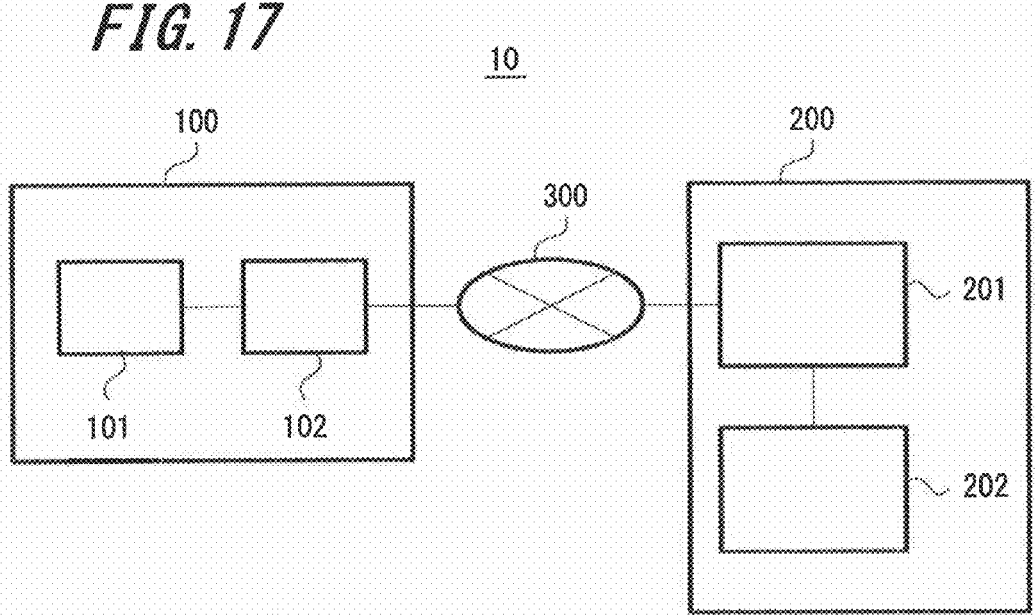
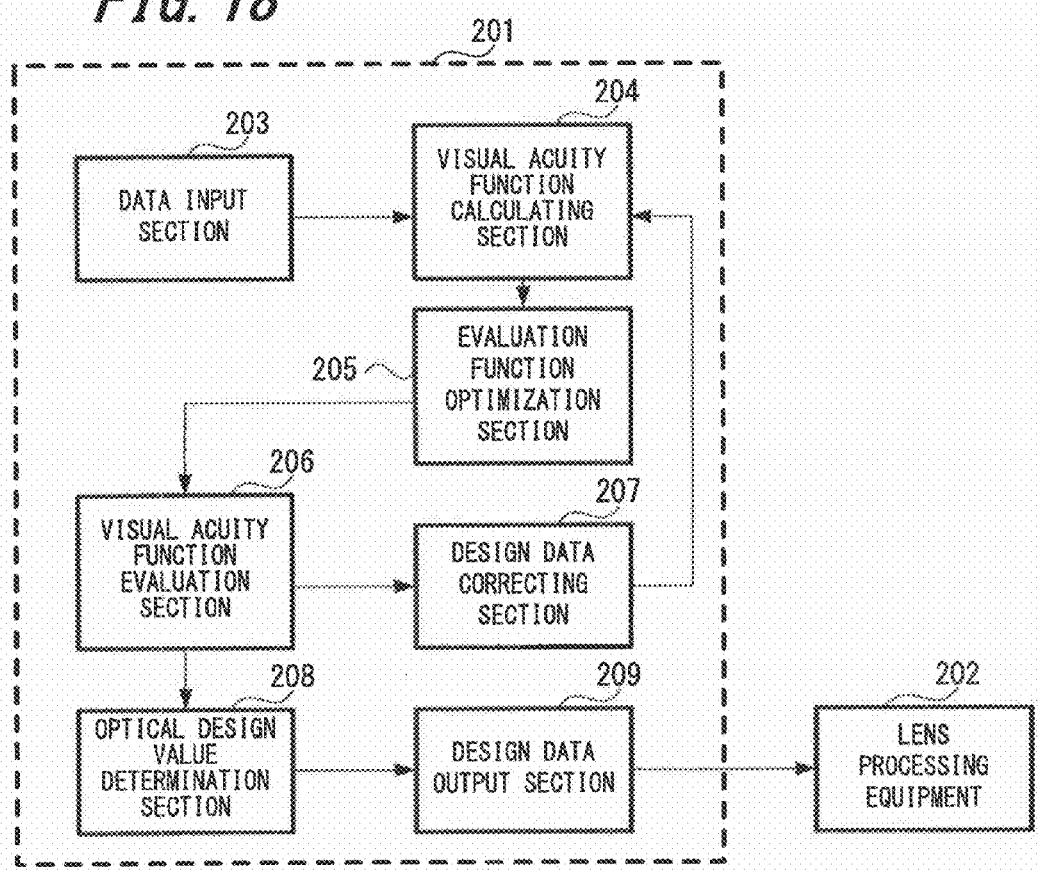

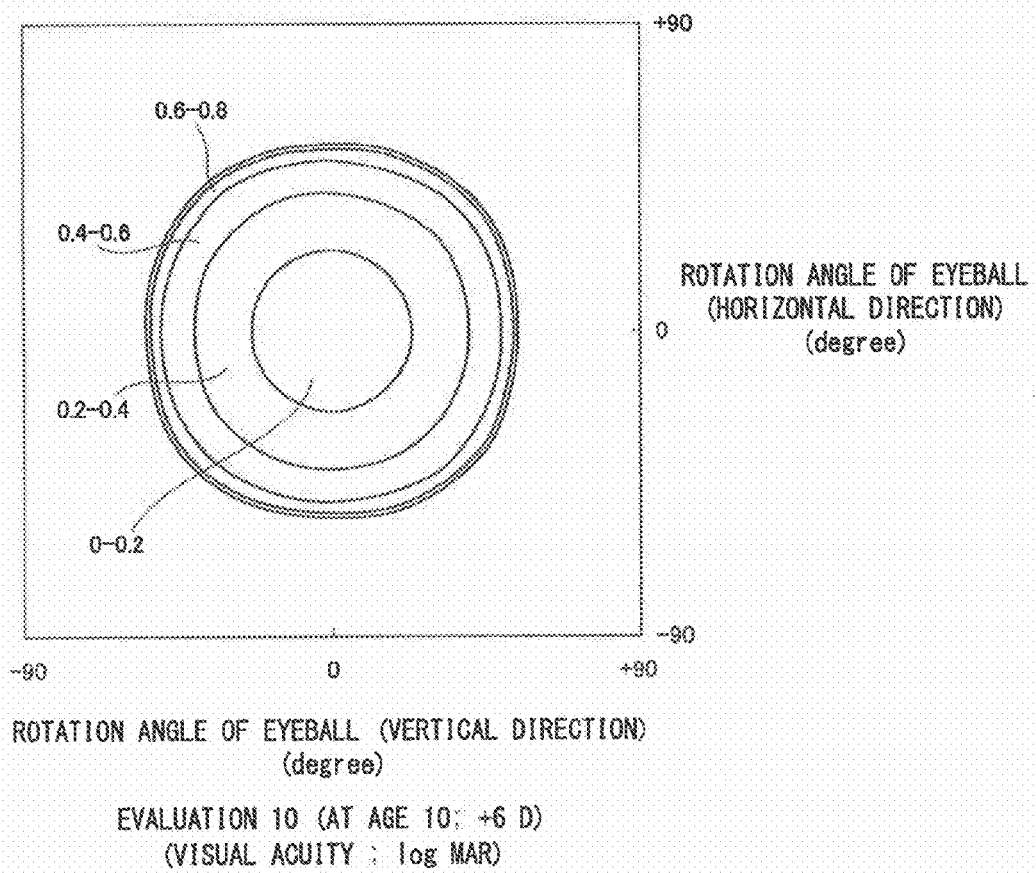

EVALUATION 30 (AT AGE 30; +6 D)
(VISUAL ACUITY : log MAR)

EVALUATION 50 (AT AGE 50; +6 D)
(VISUAL ACUITY : log MAR)

DESIGN 30 (AT AGE 30; +6 D)
(VISUAL ACUITY : log MAR)

NEAR VISION DESIGN 10 (AT AGE 10; +6 D)
(VISUAL ACUITY : log MAR)

NEAR VISION DESIGN 75 (AT AGE 75: +6 D)
(VISUAL ACUITY : log MAR)

EVALUATION PROGRESSIVE DISTANT VISION 50 (AT AGE 50; FOR DISTANT VISION)
(VISUAL ACUITY : log MAR)

EVALUATION PROGRESSIVE DISTANT VISION 75 (AT AGE 75; FOR DISTANT VISION)
(VISUAL ACUITY : log MAR)

EVALUATION PROGRESSIVE NEAR VISION 10 (AT AGE 10: FOR NEAR VISION)
(VISUAL ACUITY : log MAR)

EVALUATION PROGRESSIVE NEAR VISION 50 (AT AGE 50: FOR NEAR VISION)
(VISUAL ACUITY : log MAR)

EVALUATION PROGRESSIVE NEAR VISION 75 (AT AGE 75; FOR NEAR VISION)
(VISUAL ACUITY ; log MAR)

FIG. 42

| CONVENTIONAL VISUAL ACUITY FUNCTION | |
|---|---|
| ASPHERIC COEFFICIENT | |
| AS1[2] | 0.009510126 |
| AS1[4] | -4.85701E-07 |
| AS1[5] | 7.43844E-11 |
| AS1[6] | 7.56645E-12 |
| AS1[7] | 5.06647E-14 |
| AS2_S[2] | 0.000747384 |
| AS2_S[4] | 1.43733E-07 |
| AS2_S[5] | -2.0755E-09 |
| AS2_S[6] | -1.61205E-11 |
| AS2_S[7] | -8.23652E-14 |
| AS2_H[2] | 0.000747384 |
| AS2_H[4] | 1.43733E-07 |
| AS2_H[5] | -2.0755E-09 |
| AS2_H[6] | -1.61205E-11 |
| AS2_H[7] | -8.23652E-14 |
| AS2_C[2] | 0.000747384 |
| AS2_C[4] | 1.43733E-07 |
| AS2_C[5] | -2.0755E-09 |
| AS2_C[6] | -1.61205E-11 |
| AS2_C[7] | -8.23652E-14 |

FIG. 43

| AT AGE 10 WITHOUT PHYSIOLOGICAL ASTIGMA | |
|---|---|
| ASPHERIC COEFFICIENT | |
| AS1[2] | 0.009517313 |
| AS1[4] | -7.25421E-07 |
| AS1[5] | 7.49825E-10 |
| AS1[6] | 1.34372E-11 |
| AS1[7] | 7.59613E-14 |
| AS2_S[2] | 0.000747384 |
| AS2_S[4] | 1.35276E-07 |
| AS2_S[5] | -3.6043E-09 |
| AS2_S[6] | -2.38422E-11 |
| AS2_S[7] | -1.08763E-13 |
| AS2_H[2] | 0.000747384 |
| AS2_H[4] | 1.35276E-07 |
| AS2_H[5] | -3.6043E-09 |
| AS2_H[6] | -2.38422E-11 |
| AS2_H[7] | -1.08763E-13 |
| AS2_C[2] | 0.000747384 |
| AS2_C[4] | 1.35276E-07 |
| AS2_C[5] | -3.6043E-09 |
| AS2_C[6] | -2.38422E-11 |
| AS2_C[7] | -1.08763E-13 |

FIG. 44

| AT AGE 10 WITH PHYSIOLOGICAL ASTIGMA | |
|---|---|
| ASPHERIC COEFFICIENT | |
| AS1[2] | 0.009517165 |
| AS1[5] | 9.32021E-10 |
| AS1[6] | 1.37331E-11 |
| AS1[7] | 6.40997E-14 |
| AS2_S[2] | 0.000747384 |
| AS2_S[4] | 1.14803E-07 |
| AS2_S[5] | -3.44287E-09 |
| AS2_S[6] | -1.88407E-11 |
| AS2_S[7] | -5.92776E-14 |
| AS2_H[2] | 0.000747384 |
| AS2_H[4] | 1.14803E-07 |
| AS2_H[5] | -3.44287E-09 |
| AS2_H[6] | -1.88407E-11 |
| AS2_H[7] | -5.92776E-14 |
| AS2_C[2] | 0.000747384 |
| AS2_C[4] | 1.14803E-07 |
| AS2_C[5] | -3.44287E-09 |
| AS2_C[6] | -1.88407E-11 |
| AS2_C[7] | -5.92776E-14 |

SPECTACLE LENS EVALUATING METHOD, SPECTACLE LENS DESIGNING METHOD USING SAME, SPECTACLE LENS MANUFACTURING METHOD, SPECTACLE LENS MANUFACTURING SYSTEM, AND SPECTACLE LENS

TECHNICAL FIELD

The invention relates to a spectacle lens evaluation method used in evaluating the performances of spectacle lenses in designing and manufacturing spectacle lenses, and a spectacle lens design method, a spectacle lens manufacturing method, a spectacle lens manufacturing system, and spectacle lenses, using the evaluation method.

BACKGROUND ART

In the past, in both of individualized spectacle lenses custom-made (also called "order-made") for respective individual spectacles wearers and ordinary (general-purpose) spectacle lenses as ready-made products, generally, optical performances thereof have been obtained as follows. That is, after assuming an optical system that is defined by the three-dimensional shape, spectacle wearing parameters, prescription dioptric power of a spectacle lens, the object surface having a prescription distance for distinct vision, etc., in the optical system, the locus of light rays or light fluxes emitted from the object surface and passing through the spectacle lens is traced by a well-known optical calculation method and so forth, and based on how close the obtained locus is to a desirable locus and so forth, the performances of the lens are obtained. In addition, designing of a spectacle lens has been such as to carry out designing to seek a lens having the performances that is close to target performance while performing performance evaluations (see Patent Document 1).

For example, Patent Document 2 describes that spectacle lens design using high-precision optical calculation is carried out based on wave surface optics, and the optical performances thereof are mentioned and monitoring results are described qualitatively. In addition, the progressive-power lens as a spectacle lens has addition power corresponding to individual accommodation power as the prescription dioptric power, and the design corresponding to the addition power is carried out, so that the progressive-power lens can be considered as a type of the individualized spectacle lens. Patent Document 3 describes that progressive-power lenses are evaluated by monitors test-wearing the progressive-power lenses, while changing the cylindrical dioptric power and astigmatism value, and that the design is carried out based on the evaluation results.

[Patent Document 1] Official gazette of Japanese Unexamined Patent Application Publication No. 2000-186978
[Patent Document 2] Ibid. No. 2000-111846
[Patent Document 3] Ibid. No. 2001-209012

DISCLOSURE OF INVENTION

The above-mentioned conventional methods for evaluating and designing spectacle lenses are the ones based primarily on optical performances that are determined by the three-dimensional shapes of lens surfaces of spectacle lenses and so forth, and it cannot be said that the relationship with visual functions other than the visual acuity of a person wearing spectacle lenses has been appropriately used as a factor for the evaluation. That is, as the relationship with human visual functions, only the correlation between optical performances and results of evaluations by monitors test-wearing spectacle lenses has been questioned. And, the conventional methods have been mostly such methods that rate spectacle lenses, based on the correlation, as excellent ones when the results of monitor's evaluations are also satisfactory in correspondence to optical performances.

It is an object of the present invention to provide a spectacle lens evaluation method, a spectacle lens design method, a spectacle lens manufacturing method, a spectacle lens manufacturing system, and spectacle lenses, that enable, when evaluation, design, and manufacture of spectacle lenses are carried out, more appropriate ways of evaluating, designing, and manufacturing spectacle lenses by including visual functions other than visual acuity that are noticed for the first time by the present inventor as the parameters for evaluation and thereby appropriately utilizing the relationship between optical performances and visual functions of a person wearing spectacle lenses as the evaluation factor.

In order to solve the above-mentioned problems, the spectacle lens evaluation method according to the present invention evaluates spectacle lenses using a visual acuity function including a factor representing physiological astigma.

It is noted herein that the physiological astigma refers to the astigma in the phenomenon that visual acuity is improved when slight astigma is present in the region where the accommodation power is lower than the region indicating the range of positive relative accommodation power increasing in the accommodation power among relative accommodation power as accommodation power that is capable in the state that convergence does not change.

In addition, it is preferable that the spectacle lens evaluation method according to the present invention is such as that the visual acuity function includes relative accommodation power as a factor, and the factor representing relative accommodation power further includes a factor representing the above-described physiological astigma.

Note that the relative accommodation power refers to the range expressed in terms of diopter in which distinct vision is achieved while maintaining the convergence of a gaze point.

The spectacle lens design method according to the present invention includes the step of carrying out optimization calculation using, as an evaluation function, the visual acuity function including a factor representing physiological astigma.

The spectacle lens manufacturing method according to the present invention includes the process of carrying out optimization calculation using, as an evaluation function, the visual acuity function including a factor representing physiological astigma and manufacturing spectacle lenses based on optical design values obtained by the optimization calculation.

The spectacle lens manufacturing system according to the present invention is a spectacle lens manufacturing system in which an ordering party side computer, provided on a spectacle lens ordering party side and having a function of performing processing necessary for placing an order of an spectacle lens, and a manufacture side computer, having a function of receiving information from the ordering party side computer and performing processing necessary for receiving the order of the spectacle lens, are interconnected through a network.

The ordering party side computer transmits information necessary for designing the spectacle lens including a factor representing physiological astigma to the manufacture side computer.

The manufacture side computer is configured to include;

a data input section configured to input data including a factor representing physiological astigma transmitted from the ordering party side computer, a visual acuity function calculating section configured to calculate, based on the inputted data, optical performance values with respect to a plurality of evaluation points on the spectacle lens, as a visual acuity function, an evaluation function optimization section configured to optimize the optical performance values by using the visual acuity function calculated by the visual acuity function calculating section as an evaluation function, a visual acuity function evaluation section configured to compare the visual acuity function with a predetermined threshold value to thereby evaluate the optical performance values, a design data correcting section configured to correct design data of the spectacle lens when the value of the visual acuity function does not reach predetermined visual acuity as the result of an evaluation performed by the visual acuity function evaluation section, an optical design value determination section configured to determine design data from the result of completing the evaluation by the visual acuity function evaluation section with respect to each of the plurality of evaluation points on the spectacle lens, and a design data output section configured to supply final design data determined by the optical design value determination section to a device for processing the spectacle lens.

Furthermore, a spectacle lens according to the present invention is configured to be formed based on optical design values obtained by carrying out optimization calculation using, as an evaluation function, the visual acuity function including a factor representing physiological astigma.

According to the investigation by the present inventor, it was found that the evaluation and design of spectacle lenses in the past had not taken the accommodation power of a patient, especially the relative accommodation power, into consideration, and that the evaluation and design of spectacle lenses had been carried out after all by assuming no relative accommodation power on the side of the patient. However, the ordinary patient has accommodation power and relative accommodation power, so that the conventional ways of evaluation and design are not necessarily the most appropriate ones. It has become clear that in evaluating and designing spectacle lenses, more suitable evaluation and design can be feasible by utilizing a visual acuity function that includes a factor representing physiological astigma, preferably that includes relative accommodation power also as a factor.

BRIEF DESCRIPTION OF DRAWINGS

[FIG. 4] is a drawing schematically illustrating results obtained by sampling data of the age level 5 to 15 included in a Peters diagram showing a relation between a refractive error and visual acuity of eyeballs.

[FIG. 12] is a drawing illustrating an area of comfort for the people of ages 5 to 15 formed on the basis of Duane's diagram.

[FIG. 13] is a drawing illustrating an area of comfort for the people of ages 25 to 35 formed on the basis of Duane's diagram.

[FIG. 14] is a drawing illustrating an area of comfort for the people of ages 45 to 55 formed on the basis of Duane's diagram.

[FIG. 15] is a drawing illustrating an area of comfort for the people of age 75 formed on the basis of Duane's diagram.

[FIG. 16] is a flowchart illustrating the method for designing a spectacle lens according an embodiment of the present invention.

[FIG. 17] is a schematic diagram illustrating a spectacle lens manufacturing system according an embodiment of the present invention.

[FIG. 18] is a functional block diagram illustrating a function of a manufacture side computer provided in a spectacle lens manufacturing system according an embodiment of the present invention.

[FIG. 19] is a log MAR diagram illustrating a result obtained with respect to the age of 10 from the evaluation of a first spectacle lens utilizing the visual acuity function according an embodiment of the present invention.

[FIG. 42] is a drawing illustrating aspheric coefficients represented in the conventional format when the design is carried out using the visual acuity function shown in FIG. 39.

[FIG. 43] is a drawing illustrating aspheric coefficients represented in the conventional format when the design is carried out using the visual acuity function shown in FIG. 40.

[FIG. 44] is a drawing illustrating aspheric coefficients represented in the conventional format when the design is carried out using the visual acuity function shown in FIG. 41.

BEST MODES FOR CARRYING OUT THE INVENTION

Figure 1:
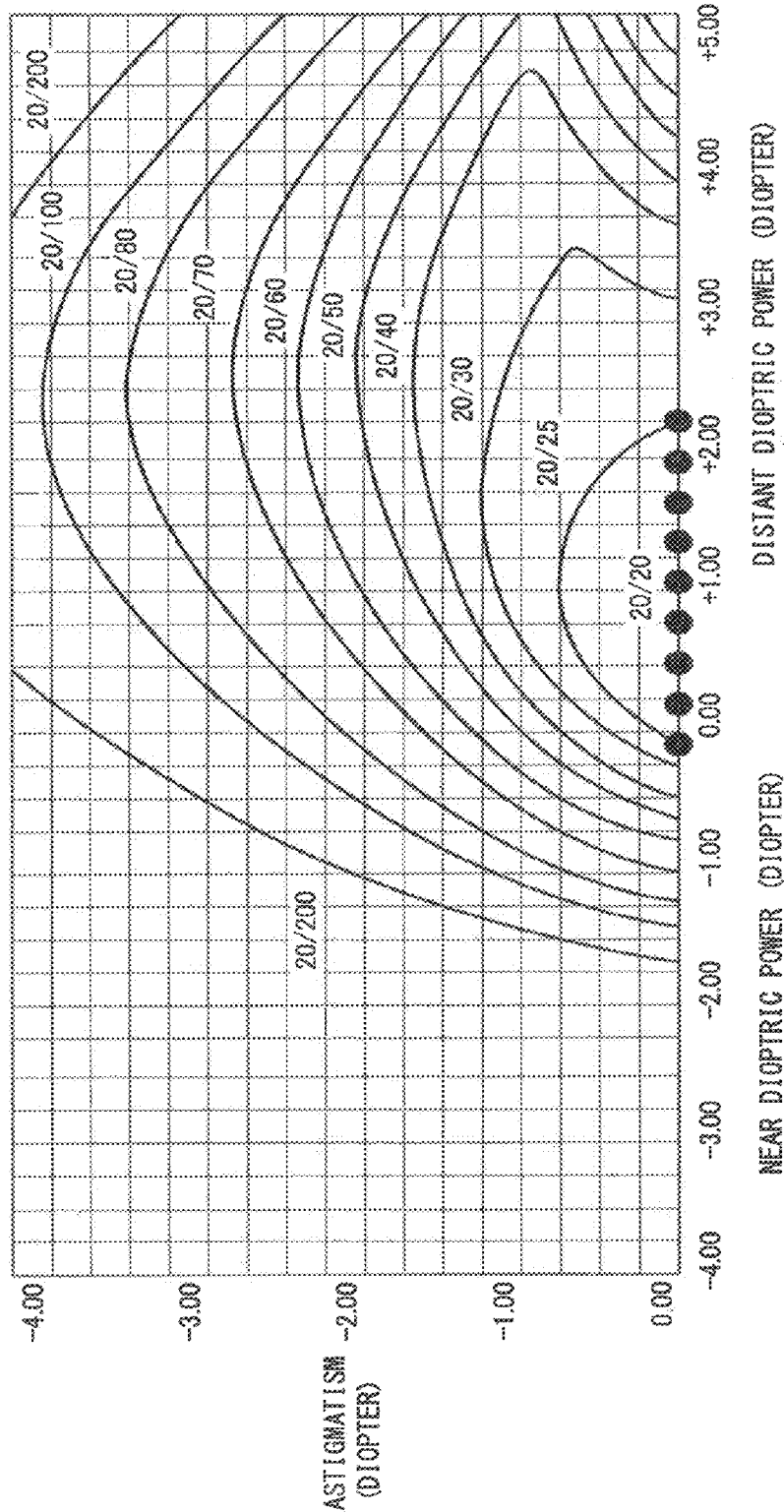
[FIG. 1] is a drawing illustrating a Peters diagram which shows a relation between a refractive error and visual acuity of eyeballs.

There described hereinbelow are methods for evaluating spectacle lenses according to embodiments of the present invention, and also, methods for designing spectacle lenses, methods for manufacturing spectacle lenses, systems for manufacturing spectacle lenses, and spectacle lenses, according to embodiment of the present invention, are described.

Description will be made in order of the following items.
[1] Method for evaluating spectacle lens
   1: General explanation of visual acuity function
   2: Formation of visual acuity function for accommodation power 0
   3: Interpretation of Peters diagram from the viewpoint of relative accommodation power
   4: Formation of Donders diagram classified by age
   5: Formation of visual acuity function
     (1) Area of comfort
     (2) Accommodation effect of spectacle lens
     (3) Explanation with respect to definition of visual acuity function at back vertex of lens
     (4) Relation between astigmatism AS and visual acuity degradation
     (5) Physiological astigmatism in positive relative accommodation power
[2] Method for designing and manufacturing spectacle lens
[3] System for manufacturing spectacle lens
[4] Embodiments
[1] Method For Evaluating Spectacle Lens
1: General Description of Visual Acuity Function The methods for evaluating spectacle lenses according to the embodiments of the present invention are the ones devised for evaluating custom-made spectacle lenses utilizing a visual acuity function, the visual acuity function including physiological astigmatism as a factor, preferably accommodation power or relative accommodation power as a factor. In more specific terms, the visual acuity function of the present application is calculated using a relational expression including, for example, power error (PE), astigmatism (AS), relative accommodation power (AA), and astigmatism function (the astigmatism multiplied by a correction coefficient (bk) corresponding to astigmatic visual acuity which decreases with increasing age (hereinafter also referred to as astigmatic visual acuity decreasing with aging) which includes either age or relative accommodation power as a variable, the expression additionally including another correction coefficient corresponding to physiological astigma. The visual acuity function is roughly a function which is formed by adding the difference (A) between power error and relative accommodation power, raised to the second power (i.e., $A^2$), and the astigmatism function (B) including age or accommodation power as the variable, raised to the second power (i.e., $B^2$), to yield a sum; and by subsequently multiplying the square root of the sum (i.e., $(A^2+B^2)^{1/2}$) by the proportionality coefficient with respect to visual acuity.

Specifically, the visual acuity function expressed by the following mathematical expression (1) shown as Equation 1 is used.

[Equation 1]

$$\text{Visual acuity function}(\log MAR) = \alpha \times \sqrt{(PE - AA(PRA, NRA))^2 + (bk \times AS/2)^2} \quad (1)$$

Incidentally, in the mathematical expression (1), $\alpha$ is defined as the coefficient for primarily correlating the visual acuity as one of visual functions to the relative accommodation power as another visual function, the power error PE as optical aberration, and the astigmatism (AS), and is the coefficient in the range of $0.25 \leq \alpha \leq 0.65$, preferably near $0.48 \pm 0.03$.

In addition, the first term under the square root symbol of the expression (1) is the term for offsetting (subtracting) the power error PE with the relative accommodation power AA, and is a power error (dioptric power error) as one of the well-known optical aberrations.

AA (PRA, NRA) is a function including, as the major term, relative accommodation power as one of the visual functions, preferably a function including a correction term expressing the phenomenon of physiological astigma.

The parameter bk included in the second term under the square root symbol expresses the phenomenon that the visual acuity increases in the direction of astigma with lowering age, and is a coefficient increasing with age or a correction efficient characterized by decreasing according to relative accommodation power corresponding to variations among individuals, and is expressed as $0.6 \leq bk \leq 1.1$. The term AS herein is assumed to stand for the astigmatism as one of the well-known optical aberrations.

In addition, when the visual acuity is expressed in units of (log MAR), the relationship with decimal visual acuity and fractional visual acuity can be defined by the following well-known mathematical expression, the notation V standing for decimal visual acuity or fractional visual acuity.

Visual acuity (in units of log MAR)=log 10 (1/V). Fractional visual acuity, decimal visual acuity, and visual acuity in units of log MAR are correlated with each other as shown in Table 1.

TABLE 1

Visual Acuity Comparative Table

| Fractional Visual Acuity | | Decimal Visual | Log |
|---|---|---|---|
| (6 m) | (20 feet) | Acuity | MAR |
| 6/60 | 20/200 | 0.10 | +1.0 |
| 6/48 | 20/160 | 0.125 | +0.9 |
| 6/38 | 20/125 | 0.16 | +0.8 |
| 6/30 | 20/100 | 0.20 | +0.7 |
| 6/24 | 20/80 | 0.25 | +0.6 |
| 6/20 | 20/63 | 0.32 | +0.5 |
| 6/15 | 20/50 | 0.40 | +0.4 |
| 6/12 | 20/40 | 0.50 | +0.3 |
| 6/10 | 20/32 | 0.63 | +0.2 |
| 6/7.5 | 20/25 | 0.80 | +0.1 |
| 6/6 | 20/20 | 1.00 | 0.0 |
| 6/5 | 20/16 | 1.25 | −0.1 |
| 6/3.75 | 20/12.5 | 1.60 | −0.2 |
| 6/3 | 20/10 | 2.00 | −0.3 |

At this point, in the evaluation of a spectacle lens, required optical performance values such as astigmatism, etc. are obtained using the well-known ray tracing method with respect to each point of the spectacle lens, and the optical performance values are substituted to the formula of the visual acuity function shown as the above-mentioned expression (1), and thereafter the value of the visual acuity function at each point of the spectacle lens is calculated. And, it is generally practiced to evaluate the optical performance at each point of the spectacle lens based on the value of the visual acuity function thus obtained. In addition, in this case, when carrying out the ray tracing method, specification of a spectacle lens as the evaluation object is made on the basis of the information of the spectacle lens, such as the three-dimensional shape of a curved surface, refractive index, Abbe number, S dioptric power, C dioptric power, astigmatic angle, prism degree, prism angle, lens forward tilting angle, lens convergence angle, PD (interpupillary distance), prescription distance for distinct vision, VR (distance between the eyeball rotation center and the back vertex of a spectacle lens), etc.

In addition, as the design method of spectacle lenses in general, there has been known the method for carrying out designing while performing optimization calculation using some kind of evaluation function, and in the method for designing spectacle lenses according to embodiments of the present invention, the visual acuity function shown as the above-mentioned expression (1) is utilized as the evaluation function. Furthermore, the spectacle lenses according to embodiments of the present invention are the ones designed by the above-mentioned spectacle lens design method.

Incidentally, although the above-mentioned optimization calculation is the well-known technique in designing spectacle lenses, a brief explanation thereof will be given in outline herein below as a premise for explaining the embodiments of the present invention.

For example, when the case of designing a single-vision aspheric lens is taken for instance, the data of lens material and the specification regarding prescription are given as the fundamental design specification. In addition, by including items such as the central thickness in the case of a positive lens as additional specification, combinations of the shapes of refractive planes on the front and rear sides of the lens are obtained through calculation such that that both the specification and central thickness are satisfied and the optical aberration is decreased as much as possible. The refractive planes are expressed as the planes mathematized in terms of a prescribed function, and include plural parameters for defining a spectacle lens. These parameters include refractive index of material, outer diameter of the lens, radiuses of curvature of front and rear faces, central thickness, aspherical cone coefficient, high order aspherical coefficient, etc. These parameters are divided into fixed and variable factors depending on lens design purposes, and the variable factors are treated as variable parameters.

In addition, using the ray tracing method or the wave front tracing method, a plurality of evaluation points having different distances from the optical axis are set on the refractive planes of the lens surfaces, and the optical aberrations at the evaluation points are expressed in terms of evaluation functions (merit functions). Subsequently, calculation is carried out utilizing an optimization calculation method such as the damped least squares method so that the evaluation function values are rendered minimum. At this point, the simulation of optimization is carried out repeatedly while manipulating the variable parameters of the above-mentioned refractive planes, and the final shapes of the refractive planes are determined at the moment when the values of evaluation functions turn to be target values. In the method for designing spectacle lenses according to the present embodiment, the expression (1) is used as the above-mentioned evaluation functions (merit functions).

Incidentally, the visual acuity function that is utilized in the method for evaluating spectacle lenses of the present invention is derived based on data obtained by experimentally measuring the relation between an eyeball refractive error and visual acuity on plural test subjects, data obtained by experimentally measuring the relation between convergence and accommodation power on plural test subjects, and data obtained by experimentally measuring accommodation power and age on plural test subjects. Described herein below in concrete terms is the process of deducing the above-mentioned visual acuity function on the basis of these data obtained by experimentally measuring on plural test subjects in large numbers, to be more specific, on more than hundreds to thousand test subjects.

2: Formation of Visual Acuity Function for Accommodation Power 0

The above-mentioned expression (1) has been obtained as follows. First, a visual acuity function for all-purpose lenses is obtained based on the Peters diagrams shown in FIGS. 1 through 3, and then a visual acuity function including relative accommodation power for custom-made lenses is obtained by further generalizing the visual acuity function for all-purpose lenses. It may be noted herein that the Peters diagram is a graphical representation of visual acuity measurement data by age experimentally obtained by Peters (see "The Relationship between Refractive Error and Visual Acuity at Three Age Levels", the American Journal of Optometry and Archives of American Academy of Optometry, (1961) pp. 194 to 198). That is, the Peters diagram is the graphical representation formed based on the data of eyeball refractive error versus visual acuity, experimentally obtained on test subjects in large numbers. In the drawing, the vertical axis represents astigmatism, while the horizontal axis represents spherical dioptric power. The visual acuity is in the fractional visual acuity representation.

Figure 2:
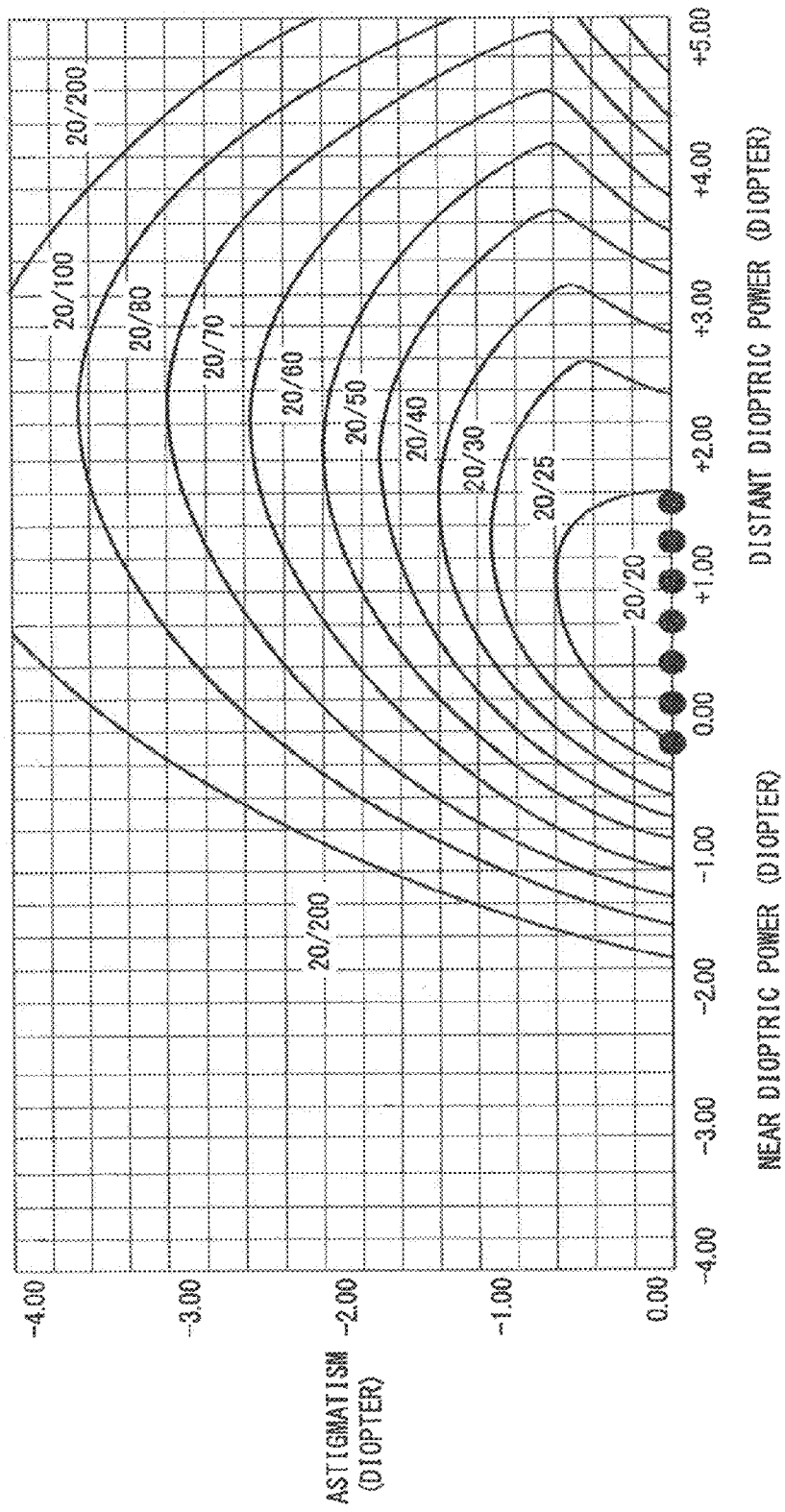
[FIG. 2] is a drawing illustrating another Peters diagram which shows a relation between a refractive error and visual acuity of eyeballs.
Figure 3:
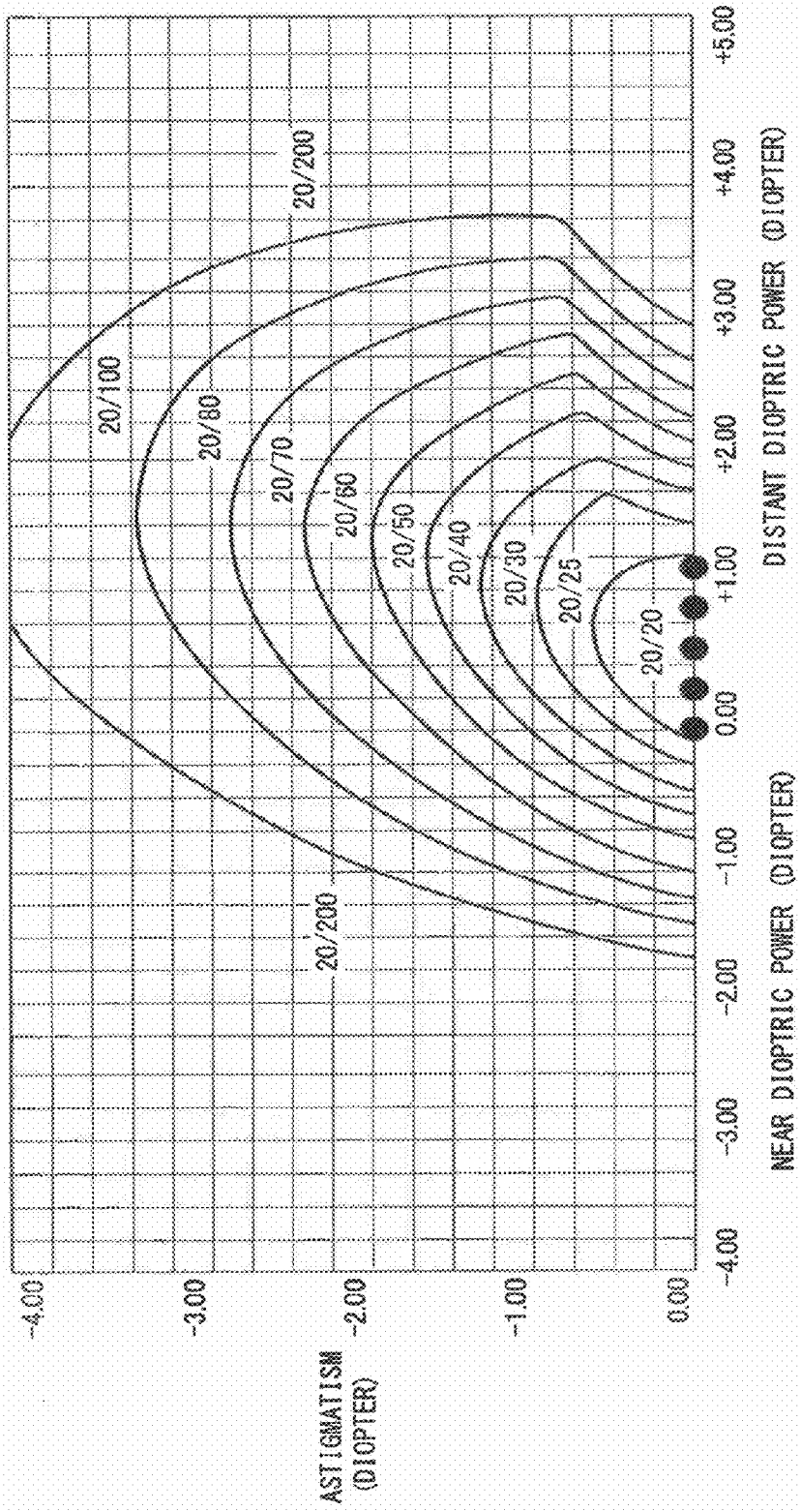
[FIG. 3] is a drawing illustrating still another Peters diagram which shows a relation between a refractive error and visual acuity of eyeballs.

Referring to Peters diagrams shown in FIGS. 1 through 3, these diagrams illustrate the relationship between lens aberration (PE (power error)), AS (astigmatism)) and normalized visual acuity. Therefore, it can be said that this relationship itself is the visual acuity function. As a result, by formulating the relationship as a functional form, it can be deduced to the following mathematical expression (2) shown by Equation 2.

[Equation 2]

$$\text{Visual acuity function}(\log MAR) = f(PE, AS) \quad (2)$$

In order to express this in a more concrete functional form, when the visual acuity is expressed in units of log MAR, the relationship can be deduced to the following mathematical expression (3) shown by Equation 3.

[Equation 3]

$$\text{Visual acuity function}(\log MAR) = \alpha \times \sqrt{PE^2 + (bk \cdot AS/2)^2} \quad (3)$$

It is noted herein that the above-mentioned normalized visual acuity is expressed in terms of the value of the visual acuity prior to correction with spectacles divided by the visual acuity after the correction with the spectacles. The correction coefficient bk will be described further later on.

The process of deriving the above-mentioned visual acuity function as the mathematical expression (3) will be described herein below in more concrete terms. Referring to Peters diagrams shown in FIGS. 1 through 3, it is found that the diagrams are divided into three by age. Although the aforementioned publication by Peters itself has not mentioned anything about the difference among three diagrams, there found is the description in the publication by Kleinstein "Uncorrected Visual Acuity and Refractive Error" (Optometric Monthly, November (1981), pp. 31 to 32) as an explanatory publication for the Peters', that the difference is caused by accommodation power. However, the accommodation power cannot be included as a design factor of general-purpose lenses. The reason is that the accommodation power cannot be considered because it cannot be known during design by what kind of people spectacle lenses will be worn. Namely, in the design of general-purpose lenses, the accommodation power has to be assumed as 0.

Accordingly, the diagram for the accommodation power 0 has been formed. To explain it briefly, the diagram for the accommodation power 0 has been extrapolated based on the diagrams of three age levels. The method of deriving the diagram is described hereinbelow in concrete terms. First, it is examined what kind of features the diagram for the accommodation power 0 has. The above-mentioned three diagrams are closely observed. It has become clear from age versus accommodation diagrams that accommodation power and age are closely related with each other. There, the following trends can be noticed.

a. The portion of the diagram on the left side from the origin has little change for each age level.
b. The portion on the right side from the origin shows a shift to the left with age.
c. The diagram as a whole is leaning to the right toward the vertical axis (astigmatism) from the origin. In addition, the gradient of its inclination is the average dioptric power, (S dioptric power)+(C dioptric power)/2 (namely, the curved line expressed by C=−2S).

Taking these trends into consideration, even though no drawing is included in the Peters diagrams for the accommodation power 0, that is, for the age of 75 years, it has been assumed that even if a Peters diagram for the accommodation power 0 is present, the portion on the left-hand side of the diagram is subjected to no change. Then, it has been found that the fractional visual acuity in the negative range on the S dioptric power axis without astigma is in a proportional relationship with S dioptric power when the fractional visual acuity is expressed in units of log MAR. That is, this leads to the following expression, if the proportionality coefficient is assumed as α;

$$\text{Visual acuity on } S \text{ dioptric power axis(in units of log } MAR) = \alpha \times S \text{ dioptric power,}$$

where the term α is the coefficient in the range of $0.25 \leq \alpha \leq 0.65$, preferably near $0.48 \pm 0.03$.

Subsequently, it can be assumed with relative ease that the diagram for the accommodation power 0 assumes the shape of an elliptically curved surface with a gradient of ((S dioptric power)+(C dioptric power)/2), even though approximately. Then, the visual acuity function for the accommodation power 0 resulted from increased ages is assumed to be in the shape of an elliptic surface symmetric to the ((S dioptric power)+(C dioptric power)/2) line of the Peters diagram. Moreover, by further assuming the rotational coordinate transformation corresponding to the magnitude of gradient, ((S dioptric power)+(C dioptric power)/2), the Peters diagram can be expressed approximately by the following expression (4).

[Equation 4]

$$\text{Visual acuity}(\log MAR) = \alpha \times \sqrt{(S+C/2)^2 + (bK \cdot C/2)^2} \quad (4)$$

In the above-described expression (4), the proportionality constant α is the aforementioned value, and S and C are for S dioptric power and C dioptric power, respectively. Although the reason is yet to be known, bk is a correction coefficient that expresses a trend that the visual acuity increases in the direction of astigma as the relative accommodation power of the visual acuity function is larger or the age is lower. Specifically, by reading off the Peters diagram and assuming the following values for bk, the visual acuity h approximated to the upper astigma of the Peters diagram can be obtained.

10 years old: $bk=0.738474\pm0.05$ 30 years old: $bk=0.778894\pm0.05$ 50 years old: $bk=0.859321\pm0.05$ From the relationship between age and accommodation power, at the age of 75 years old, it is assumed as that $bk=1.00\pm0.05$. As numerical limitation, bk is in the range of $0.6 \leq bk \leq 1.1$.

Through the above-mentioned consideration, on the basis of the Peters diagram, the expression suitable for the accommodation power 0, i.e., the expression (4) substituted by bk for 75 years old, has been derived. The Peters diagram was formed according to the measurement method described in the publication by Peters. That is, since the visual acuity shown in the diagram is the one measured when the spectacle lenses with the dioptric powers S and C as shown in the diagram have been taken off, it is meant conversely that the diagram indicates the visual acuity corresponding to the case that a person with normal vision (person having the normal visual acuity) wears spectacle lenses with the dioptric powers −S and −C. That is, the case of wearing spectacle lenses with the dioptric powers −S and −C corresponds to the case that when a person with normal vision wears spectacle lenses, the aberrations of the dioptric powers −S and −C are present as the aberration of light transmitted along an arbitrary gaze line of the spectacles.

At this point, carried out is the conversion of the aberration of the dioptric powers −S and −C to the expression in terms of PE (power error) and AS (astigmatism, negative sign expression) as the well-known aberration expression. By the aberration of the dioptric powers −S and −C, it is meant the aberration of the (−S) dioptric power and (−S−C) dioptric power along respective axes of the lens. In addition, according to the method of dioptric power conversion well-known to those in the art, there are deduced to the dioptric powers (−S−C) and −S=(−S−C)+C along the respective axes, which is equivalent to a lens having the cylindrical dioptric power C of the dioptric power (−S−C). Then, it follows that the following relation holds with respect to (PE, AS) and (S, C).

$PE=-S-C/2$ $AS=C$

As a result, by substituting the above expressions to the above-described mathematical expression (4) shown by the Equation 4, the expression (3) is derived. This expression (3) expresses the relation between the aberration (PE (power error), AS (astigmatism)) of the lens and the visual acuity with the normalized accommodation power 0. According to the interpretation of the above expression, the sign of the visual acuity function for the zero convergence angle is reversed with respect to the Peters diagram and the line of PE=S+C/2. It is noted, however, that the functional form remains the same in the expression (4) even after reversing the sign of the terms S and C. In other words, the visual acuity function can be obtained uniquely from the expression expressing the Peters diagram by reversing the sign of PE=S+C/2. In addition, the opposite is also true, and the function expressing the Peters diagram and the visual acuity function are mathematically in equivalence relation with each other.

Figure 5:
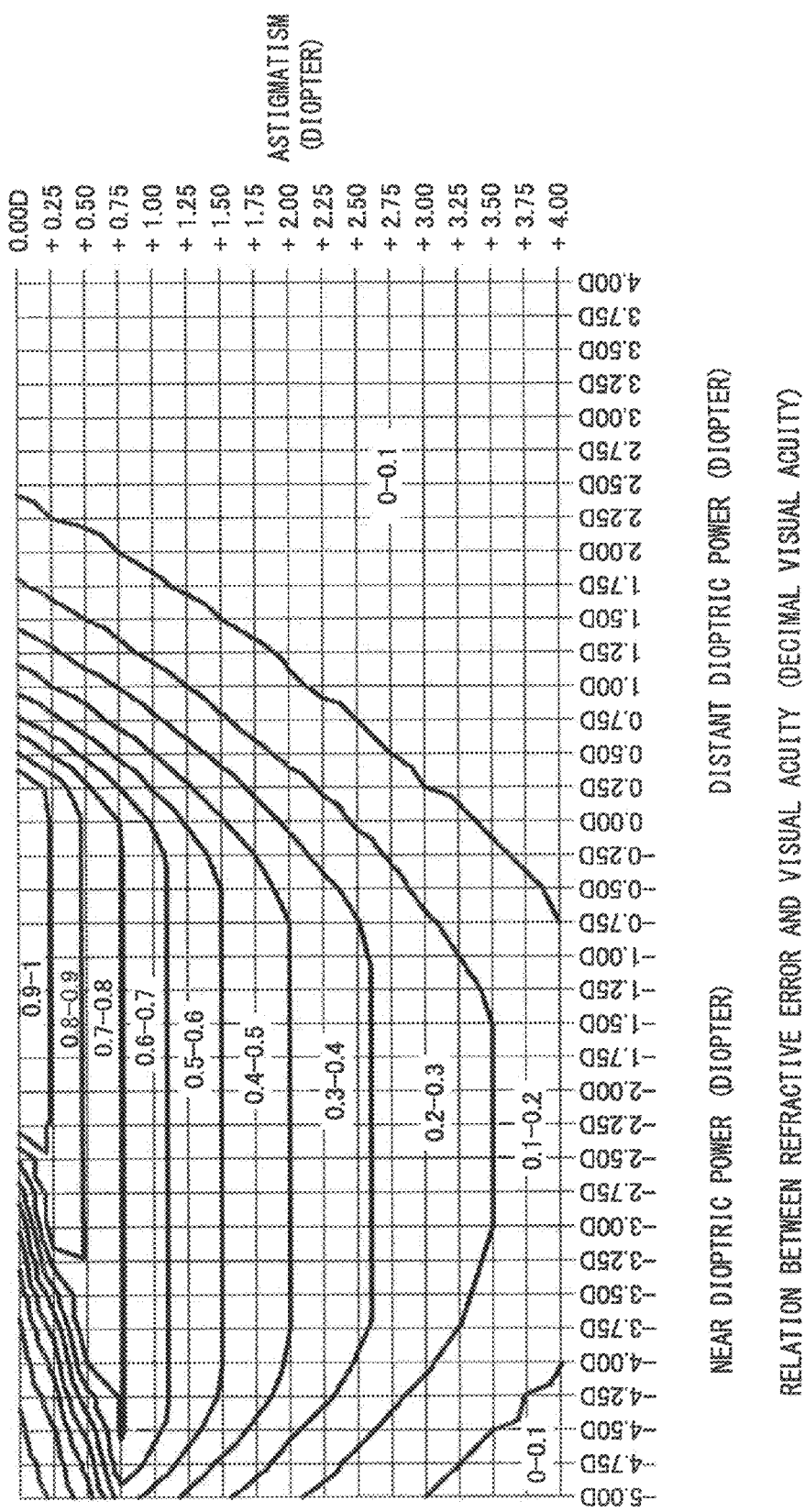
[FIG. 5] is a drawing illustrating a visual acuity function obtained by bringing the data of FIG. 4 to be symmetric with respect to the origin.
Figure 6:
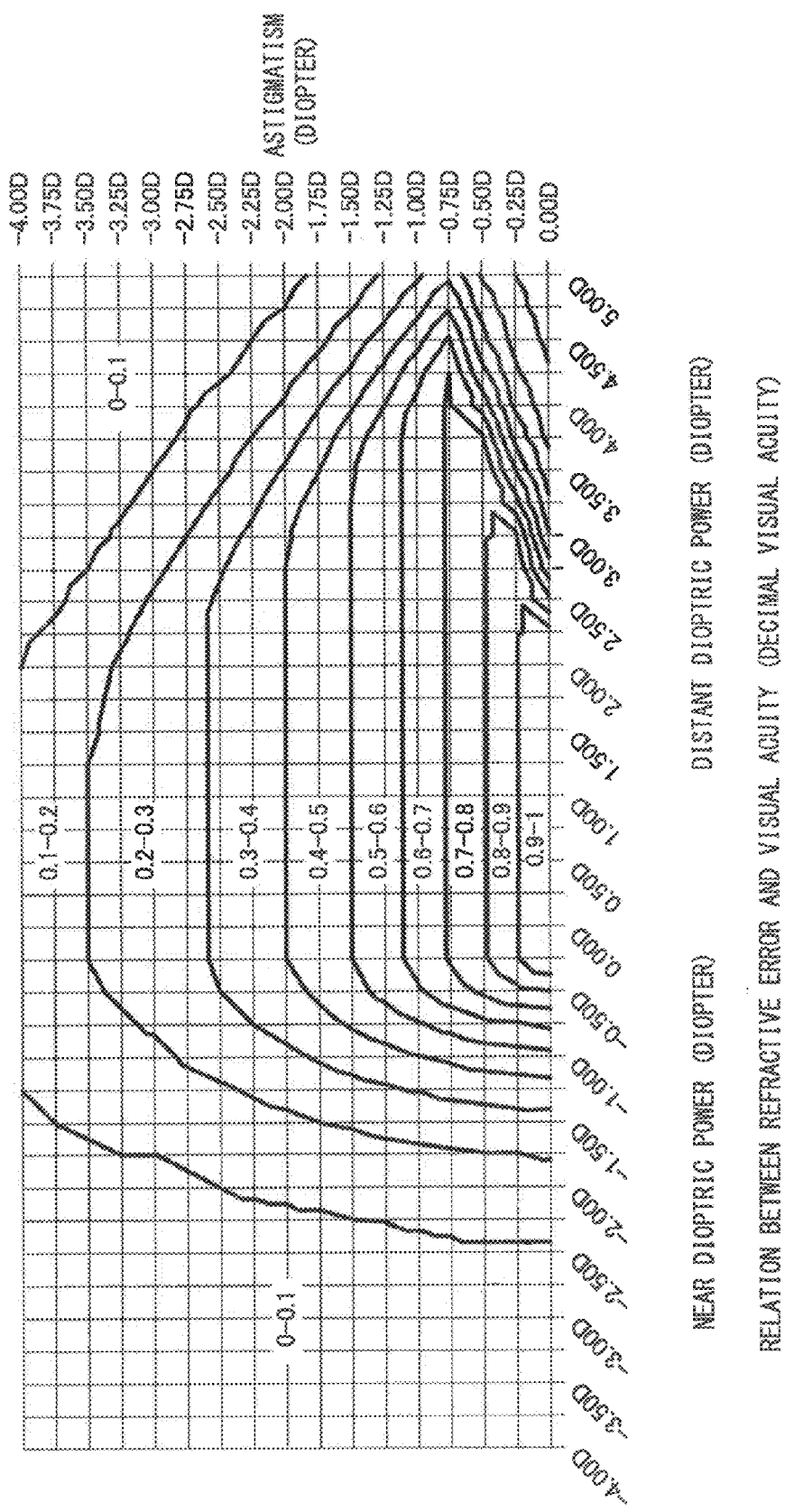
[FIG. 6] is a drawing depicting a result of transformation of the Peters diagram for the age level 5 to 15 shown in FIG. 4 into a coordinate system with PE (power error) as the horizontal axis and AS (astigmatism) as the vertical axis.
Figure 7:
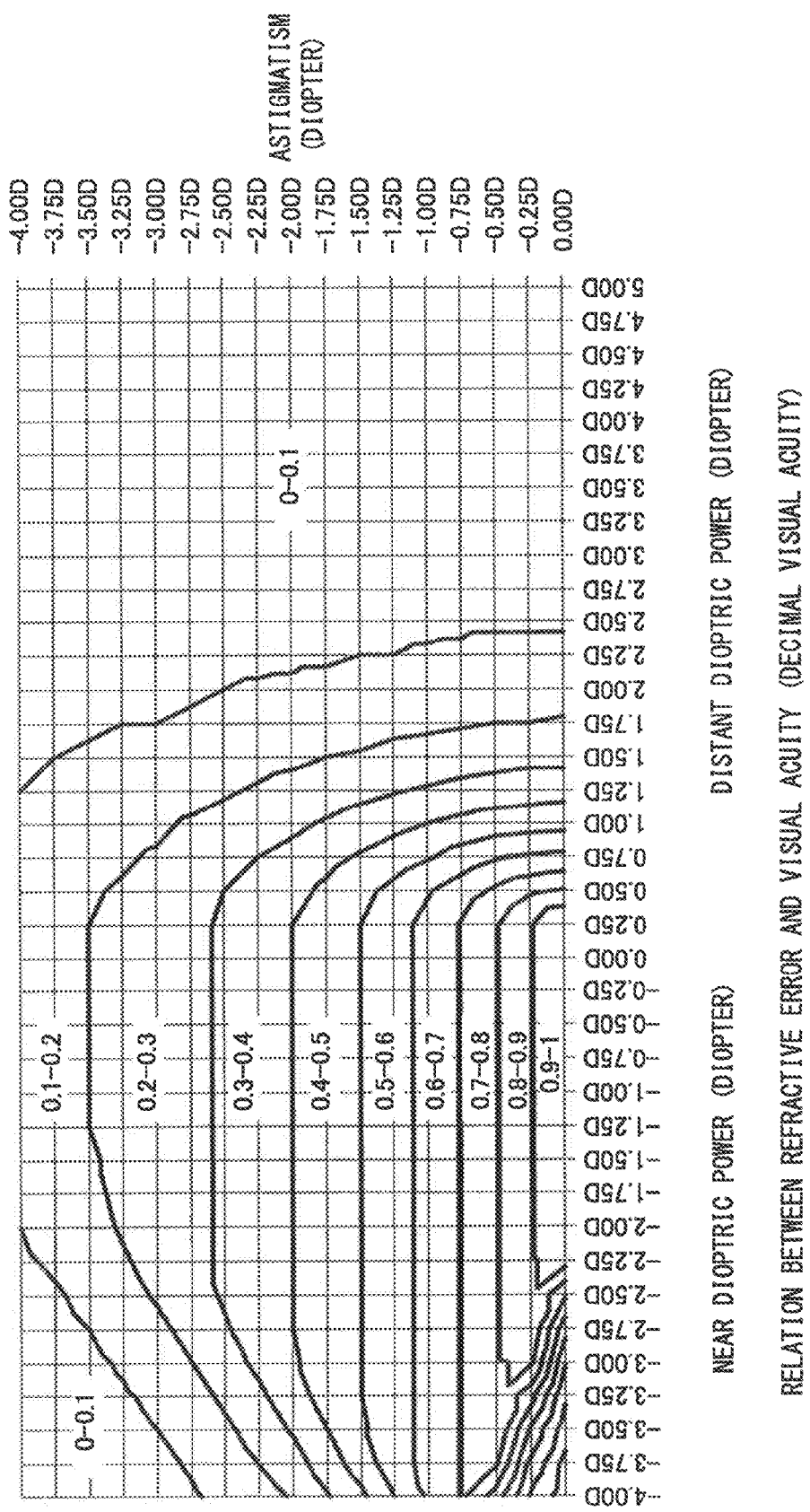
[FIG. 7] is a drawing illustrating the visual acuity function formed on the basis of FIG. 6.
Figure 8:
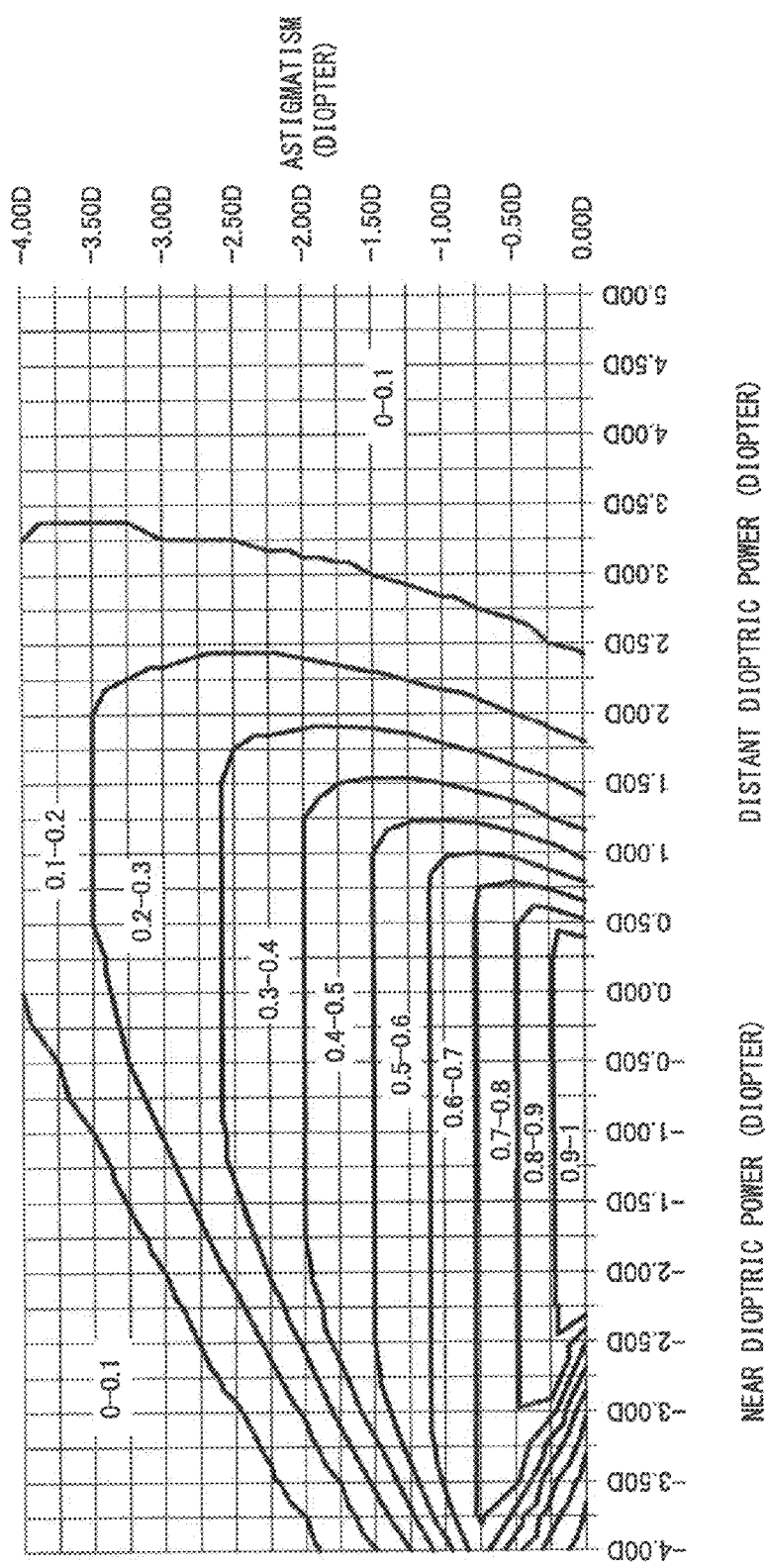
[FIG. 8] is a drawing depicting the result of transformation of FIG. 7 into an S versus C coordinate system.

The manner of the above-described conversion is schematically illustrated in FIGS. 4 through 8. FIG. 4 is a drawing schematically illustrating the results obtained by sampling the data for the age level 5 to 15 included in the aforementioned Peters diagram. On the other hand, FIG. 5 is the drawing of the data of FIG. 4, which are brought to be symmetric with respect to the origin. That is, FIG. 5 shows the visual acuity function obtained by bringing the Peters diagram to be symmetric with respect to the origin. In addition, by transforming the Peters diagram for the age level 5 to 15 shown in FIG. 4 into the coordinate system with PE as the horizontal axis and AS as the vertical axis, FIG. 6 is formed. The visual acuity function formed on the basis of FIG. 6 is shown in the drawing of FIG. 7. By further transforming the visual acuity function into the S versus C coordinate system, the drawing of FIG. 8 is deduced.

Figure 9:
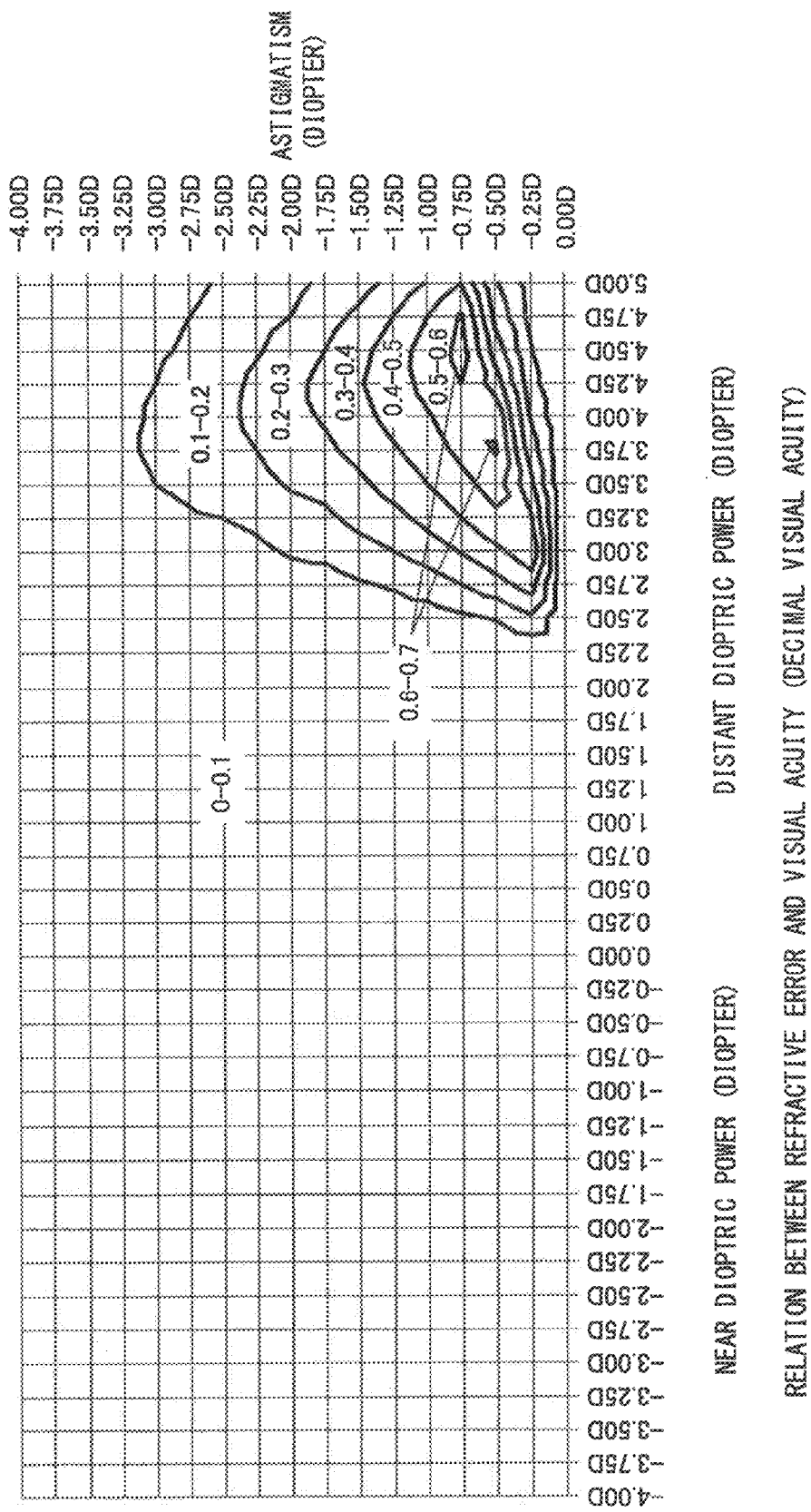
[FIG. 9] is a drawing illustrating the results obtained by extracting only physiological astigma from the Peters diagram for the age level 5 to 15 shown in FIG. 4.

Incidentally, when only physiological astigmatism, which is described later on, is extracted from the Peters diagram for the age level 5 to 15 shown in FIG. 4, the drawing of FIG. 9 is formed. In FIGS. 4 through 9, the visual acuity is expressed in terms of decimal visual acuity.

3: Interpretation of Peters Diagram from the Viewpoint of Relative Accommodation Power On the other hand, the visual acuity function utilized in the method for evaluating spectacle lenses according to the present embodiment is a visual acuity function capable of calculating normalized visual acuity, including as factors, the distance of distinct vision through the lens (the distance being expressed in terms of FU convergence angle), individual relative accommodation power (RA), and aberration (PE (power error) and AS (astigmatism)) of the spectacle lens. When this is expressed in terms of mathematical expression,

[Equation 5]

$$\text{Visual acuity function}(\log MAR) = f(PE, AS, FU, RA). \quad (5)$$

Here, in the aforementioned expression (2), as clearly shown from the measurements of the Peters diagram, the convergence angle FU is 0, and the relative accommodation power RA is 0 for use in designing general-purposes lenses. In the case of FU=0 and RA=0, the expression (5) is required to be deduced to the expression (2), i.e., to the expression (3) which is a concrete expression thereof.

Figure 10:
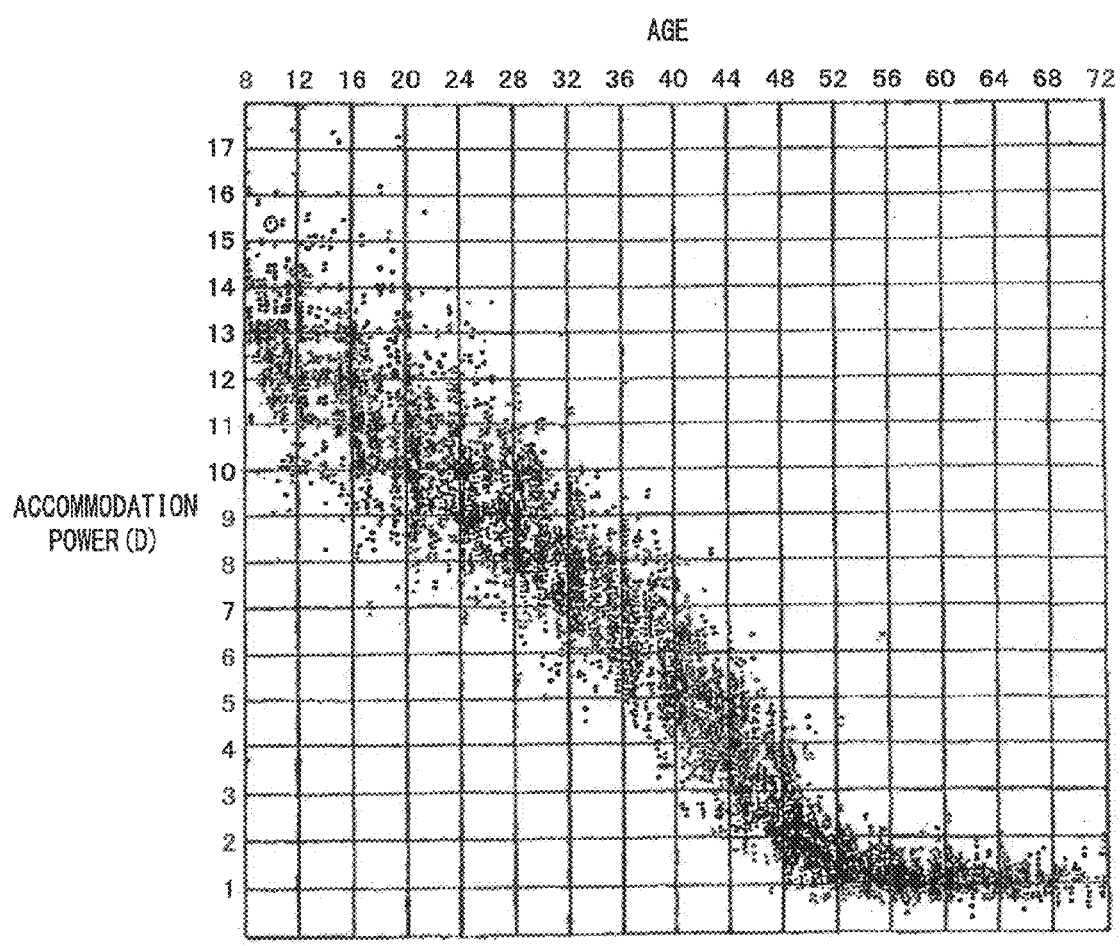
[FIG. 10] is a drawing depicting a Duane's diagram illustrating a relation between age and accommodation power.

There will be described herein below the process of deducing a concrete expression corresponding to the above-mentioned expression (5) that has the relation similar to the above-mentioned expression (3) as the concrete expression of the expression (2). First, in regard to Peters diagrams, there explained in the aforementioned publication by Kleinstein entitled "Uncorrected Visual Acuity and Refractive ErrorA" (1981), is that the difference between the three diagrams is caused by the difference in the accommodation power. However, when the data on age versus accommodation power, which have been obtained from actual measurements on plural test subjects, are observed, the above difference can not be explained as caused by the difference in the accommodation power alone. As such data, a Duane's diagram formed by Duane is cited and shown in FIG. 10 (for example, see the article by Tadao Tsuruta entitled "Light, past and present 3: Changes of Age-Accommodation Curves" (Science of Vision, Vol. 19, No. 3, December 1988, pp. 101 to 105). As shown in FIG. 10, the standard value of accommodation power (considerable scattering is observed individually) in the range from zero to 53.3 years is expressed in general by the following well-known expression.

Accommodation power=14−0.23×age

In addition, as the data regarding age versus accommodation power, obtained from actual measurements of plural test subjects, other data may also be available, such as, for example, the Hofstetter diagram by Hofstetter and the Landolt diagram by Landolt (see the aforementioned article by Tsuruta).

Supposing that the accommodation power has the above-mentioned relationship with age, for example at the age of 10, the accommodation power is obtained as 11.7 diopter (hereinafter, abbreviated as 11.7 D). When the Peters diagram for the age level 5 to 15 is examined, it is read out from the diagram that the range without astigmatism, namely, the range in which distinct vision (20/20) is feasible on the horizontal axis is merely 2.375 D. These two values differ too much.

The present inventor has been investigating the reason for the above-mentioned result for a long time. Finally, the present inventor has noticed that it is evident that no convergence is involved in Peters' measurement method and found the reason for this. Namely, it has been found that the 2.375 D portion of the Peters diagram for the age 10 is not related to accommodation power but related to relative accommodation power when the gaze point is placed at a far point. The relative accommodation power is defined as the range expressed in terms of diopter in which distinct vision is achieved while maintaining convergence of the gaze point. It means that the aforementioned explanation by Kleinstein has needed a suitable correction. Accordingly, although the accommodation power has been used for explanatory purposes up to this point, herein below, the description will proceed by distinguishing the relative accommodation power from the accommodation power. To explain the sign of accommodation power, when the accommodation power becomes plus, i.e., when the thickness of the crystalline lens increases, the accommodation power is defined to have the positive sign; while, in this industry, in the same situation the relative accommodation power is defined as positive relative accommodation power, and is defined to have the negative sign, although their absolute values are the same.

In the next place, from the examination of relative accommodation power, the visual acuity function is obtained based on the values obtained from individual measurements of the relative accommodation power measurements when the gaze point is placed at a far point (FU=0). It is clear from the three Peters diagrams that age and relative accommodation power are closely correlated. Accordingly, relationship diagrams on age versus relative accommodation power were searched, however, none was found. Therefore, an assumption is made that the relationship diagram of age versus relative accommodation power has similar characteristics to the diagrams on age versus accommodation power, although the values are different. That is, it is assumed that considerable scattering is found in individual data and in large numbers close correlation with age is found. Specifically, the following well-known formulas are available as relational expressions on age versus accommodation power.

Ages under 53.3

Accommodation power=14−0.23×age

Ages 53.3 to 75

Accommodation power=6.0−0.08×age

Ages 75 and up

Accommodation power=0

Previously in paragraph [0040], bk for the ages of 10, 30, and 50 have been shown, and the assumed correction coefficient bk for 75 years old has been also shown. Then, bk is expressed as follows, under the assumption that as in the relation between age and accommodation power, the relation behaves such that it becomes a straight line maintained to be continuous at the point of 53.3 years old and yields the value of 1.00±0.05 at the age of 75. In the following expression, the value is taken to be 1.0 at 75 years old for explanatory purposes.

Ages under 53.3

$bk=0.8262+0.1129\times age/53.3$

Ages 53.3 to 75

$bk=0.9391+0.0609\times(age-53.3)/21.7$

Ages 75 and up $bk=1$

The relative accommodation power (RA) read from Peters diagrams is expressed by the following expressions, under the assumption that as in the relation between age and accommodation power, the relation behaves such that it becomes a straight line maintained to be continuous at the point of 53.3 years old and yields the value of 0 at the age of 75. The relative accommodation power shown in the Peters diagram is equal in absolute value to the positive relative accommodation power which is to be described later on. The sign of the positive relative accommodation power is shown with the negative sign by definition.

Ages under 53.3

Positive relative accommodation power=age/40−2.625

Ages 53.3 to 75

Positive relative accommodation power=1.2925×(age−75)/21.7

Ages 75 and up

Positive relative accommodation power=0

Therefore, although the relative accommodation power (RA) is found to have considerably large scattering individually, it is deduced to a function of age through averaging, and the expression (5) is deduced in this case to the following mathematical expression (6) shown by Equation 6.

[Equation 6]

Visual acuity function(log $MAR$)=$f(PE,AS,0,RA(Age))$ (6)

That is, the Peters diagram for distant vision (with the gaze point at a far point (FU=0)) can be expressed as a continuous function with respect to age, in which the relative accommodation power is determined by specifying age. In order to describe in more concrete terms, it is necessary to obtain, from the three diagrams, an interpolation function which includes the relative accommodation power as a factor. For explanatory conveniences, prior to obtaining the more concrete visual acuity function for distant vision (with the gaze point at a far point (FU=0)), the method for obtaining a visual acuity function at an arbitrary distance (FU) for distinct vision through lenses will be explained.

4: Formation of Donders Diagram for Respective Age Levels

Figure 11:
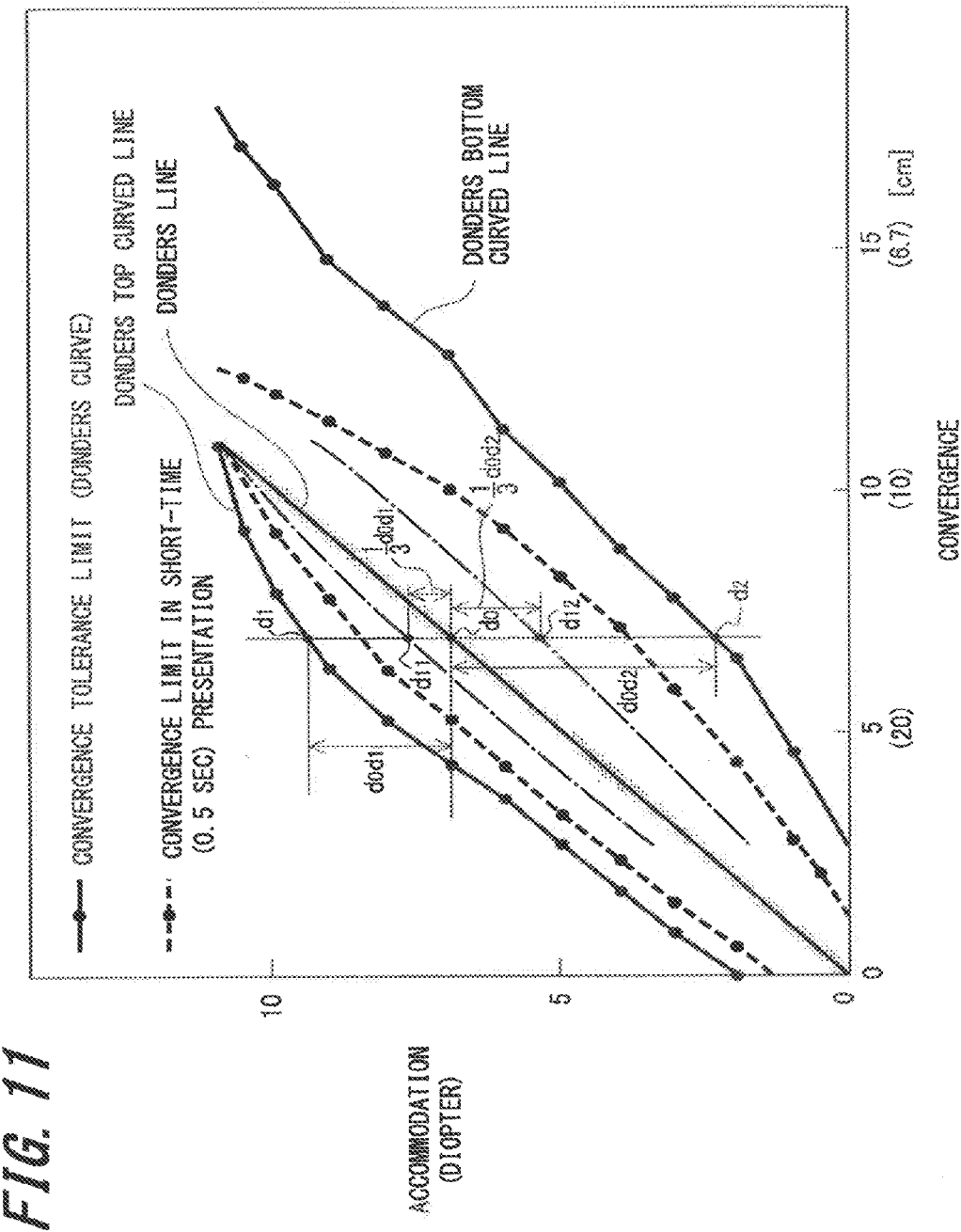
[FIG. 11] is a drawing depicting another Duane's diagram illustrating a relation between convergence and accommodation power.
Figure 20:
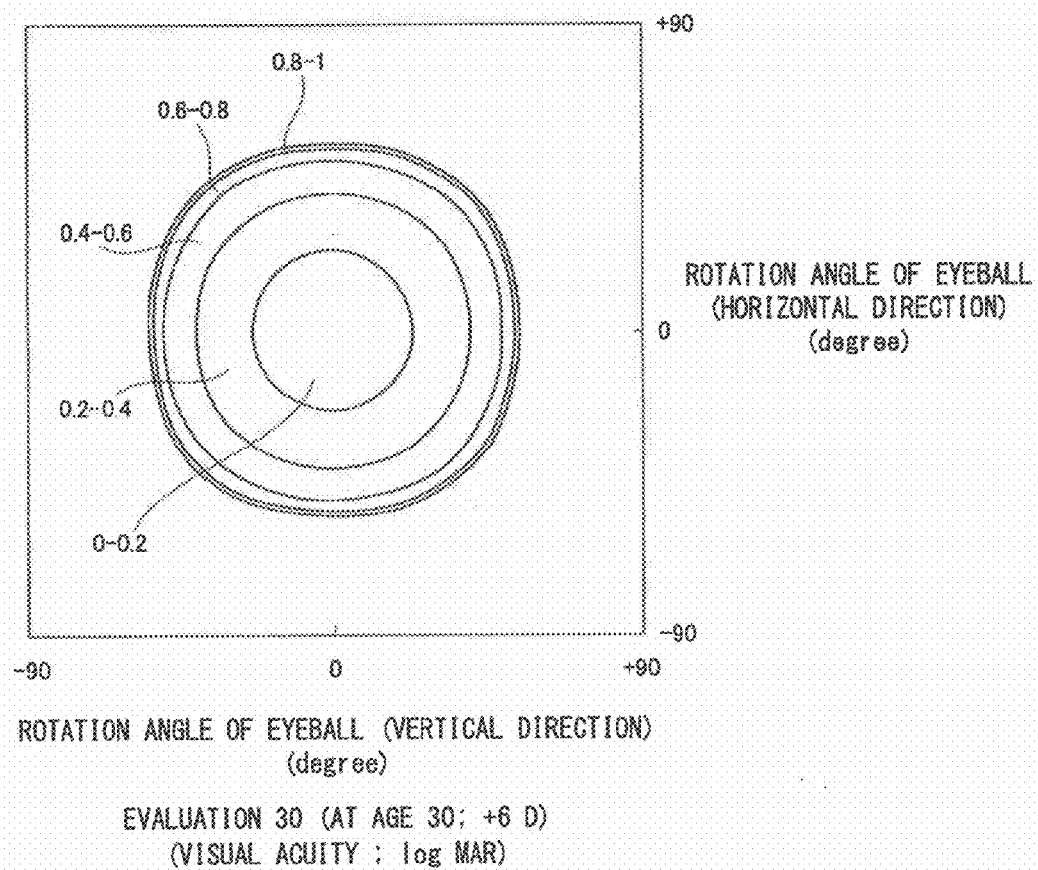
[FIG. 20] is a log MAR diagram illustrating a result obtained with respect to the age of 30 from the evaluation of the first spectacle lens utilizing the visual acuity function according an embodiment of the present invention.
Figure 21:
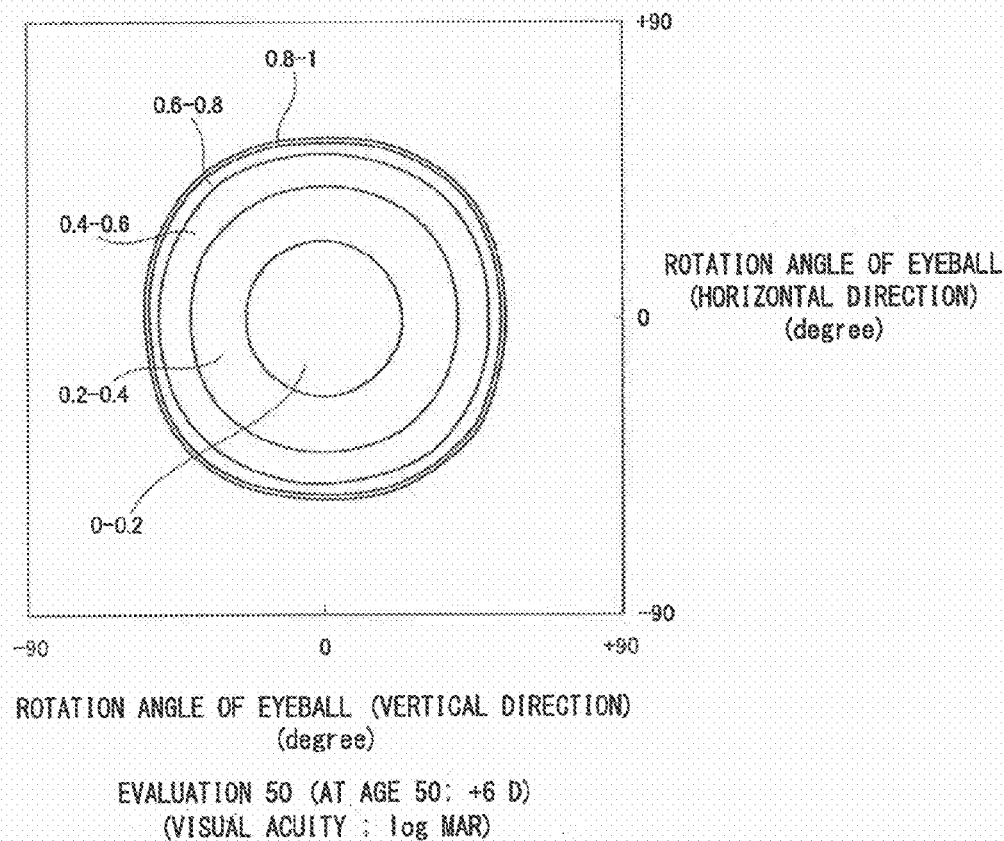
[FIG. 21] is a log MAR diagram illustrating a result obtained with respect to the age of 50 from the evaluation of the first spectacle lens utilizing the visual acuity function according an embodiment of the present invention.

In the first place, the data with respect to the relation between convergence and accommodation power, obtained from actual measurements on plural test subjects, are prepared. For such data, a Donders diagram devised by Donders and formed by Mr. Toyohiko Hatada can be utilized. The Donders diagram shown in FIG. 11 is a well-known diagram among those skilled in the art. Referring to FIG. 11, the drawing is formed by plotting the distance to the gaze point on the horizontal axis (unit in cm: in units of convergence angle which is expressed by the distance from eyeballs to the gaze point), and the range of the amount of accommodation that is adjustable (in units of diopter) on the vertical axis. In the diagram, the gaze point is represented by a straight line having a 45-degree gradient and passing through the origin, called a Donders line, and the range in which distinct vision is feasible without changing the convergence from the gaze point is expressed by the region surrounded by two curved lines called Donders curved lines (shown in FIG. 11 as a Donders top curved line and a Donders bottom curved line).

With a certain fixed value on the horizontal axis, that is, with constant convergence, the length from the Donders line to the Donders top curved line is defined as the positive relative accommodation power (PRA: defined as negative quantity), while the length from the Donders line to the Donders bottom curved line is defined as negative relative accommodation power (NRA: defined as positive quantity). When expressed by formulas, $$PRA = \text{Donders line} - \text{Donders top curved line}$$

$$NRA = \text{Donders line} - \text{Donders bottom curved line}$$

In the Donders diagram, the convergence angle 0, i.e., the origin of the horizontal axis, corresponds to the accommodation 0 and is on the Donders line. By definition, the positive relative accommodation power (PRA) at the origin is the same as the relative accommodation power included in the aforementioned Peters diagrams. From the drawing, this can be read as approximately −2 D. As will be described later on, the relative accommodation power from a Donders diagram and the relative accommodation power from a Peters diagram differ from each other quantitatively in the defined reference position. However, since they are the quantities which are mutually convertible, they are tentatively considered herein as the same relative accommodation power. The Donders diagram shown in FIG. 11 is unfortunately neither the diagram by age, nor for expressing the difference in the relative accommodation power. In addition, although Donders diagrams by age were investigated, none was discovered.

Therefore, Donders diagrams for respective age levels will be formed as follows. From the above-mentioned Donders diagram, as described previously in paragraph, the positive relative accommodation power at the origin is read as approximately −2 D. Then, it has been shown already in paragraph that from the Peters diagram (at convergence angle 0), the relation between age and positive relative accommodation power is obtained as follows.

Ages under 53.3

Positive relative accommodation power=age/40−2.625

Ages 53.3 to 75

Positive relative accommodation power=1.2925×(age−75)/21.7

Ages 75 and up

Positive relative accommodation power=0

When −2 D is substituted as the value of the positive relative accommodation power in the above-mentioned relation expressing the positive relative accommodation power, the age is obtained as approximately 25 years old. Therefore, it is assumed that the Donders diagram has been formed based on the measured values of people with the relative accommodation power of 25 years old. Accordingly, the Donders diagrams for respective age levels are formed on the basis of the above-mentioned Donders diagram for 25 years old. That is, the positive relative accommodation power at an arbitrary convergence angle is read from the Donders diagram, and the following items, (a) and (b), are assumed.

(a) The relative accommodation power at an arbitrary convergence angle, which is also the function of age, is obtained by the multiplication of the age ratio and the relative accommodation power at an arbitrary convergence angle.

(b) The age ratio is given as the ratio of the positive relative accommodation power read from the Donders diagram and the positive relative accommodation power read from the Peters diagram.

As a concrete expression, this leads to the following Equation 7.

[Equation 7]

$$\text{Age ratio} = \frac{\text{Positive relative accommodation power at arbitrary age at 0 convergence angle}}{\text{Positive relative accommodation power from Donders diagram at 0 convergence angle}} \qquad \text{[Equation 7]}$$

Then, the above-mentioned expression is deduced to the expression shown by the following Equation 8.

[Equation 8]

$$\text{Age ratio} = \frac{\text{Derivation equation for positive relative accommodation power at arbitrary age read from Peters diagram}}{(-2)} \qquad \text{[Equation 8]}$$

Furthermore, although the magnitude of correction is minute, correction is carried out for compensating the difference in the reference position of the relative accommodation power between the Peters diagram and the Donders diagram. The reference position of the Peters diagram is the back vertex of a lens similarly to the reference position of S dioptric power and C dioptric power. The reference position of the Donders diagram is the eyeball rotation center. Then, correction is carried out so that the positive relative accommodation power from the Peters diagram is brought to coincide with the reference position of the Donders diagram. When LVR is taken to denote the distance (>0) of the eyeball rotation center from the back vertex of a spectacle lens, the age ratio is expressed by the formula indicated by the following Equation 9.

[Equation 9]

$$\text{Age ratio} = ((\text{Peters positive relative accommodation power})/(-2)) \times (1/(1 - LVR \times \text{Peters positive relative accommodation power})) \qquad \text{[Equation 9]}$$

Using the age ratio, when the relative accommodation power at an arbitrary age and at an arbitrary convergence angle is derived, the following equations are formed.

Positive relative accommodation power at an arbitrary age at an arbitrary convergence angle=(age ratio)×(positive relative accommodation power at an arbitrary convergence angle).

Negative relative accommodation power at an arbitrary age at an arbitrary convergence angle=(age ratio)×(negative relative accommodation power at an arbitrary convergence angle).

In the case where the convergence angle is either zero or small, since LVR is small compared with the distance from the eyeballs to the gaze point, correction is minute. However, when the convergence angle increases as large as approximately 2 or 10, the above-mentioned correction becomes effective. Incidentally, in this case, the upper ends of the Donders curves at respective age levels are restricted according to the following expressions;

Ages under 53.3

Accommodation power=14−0.23×age

Ages 53.3 to 75

Accommodation power=6.0−0.08×age

Ages 75 and up

Accommodation power=0

That is, it follows that the Donders diagram for people with normal vision at 75 years old indicates that the upper end of the accommodation power is 0 and the relative accommodation power is 0, namely, the distinct vision is feasible only at about the origin. By the above term "at about the origin", because the focal depth, etc. are involved as other factors, it is meant that the region of distinct vision is not exactly zero if such factors are considered.

5: Formation of Visual Acuity Function

Utilizing the above-described visual acuity function for the accommodation power 0 and the Donders diagrams at respective age levels, the aforementioned expression (1) is now formed. Since there is a requirement for the expression to be deduced to the expression (3) when the relative accommodation power is 0, an expression similar to the expression (3) is formed. First, among the aberrations caused by spectacle lenses, i.e., the power error PE and the astigmatism AS, the aberration that can be offset by the relative accommodation power on the side of a human body is the power error PE, and the astigmatism AS can not be offset. Therefore, in order that the power error in the expression (3) can be increased or decreased according to the relative accommodation power, the term PE included in the expression (3) is made in the form of (PE−AA) in which the function AA of the relative accommodation power is used. Specifically, the following mathematical expression (1d) shown by Equation 10 is obtained.

[Equation 10]

$$\text{Visual acuity function}(\log MAR) = \alpha \times \sqrt{(PE-AA)^2 + (b k \times AS/2)^2} \tag{1d}$$

As explained in paragraph [0043], the visual acuity function and Peters diagram are of the same type inverted with respect to PE=0. Therefore, the visual acuity function can be formed by defining the function AA of relative accommodation power in a suitable form so that the visual acuity function inverted with respect to PE is deduced to the Peters diagram.

Summarizing the characteristics of the visual acuity function explained herein above, the following two points may be cited.

(i) When the positive relative accommodation power and negative relative accommodation power become 0, the expression (3) results.

(ii) By defining the function AA of relative accommodation power in a suitable form, the Peters diagrams for the ages of 10, 30, and 50 at the convergence angle 0 are brought to be in agreement with the visual acuity function inverted with respect to PE.

In addition, the visual acuity function is not limited to the functional form expressed by the expression (1d) shown by the above-described Equation 10. It can be modified through rather simple derivation as expressions (1e) and (1f) shown by the following Equations 11 and 12, respectively. However, it remains that the visual acuity function is a function including relative accommodation power.

[Equation 11]

$$\text{Visual acuity function}(\log MAR) = \beta \times \sqrt{(\delta \cdot (PE-AA)^2) + (\epsilon \times AS/2)^2} \tag{1e}$$

[Equation 12]

$$\text{Visual acuity function}(\log MAR) = \phi \times \sqrt{\phi \cdot (PE-AA)^2 + AS^2} \tag{1f}$$

Furthermore, the functional form in terms of concrete relative accommodation power AA is derived. The range of the power error PE is divided into three regions, and the concrete form of AA is obtained in respective regions.

Region 1: Not over effective positive relative accommodation power (referred to as PRAe)
  AA=Effective positive relative accommodation power
Region 2: Equal to or over effective positive relative accommodation power and not over effective negative relative accommodation power (referred to as NRAe)
  AA=PE
Region 3: Equal to or over effective negative relative accommodation power
  AA=Effective negative relative accommodation power The region 2 herein is the area where the power error PE caused by spectacle lenses can be offset by the relative accommodation power. To give a supplementary remark, if both the effective positive relative accommodation power and effective negative relative accommodation power are 0, AA=0 in every region. At this point, the difference in the visual acuity function between the case where AA determining the above-mentioned regions 1 through 3 is the effective positive relative accommodation power and effective negative relative accommodation power and the case where AA determining the above-mentioned regions 1 through 3 is merely the positive relative accommodation power and negative relative accommodation power is defined as the phenomenon of physiological astigma. Herein below, explanation is given with respect to the wording of "effective" expressing the phenomenon of physiological astigma in the effective positive relative accommodation power and effective negative relative accommodation power in the above-described range.

Below, the following items will be explained in order.
(1) Area of comfort
(2) Accommodation effect of spectacle lens
(3) Explanation with respect to definition of visual acuity function at back vertex of lens
(4) Relation between astigmatism AS and visual acuity degradation
(5) Physiological astigma in positive relative accommodation power (1) Area of Comfort The measurement of the relative accommodation power under the condition of a fixed convergence angle (FU) starting from the Donders line to the top Donders curve and bottom Donders curve corresponds to the measurement of limiting values of the accommodation, and it is known that discomfort and/or eye fatigue will be caused in the vicinity of the limiting values. The tolerance level thereof is known to vary considerably depending on individual and on physical conditions even for the same individual. However, if it is within the range of the convergence limit in short-time presentation, it is suitably utilized for design. Here, the convergence limit in short-time presentation refers to a range in which, when an index is presented for a short period of time (in the range from 0.05 to 0.7 second), relative accommodation or relative convergence is feasible (see page 5 of Reference Material No. 5-3 of Vision Information Research Forum, by Toyohiko Hatada, published on April 23 in Showa 49 by NHK Science and Technical Research Laboratories).

The convergence limit in short-time presentation is approximately two-thirds of relative accommodation power. In addition, the region within approximately one-third of the relative accommodation power (in the present case, between the Donders top curve and the Donders bottom curve) is called an area of comfort (also known as a Percival region), and is further suitable for design. This area of comfort is used for design. Taking the above-mentioned value ranging from ⅔ to ⅓ as the area of comfort coefficient, correction can be made by multiplying the aforementioned positive relative accommodation power and negative relative accommodation power by the coefficient. Here, the area of comfort within approximately ⅓ of the relative accommodation power is a region in the region interposed by the above-mentioned two Donders curves, and is a central region within ⅓ of the interposed region, preferably, a region, with the Donders line placed at the center, within ⅓ of the region interposed by the above-mentioned Donders curves. Furthermore, the area may alternatively be taken as the central region within ¼ of the region interposed by the above-mentioned Donders curves, preferably, with the Donders line placed at the center, within ¼ of the region interposed by the above-mentioned Donders curves. In more concrete terms, the area of comfort refers to following region.

That is, in FIG. 11, a point where an arbitrary straight line parallel to the vertical axis intersects the Donders line is denoted as d0; a point where the arbitrary straight line intersects the Donders top curve is denoted as d1, and a point where the arbitrary straight line intersects the Donders bottom curve is denoted as d2, respectively. Then, when a point that is separated from d0 by d0d1/3 toward d1 on the line segment d0d1 connecting d0 and d1 is denoted as d11; and a point that is separated from d0 by d0d2/3 toward d2 on the line segment d0d2 connecting d0 and d2 is denoted as d12; the aforementioned region corresponds to the region that is interposed between the curve drawn by the point d11 and the curve drawn by the point d12.

When the above-mentioned areas of comfort are indicated according to the Donders diagram at respective age levels, these are shown in FIGS. 12 through 15. Respectively shown are in FIG. 12 the area of comfort for the people of ages 5 to 15, in FIG. 13 the area of comfort for the people of ages 25 to 35, in FIG. 14 the area of comfort for the people of ages 45 to 55, and in FIG. 15 the area of comfort for the people of the age 75. In the present examples, the case is shown where the area of comfort is assumed to be within ⅓ of the relative accommodation power. As mentioned previously, it follows that for the people of normal vision at 75 years old, the upper limit of accommodation power is 0 and the relative accommodation power is also 0, namely, the distinct vision is feasible only at about the origin.

(2) Accommodation Effect of Spectacle Lenses

The explanation hereinabove on the relative accommodation power has been presented on the cases of naked eyes, and the well-known effect, "accommodation effect of spectacle lenses", in which the effect of accommodation changes compared with the naked eyes by wearing spectacle lenses, is necessary as correction. The amount of the correction is denoted as the correction coefficient of the accommodation effect of spectacle lenses. When the distance (>0) between the eyeball rotation center and the back vertex of a spectacle lens is denoted as LVR, and the dioptric power of the spectacle lens as Doav (S dioptric power, S+C dioptric power, or average dioptric power S+C/2), the correction coefficient is expressed by the following mathematical expression (8) shown by Equation 13.

[Equation 13]

$$\text{Correction coefficient of accommodation effect of spectacle lens} = 1/(1+2 \times LVR \times Doav) \quad (8)$$

The correction is carried out by multiplying the aforementioned positive relative accommodation power and negative relative accommodation power by this correction coefficient.

(3) Explanation with Respect to Definition of Visual Acuity Function at Back Vertex of Lens Since the visual acuity function is defined with respect to the back vertex of a lens, explanation is needed on that point and also, since correction of the reference position is needed because of that, those points will be explained. Prior to initiating the explanation, in order to summarize correction so far described regarding the relative accommodation power, such as the age ratio, area of comfort coefficient, and correction coefficient of the accommodation effect of a spectacle lens, the relative accommodation power is set as the corrected relative accommodation power. The corrected positive relative accommodation power (PRAd) and corrected negative relative accommodation power (HNRAd) are respectively expressed by the following relations.

$$\text{Corrected positive relative accommodation power}\\(PRAd) = \text{age ratio} \times \text{area of comfort coefficient} \times \\ \text{correction coefficient of the accommodation}\\ \text{effect of spectacle lens} \times PRA \quad (9)$$

$$\text{Corrected negative relative accommodation power}\\(NRAd) = \text{age ratio} \times \text{area of comfort coefficient} \times \\ \text{correction coefficient of the accommodation}\\ \text{effect of spectacle lens} \times NRA \quad (10)$$

Since the corrected relative accommodation power is defined with respect to the eyeball rotation center as the reference position, the reference position is converted into the back vertex of the spectacle lens as the reference position of the visual acuity function. The converted relative accommodation power is denoted as the effective relative accommodation power. The effective positive relative accommodation power (PRAe) and effective negative relative accommodation power (NRAe) are deduced to the following mathematical expressions (11) and (12) shown by Equations 14 and 15, respectively.

[Equation 14]

$$PRAe = PRAd/(1+LVR \times PRAd) \quad (11)$$

[Equation 15]

$$NRAe = NRAd/(1-LVR \times NRAd) \quad (12)$$

Using the effective positive relative accommodation power (PRAe) and effective negative relative accommodation power (NRAe), the function of AA is obtained. It is understood by the above explanation that the functional form of the visual acuity function expression (1) can be obtained.

(4) Relation Between Astigmatism AS and Visual Acuity Degradation

With increase of astigmatism AS, degradation of visual acuity is corrected. The following correction is carried out to cause the visual acuity function to further coincide with the Peters diagram. When explained specifically, by expressing the visual acuity function, which includes the power error PE with the inverted sign, in terms of C dioptric power on the vertical axis and S dioptric power on the horizontal axis, and by further converting the visual acuity function, being in units of log MAR, into the decimal visual acuity, the visual acuity function is compared with the Peters diagram. The visual acuity functions described in embodiments, etc. are all expressed in terms of the above-mentioned representation. At this point, according to a result of the comparison, a correction coefficient ck is introduced to cause the visual acuity function to further coincide with the Peters diagram. This coefficient is adapted to express the trend that the visual acuity degrades with increasing astigmatism AS. First, a calculated mean value is denoted as c0. Here, bk is the function of age related to the astigmatism AS included in the visual acuity function, described earlier in paragraph. The coefficient c0 is expressed by the following expression (13) shown by Equation 1.

[Equation 16]

$$c0=-4/bk \quad (13)$$

The coefficient ck is expressed by the following expression. When the absolute value of AS is smaller than the absolute value of c0 and AS is negative, the coefficient ck is expressed by the following expression (14) shown by Equation 17.

[Equation 17]

$$ck=1-AS/c0 \quad (14)$$

In other regions, it is deduced to the relation $$ck=0 \quad (15).$$

The correction is carried out by multiplying the coefficient ck by the effective positive relative accommodation power (PRAe) and effective negative relative accommodation power (NRAe). Since this coefficient ck is effective even on the left-hand side of Peters diagram, i.e., even with minute relative accommodation power (0.3 D and below), the coefficient is assumed to have the characteristics of depending very little on the accommodation power and of depending only on astigmatism AS. Therefore, it is distinguished from an optically strange phenomenon such as physiological astigma. In addition, when there is no relative accommodation power, ck is equivalent to 0 as seen from forthcoming expressions (19) and (20).

(5) Physiological astigma in positive relative accommodation power

In the next place, correction of the physiological astigma in positive relative accommodation power will be explained. A coefficient ckp is taken herein as the correction coefficient for describing the physiological astigma (i.e., the phenomenon that the visual acuity is better when slight astigma is present in the region not exceeding the positive relative accommodation power, although the reason is yet to be known). The aforementioned FIG. 9 is the drawing obtained by extracting the phenomenon of physiological astigma from the Peters diagram (for the age level 5 to 15). As understood from FIG. 9, the visual acuity is improved approximately at −0.75 D. As the central value for explaining the phenomenon of physiological astigma, this astigmatism value (approximately −0.75 D) is introduced, which yields specifically good visual acuity because of the phenomenon of physiological astigma. The calculated mean value is denoted as c1. The value c1 is expressed by the mathematical expression (16) shown by Equation 18.

[Equation 18]

Ages 53.3 and under $$c1=(\text{central value})/c0+0.05-1.05\times(1-\text{age}/53.3),$$

Ages 53.3 to 75

$$c1=((\text{central value})/c0+0.05)\times(75-\text{age})/21.7),$$

and

Ages 75 and up $$c1=0 \quad (16)$$

In addition, the value of c1 is in the range from 0 to 1.2 depending on age. By using this calculated mean value c1, the coefficient ckp when the absolute value of astigmatism AS is larger than the absolute value of physiological astigma and the absolute value of astigmatism AS is smaller than c0 is obtained. The following expression (17) shown by Equation 19 is obtained.

[Equation 19]

$$ckp=c1\times(AS-c0)/((\text{central value})-c0) \quad (17)$$

In addition, reversely, the coefficient ckp when the absolute value of astigmatism AS is small and the astigmatism AS is negative is obtained. The following expression (18) shown by Equation 20 is obtained.

[Equation 20]

$$ckp=c1\times AS/(\text{central value}) \quad (18)$$

In other regions it is taken as ckp=0. By adding ckp to ck and multiplying (ck+ckp) by the effective positive relative accommodation power (PRAe), the intended function AA is obtained. Similarly, regarding ckm corresponding to ckp on the side of negative relative accommodation power, ckm simply becomes 0, which is understood as that this is due to that in the Peters diagram the value of the negative relative accommodation power is very small (0.3 D or less) in the case of distant vision. In a similar manner, by adding ckm to ck, and multiplying this value (ck+ckm) by the effective negative relative accommodation power, the intended function AA is obtained.

$$AA=(ck+ckp)\times PRAe \quad (19)$$

$$AA=(ck+ckm)\times NRAe \quad (20)$$

The term, ck+ckp, as the numerical limitation of coefficients of PRAe and NRAe, has the feature of reaching the maximum at the central value (approximately −0.75 D) and is in the range from 0 to 2.2, and ck is in the range from 0 to 1. As mentioned herein above, so as to be simply derived from paragraph, the function AA has been obtained as the function of the positive relative accommodation power (PRA) and effective negative relative accommodation power (NRA), which are in turn the functions of age. By replacing AA in the expression (1d), the aforementioned mathematical expression (1) shown by Equation 1 is deduced.

In addition, AA and bk included in the expression (1) are not limited to the function of age. Although considerable scattering of relative accommodation power (RA) is found in individuals, it is the function of age after averaging. As a result, in order to carry out individual designs for respective persons, it becomes more suitable designing to actually measure the positive relative accommodation power (PRA) and negative relative accommodation power (NRA), and subsequently perform the designing according to the expression (1). Specifically, it is only necessary to obtain ck, ckp, and ckm as the function of PRA and NRA. Since ck, ckp, ckm, etc. are the function of age, by eliminating the term of age through simple calculation, the expression (1) can be obtained as the function of PRA and NRA that are independent of age. In concrete terms, bk is obtained as the following equation.

$$bk=1-0.07\times(\text{larger one of absolute value of } PRA \text{ and absolute value of } NRA)$$

With thus obtained bk and the aforementioned expressions (13) and (14), c0 and ck are obtained.

The parameters C1 on the side of positive relative accommodation power are expressed for respective age levels by the expressions indicated by the following Equation 21.

Ages 53.3 and under $c1 = (\text{central value})/c0 + 1.1 - 0.6459 \times (\text{absolute value of PRA})$, [Equation 21]

Ages 53.3 to 75

$c1 = 1.15 \times ((\text{central value})/c0 + 0.05)) \times (\text{absolute value of PRA})$, and Ages 75 and up $c1 = 0$.

The term $c1$, as the numerical limitation, is in the range from 0 to 1.2 depending on the positive relative accommodation power and negative relative accommodation power. In addition, the situation is similar on the side of the negative relative accommodation power side, and the calculation of ckp and ckm is also carried our in a similar manner. As a result, the function AA as the function not of age but of PRA and NRA is obtained, and furthermore the expression (1) is derived. As mentioned above, the visual acuity function including physiological astigma for more suitable individual design has been obtained.

Incidentally, in the above examples although the correction coefficient for describing physiological astigma is derived using the relative accommodation power and age, the method of deriving the correction coefficient for describing physiological astigma is not limited to those in the examples. For example, it is also feasible to measure physiological astigma directly by a measurement method that is similar to the aforementioned measurement method with respect to the Peters diagrams and to derive the correction coefficient based on the measurement values thereof.

[2] Method for Designing and Manufacturing Spectacle Lens

In the next place, embodiments of the method for designing and manufacturing spectacle lenses according to the present invention will be explained. The method for designing spectacle lenses according to the embodiments of the present invention includes the step of carrying out optimization calculation using, for the evaluation function, the visual acuity function including physiological astigma as a factor. Specifically, as shown, for example, in a flowchart of the method for designing spectacle lenses according to the present embodiment, illustrated in FIG. 16, first, the following pieces of information are inputted (step S1).

a. Data of Lens Materials

Specifically, the three-dimensional shapes, refractive indices, Abbe numbers, and so forth of spectacle lenses.

b. Shape Data Based on the Usage Relating to Prescription

S dioptric power and C dioptric power as the prescription dioptric power, astigmatic angle, prism degree, prism angle, prescription distance for distinct vision, and so forth.

c. Central Thickness

To be inputted only for a positive lens.

d. Data on the Shapes of Eyes and Face

Specifically, lens forward tilting angle, lens convergence angle, PD (interpupillary distance), VR (distance between the eyeball rotation center and the back vertex of a spectacle lens) and so forth.

e. Measured Values of Accommodation Power and Relative Accommodation Power f. Age, and Correction Coefficients (bk, ckp, ckm, etc.) Determined by Age Thereafter, those pieces of information are substituted into the above-mentioned expression (1) and the visual acuity function is calculated (step S2). Specifically, necessary optical performance values such as astigmatism and so forth are obtained for each evaluation point of the spectacle lens using the well-known ray tracing method and so forth, and these values are substituted into the above-mentioned visual acuity function of the expression (21). The visual acuity function is herein expressed in units of log MAR, namely, the value 1.0 (normal vision) in the decimal visual acuity is 0.0 in log MAR unit.

Next, optimization calculation is carried out using the damped least squares method and so forth so that the value obtained from the calculation of visual acuity function, i.e., the value of the evaluation function, is rendered minimum. Specifically, for example, it is determined whether the value obtained as above is equal to a predetermined threshold value or below (step S3).

At this point, if the value of the visual acuity function is determined not to be equal to the predetermined threshold value or below (the case of NO in step S3), the shape data, to be more specific, variable parameters of refractive plane and so forth, are corrected (step S4).

In the case where the value of the visual acuity function is equal to the prescribed threshold value or below (the case of YES in step S3), it is determined whether the evaluation of the whole lens surface has been completed (step S5).

If the evaluation of the whole lens surface has not been completed and the calculation on other evaluating points remains (the case of NO in step S5), the process returns to step S1, and optical performance values at another position of the lens are inputted.

If the evaluation of the whole lens surface is completed at all predetermined evaluation points (the case of YES in step S5), the evaluation process ends and optical design values of the whole lens surface are determined (step S6).

Through the above-mentioned steps, the method for designing spectacle lenses according to the present embodiment is completed.

The information inputted in step S1 is not limited to the information mentioned above, and it is also possible to input other information to be added to the calculation of the visual acuity function.

Moreover, by processing lenses based on thus determined optical design values, spectacle lenses are manufactured. There is no doubt at this point that maker's original shape parameters and/or other shape parameters such as correction coefficients, etc. defined by the factory (manufacturing equipment) may be further added.

And then, by subsequently processing the rear face of the lens surfaces based on the determined optical design values, spectacle lenses can be manufactured.

[3] Spectacle Lens Manufacturing System

In the next place, the spectacle lens manufacturing system according to an embodiment of the present invention will be explained. FIG. 17 is a schematic diagram illustrating the spectacle lens manufacturing system according to the present embodiment.

As illustrated in FIG. 17, the system 10 is provided, on the side of a spectacles store 100, with a measurement equipment 101 configured to measure visual acuity, accommodation power, and relative accommodation power of a person placing an order of spectacle lenses; and an ordering party side computer 102 having the function of inputting various kinds of information including the values measured by the measurement equipment and performing processing necessary for placing the order of spectacle lenses.

On the other hand, for example, in a lens maker 200 on the side of receiving orders, a manufacture side computer 201 connected to a communication line 300 such as the Internet and so forth is provided in order to receive information outputted by the ordering party side computer 102. The manufacture side computer 201 has the function of performing processing necessary for receiving orders of spectacle lenses and also has the function of implementing the spectacle lens design method explained earlier with reference to FIG. 16. Namely, in the information required for designing spectacle lenses ordered from the ordering party side computer 102, the information including a factor representing physiological astigma, specifically, for example, measured values of the relative accommodation power and age, are included. When the physiological astigma is directly measured, the measured values thereof are included. The manufacture side computer 201 carries out optimization calculation using the visual acuity function including the factor representing physiological astigma as the evaluation function to thereby determine optical design values, and outputs the manufacture information for manufacturing spectacle lenses based on the optical design values to a lens processing equipment 202.

Note that the information inputted to the manufacture side computer 201 is not limited to the information shown in step S1 of FIG. 16 as mentioned above, ant it is also possible to input other information to be added in the calculation of the visual acuity function. Moreover, spectacle lenses are manufactured by processing lenses based on the determined optical design values, and there is no doubt that at this time, maker's original shape parameters and/or other parameters such as correction coefficients defined by the factory (manufacturing equipment) may be further added.

FIG. 18 is a functional block diagram for illustrating the function of the manufacture side computer 201 as the core of the spectacle lens manufacture system of the present embodiment.

As shown in FIG. 18, the manufacture side computer 201 is provided with a data input section 203 configured to input various data transmitted from the ordering party side computer 102, a visual acuity function calculating section 204 configured to calculate the visual acuity function based on the inputted data, an evaluation function optimization section 205 configured to calculate the optimization by utilizing the visual acuity function as an evaluation function, and a visual acuity function evaluation section 206 configured to compare the obtained value of the visual acuity function with a predetermined threshold value. Furthermore, also included are a design data correcting section 207 configured to correct design data such as, for example, lens shape data in the case where the optical performance need to be corrected as a result of the evaluation by the visual acuity function evaluation section 206, an optical design value determination section 208 configured to determine optical design values when the evaluation at each evaluation point ends, and a design data output section 209 configured to output the design data based on the optical design values to the lens processing equipment 202.

The measurement equipment 101 in the spectacles store 100 shown in FIG. 17 measures the visual acuity, accommodation power, and relative accommodation power of the person placing the order of spectacle lenses, performs predetermined processing on the measurement results with the ordering party side computer 102, and sends processed data to the lens maker 200 through the communication line 300.

The computer 201 (manufacture side computer) on the side of the lens maker 200 inputs data regarding lens materials, shape data based on the specification, data relating to the shapes of eyes and face, as well as the measured values of the relative accommodation power and so forth, that have been received by the data input section 203.

In addition, the visual acuity function calculating section 204 substitutes inputted data into the expression (21) of visual acuity function to thereby calculate the visual acuity function.

Upon calculation of the visual acuity function, the evaluation function optimization part 205 obtains, while taking the calculated visual acuity function as another evaluation function this time, necessary optical performance values such as astigmatism and so forth for each evaluation point of the spectacle lens are obtained, and thereby optimum optical performance values for each evaluation point of the spectacle lens are obtained from this evaluation function. The calculation of the optimization is carried out by the damped least squares method and so forth.

Next, in the visual acuity function evaluation section 206, the value of the visual acuity function calculated with the visual acuity function calculation section 204 is compared with a predetermined threshold value. Based on the result obtained from the comparison with the visual acuity function evaluation section 206, that is, in the case where the value of the visual acuity function does not reach the predetermined threshold, the design data correcting part 207 corrects the design data of the spectacle lens so that desirable visual acuity values may be obtained. In the optical design value determination section 208, the optical design value for each evaluation point is determined. Then at the stage of completing the evaluation on all predetermined evaluation points, thus determined optical design values over the whole lens surface are sent from the design data output section 209 to the lens processing equipment 202 shown in FIG. 17.

As the lens processing equipment 202, normal spectacle lens manufacturing equipment may be utilized, that is configured to automatically perform cutting and polish processing for the curvature of the front side or the rear side, or the both sides, of the lens, for example, based on inputted data. Since the lens processing equipment 202 is the well-known equipment as spectacle lens manufacturing equipment, the concrete explanation thereof is omitted herein.

[4] Embodiments

In the next place, the case where the evaluation is carried out by the spectacle lens evaluation method according to the above-mentioned embodiments is compared with the case where the evaluation is carried out by the conventional spectacle lens evaluation method (i.e., the method without taking the relative accommodation power into consideration). The explanation will be given in the following order.

1: Embodiment 1

The evaluation of a first spectacle lens (the example of designing a lens without taking the accommodation power into consideration).

2: Embodiment 2

The evaluation of a second spectacle lens (the example of designing only the concave plane of a lens by the spectacle lens designing method according to the present embodiment).

3: Embodiment 3

The evaluation of a third spectacle lens (the example of designing only the concave plane of a lens by the spectacle lens designing method according to the present embodiment; the lens being for use in near vision for viewing the subject having convergence angle FU=2.5 (about 40 cm ahead of eyes).

4: Embodiment 4

The evaluation of a fourth spectacle lens (progressive-power lens having progressive-power lens prescription values; S dioptric power 0.00, C dioptric power 0.00, and addition power 2.0).

1: Embodiment 1

In the first place, a first spectacle lens having an aspheric surface plane on each side, designed with the conventional visual acuity function without taking the relative accommodation power into consideration (namely, designed with the visual acuity function for ages 75 and up in the visual acuity function according to the present embodiment of the invention), was evaluated by the visual acuity function including relative accommodation power according to the present embodiment. The results obtained from the evaluation are illustrated by age as the diagrams of log MAR at +6.00 D for ages 10, 30, 50, and 75 in FIGS. 19 through 22, denoted as evaluation 10, evaluation 30, evaluation 50, and evaluation 75, respectively. In these diagrams and in the forthcoming FIGS. 23 through 38, there indicated are eyeball rotation angles in the horizontal direction on the horizontal axis and eyeball rotation angles in the vertical direction on the vertical axis, and numerical values appended to the regions encircled with dividing lines designate the values of the visual acuity function according to the present embodiment (in log MAR representation, i.e., 0.0 for normal vision).

Note that other major design parameters for the above-mentioned lens having an aspheric surface on each side are as follows.

VR (distance between the eyeball rotation center and the back vertex of a spectacle lens)=27
Convergence angle FU=0
Refractive index 1.67
Abbe number 32

Figure 22:
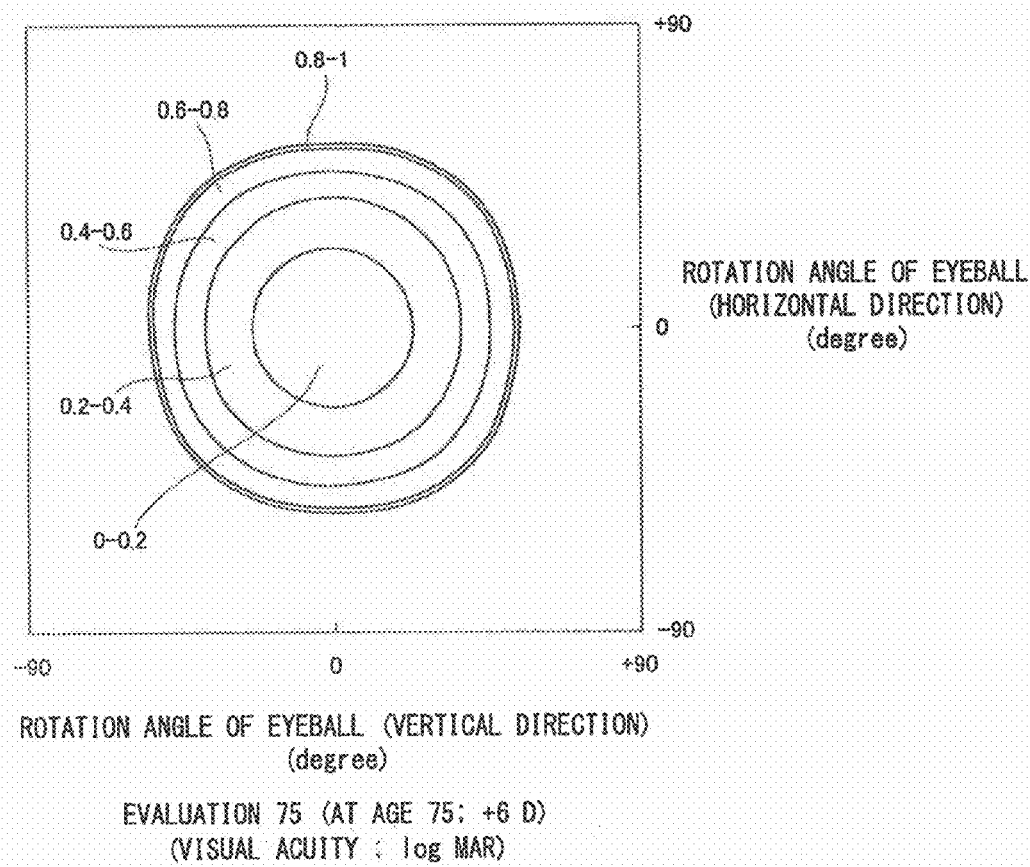
[FIG. 22] is a log MAR diagram illustrating a result obtained with respect to the age of 75 from the evaluation of the first spectacle lens utilizing the visual acuity function according an embodiment of the present invention.
Figure 23:
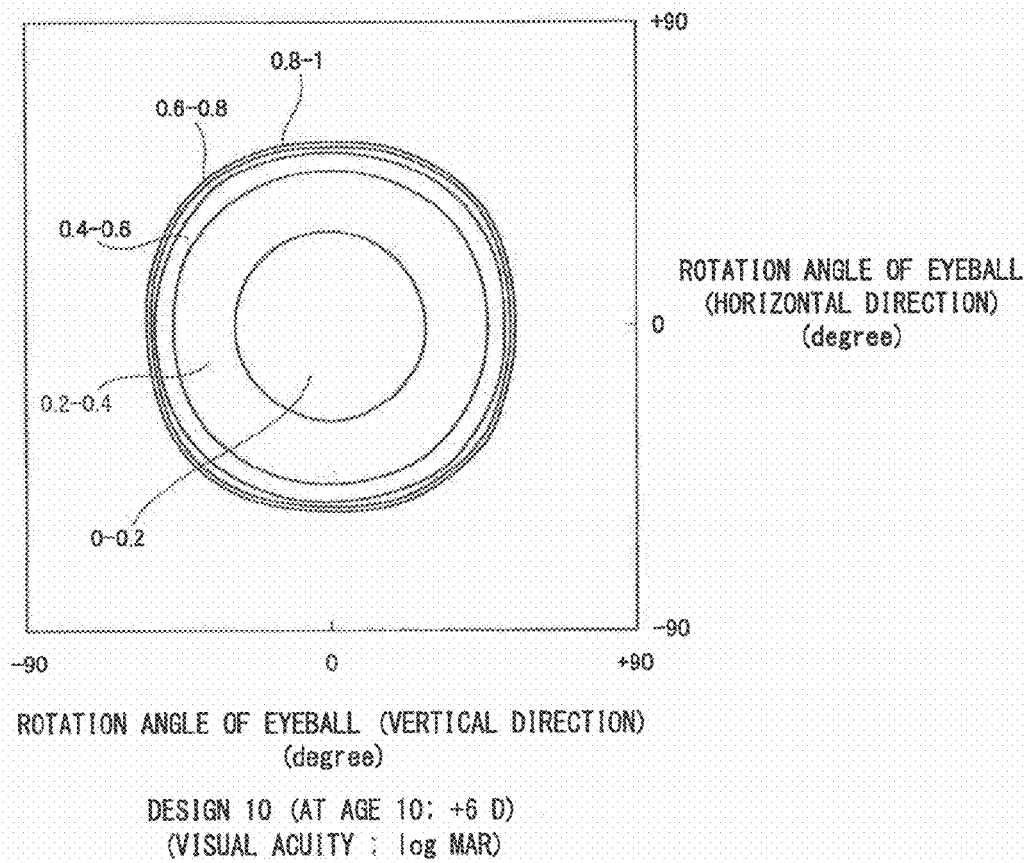
[FIG. 23] is a log MAR diagram illustrating a result obtained with respect to the age of 10 from the evaluation of a second spectacle lens utilizing the visual acuity function according an embodiment of the present invention.
Figure 24:
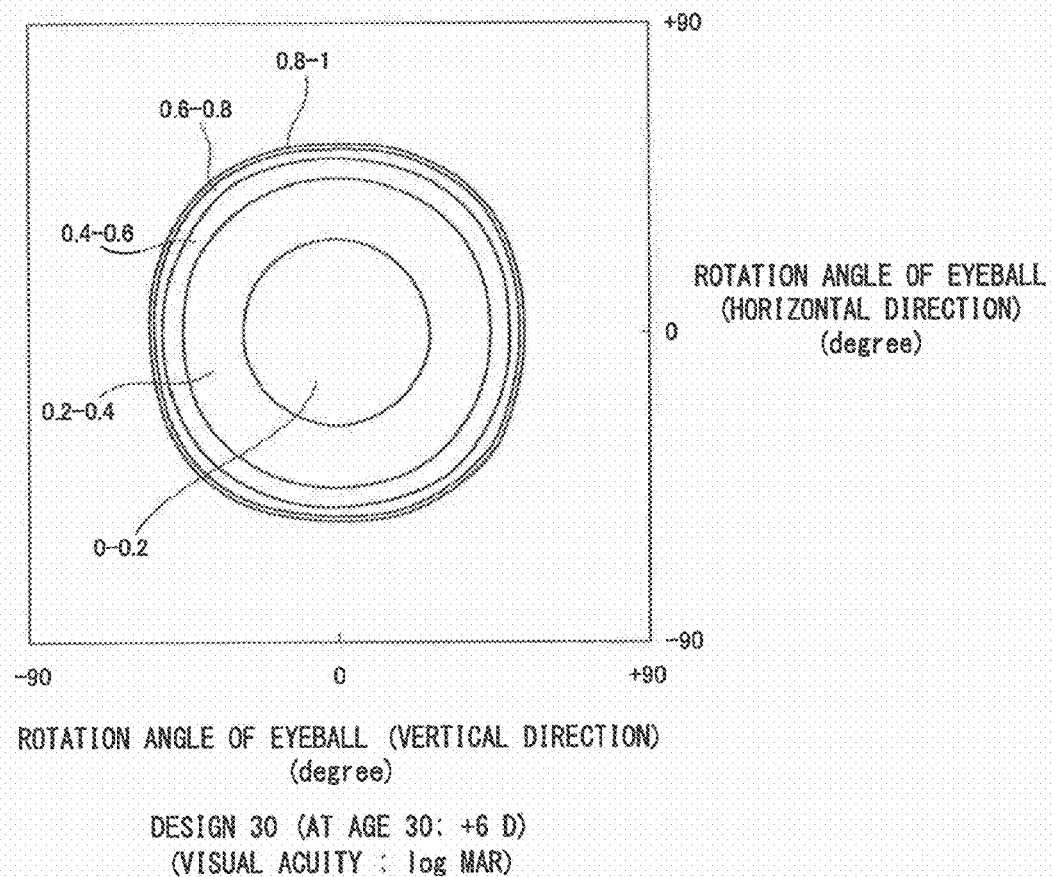
[FIG. 24] is a log MAR diagram illustrating a result obtained with respect to the age of 30 from the evaluation of the second spectacle lens utilizing the visual acuity function according an embodiment of the present invention.
Figure 25:
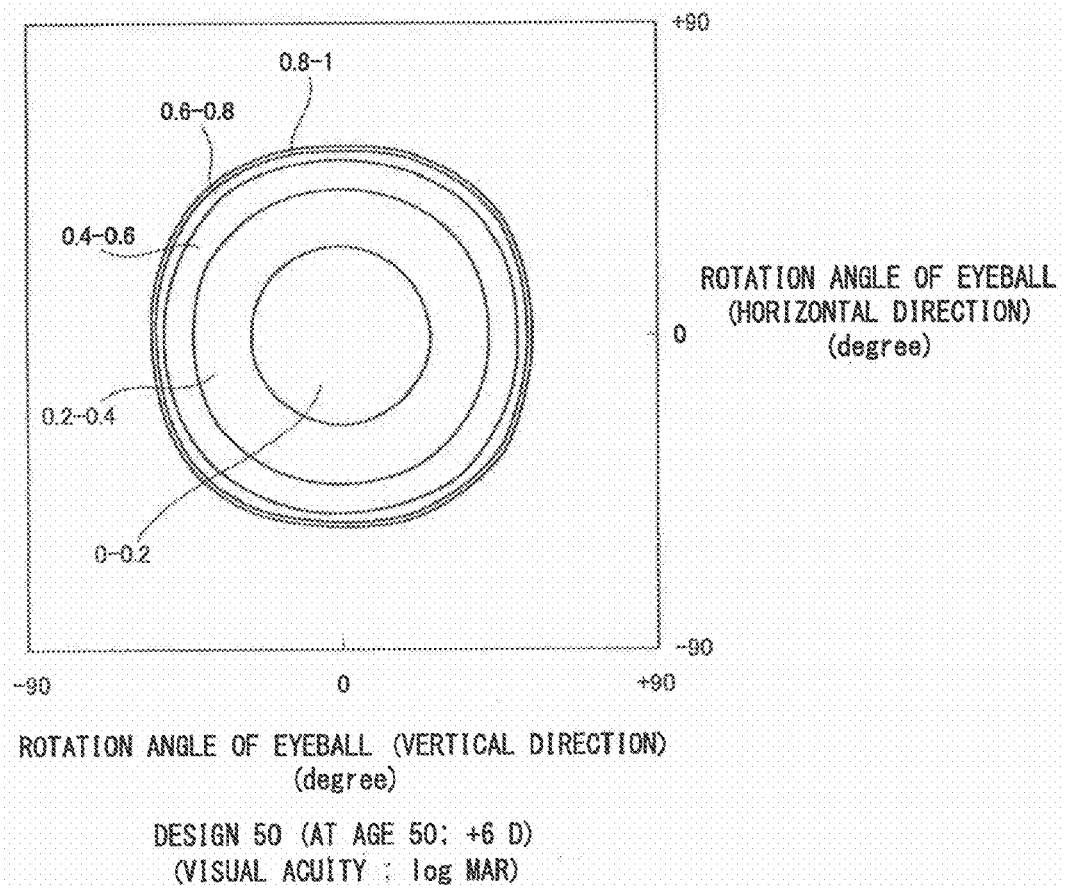
[FIG. 25] is a log MAR diagram illustrating a result obtained with respect to the age of 50 from the evaluation of the second spectacle lens utilizing the visual acuity function according an embodiment of the present invention.

First, regarding the evaluation 75 for 75 years old shown in FIG. 22, since the people of ages of 75 and up have no relative accommodation power, the present evaluation is the same as the conventional evaluation. Although the visual field is widened as the age becomes younger, the magnitude of the change is small. Here, although this is a matter of course, it is emphasized that the lens performances differ even with the same lens if the evaluation function is different.

2: Embodiment 2

Figure 26:
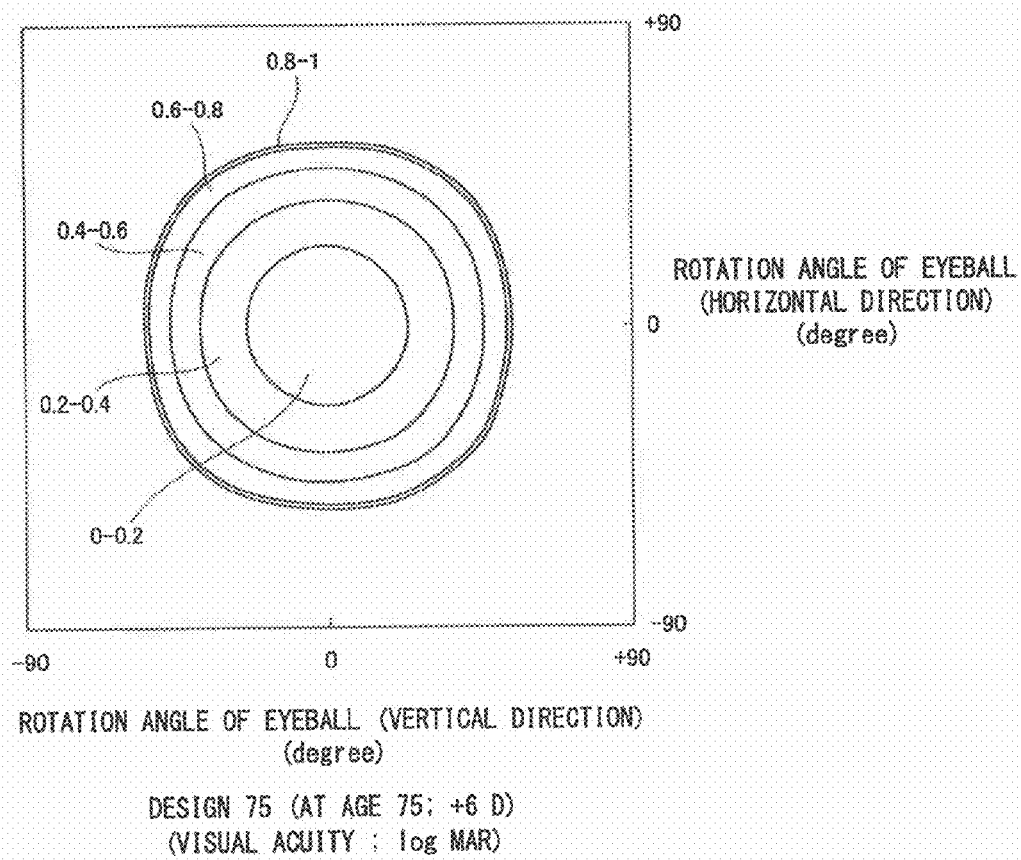
[FIG. 26] is a log MAR diagram illustrating a result obtained with respect to the age of 75 from the evaluation of the second spectacle lens utilizing the visual acuity function according an embodiment of the present invention.
Figure 27:
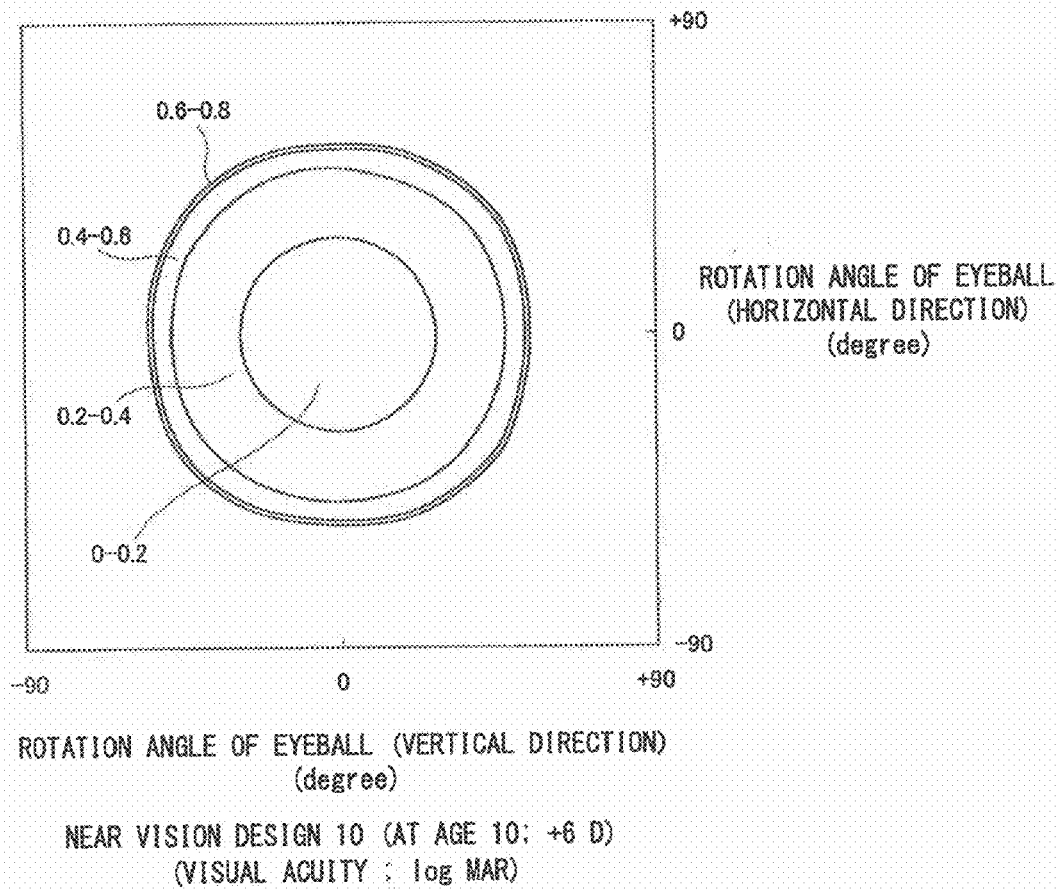
[FIG. 27] is a log MAR diagram illustrating a result obtained with respect to the age of 10 from the evaluation of a third spectacle lens utilizing the visual acuity function according an embodiment of the present invention.
Figure 28:
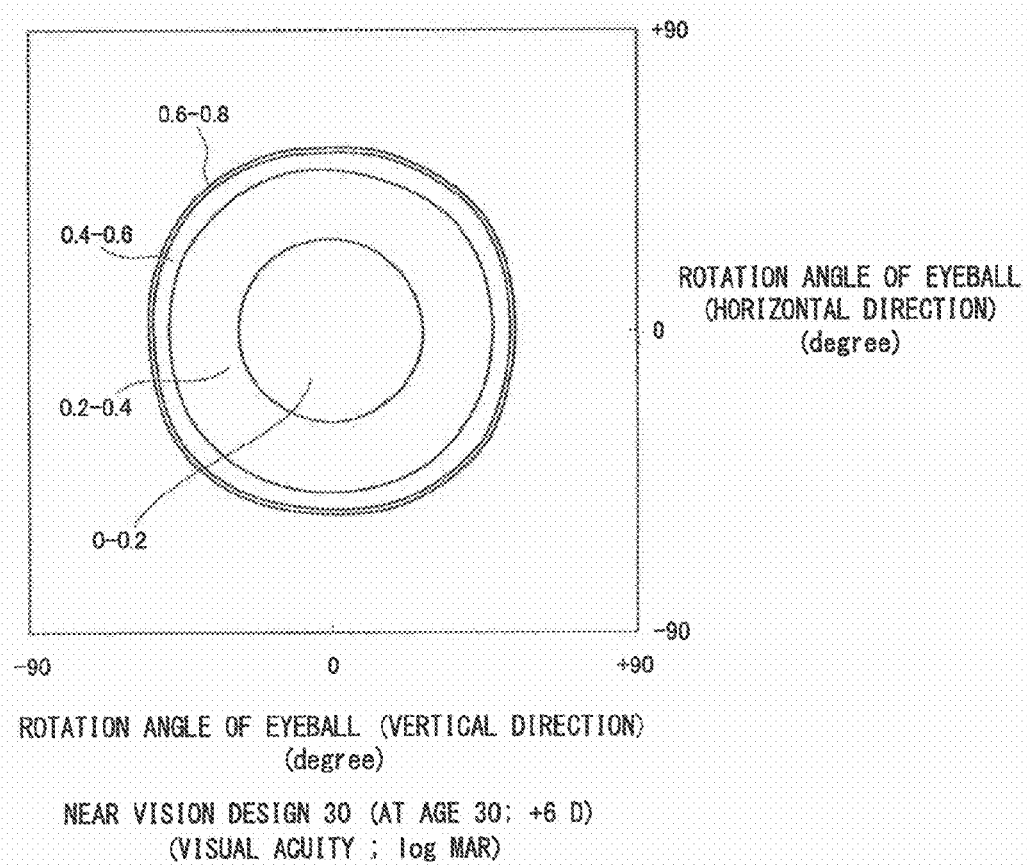
[FIG. 28] is a log MAR diagram illustrating a result obtained with respect to the age of 30 from the evaluation of the third spectacle lens utilizing the visual acuity function according an embodiment of the present invention.
Figure 29:
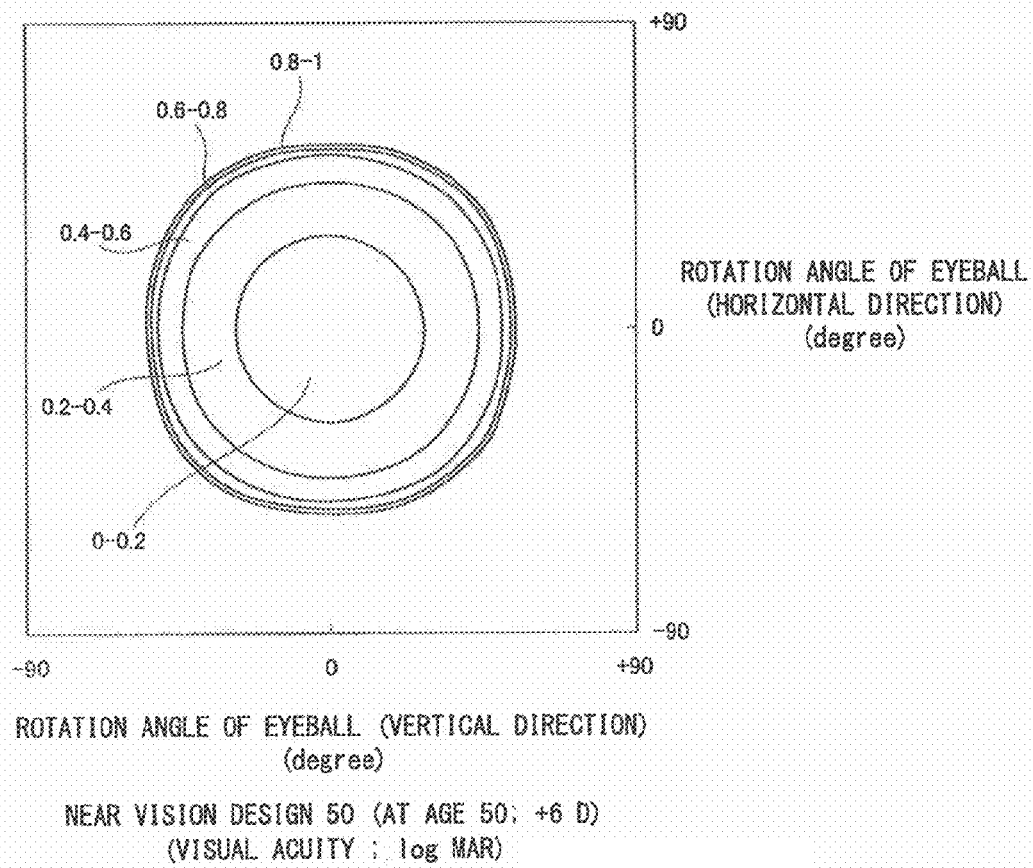
[FIG. 29] is a log MAR diagram illustrating a result obtained with respect to the age of 50 from the evaluation of the third spectacle lens utilizing the visual acuity function according an embodiment of the present invention.
Figure 30:
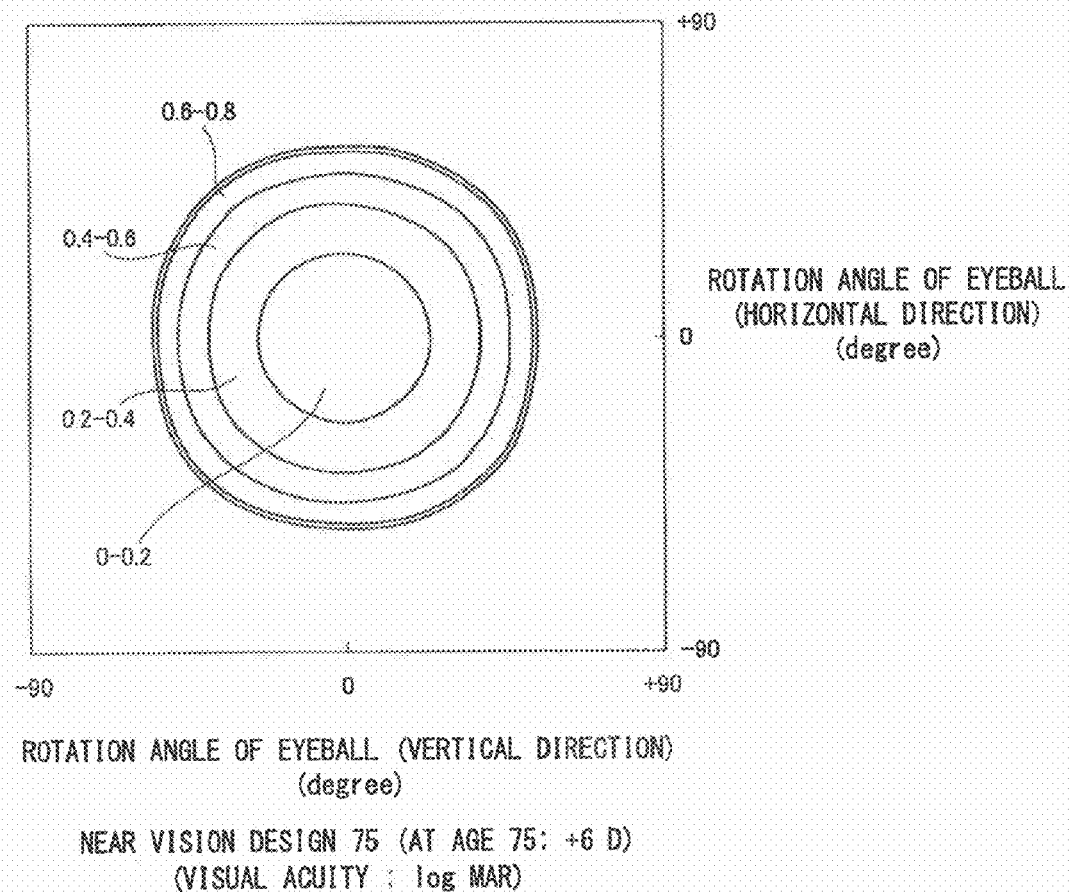
[FIG. 30] is a log MAR diagram illustrating a result obtained with respect to the age of 75 from the evaluation of the third spectacle lens utilizing the visual acuity function according an embodiment of the present invention.
Figure 31:
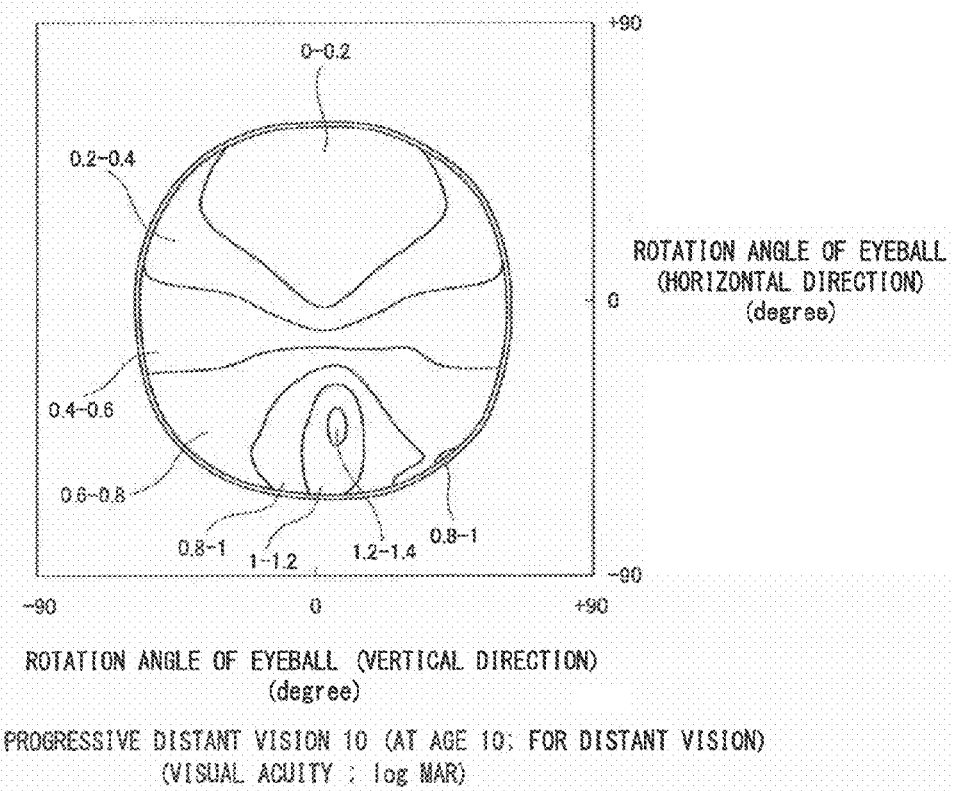
[FIG. 31] is a log MAR diagram illustrating a result obtained with respect to the age of 10 from the evaluation of a fourth spectacle lens at a long distance utilizing the visual acuity function according an embodiment of the present invention.
Figure 32:
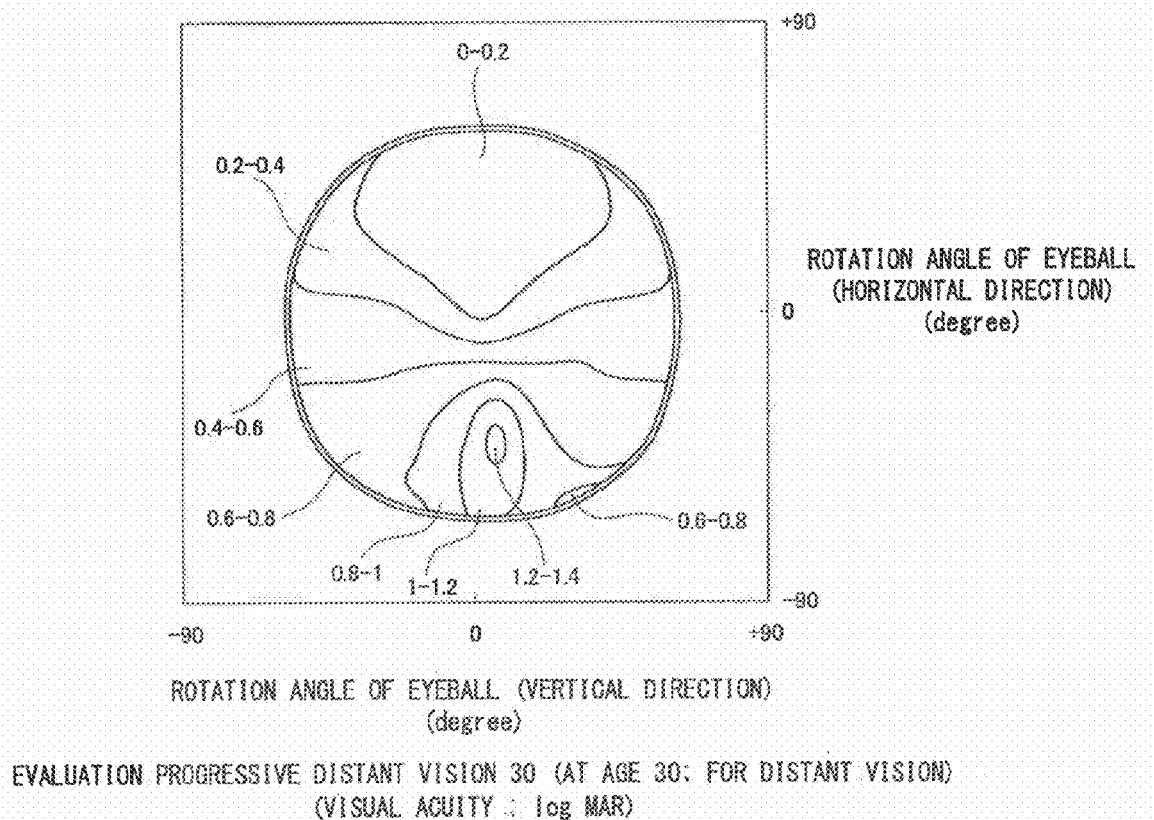
[FIG. 32] is a log MAR diagram illustrating a result obtained with respect to the age of 30 from the evaluation of the fourth spectacle lens at a long distance utilizing the visual acuity function according an embodiment of the present invention.
Figure 33:
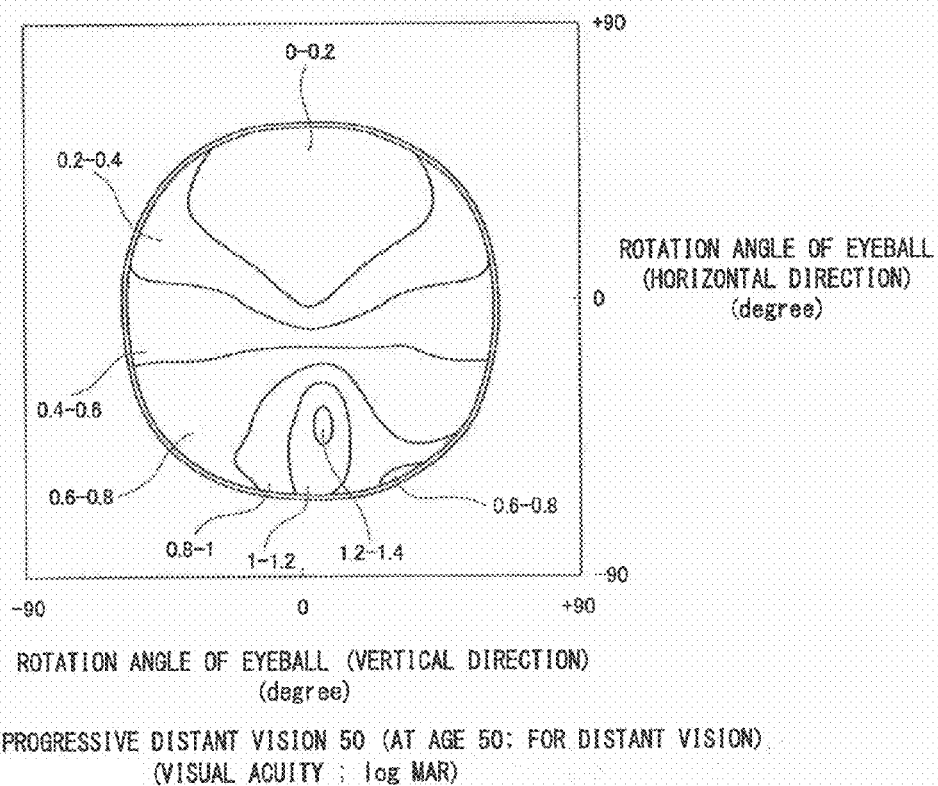
[FIG. 33] is a log MAR diagram illustrating a result obtained with respect to the age of 50 from the evaluation of the fourth spectacle lens at a long distance utilizing the visual acuity function according an embodiment of the present invention.
Figure 34:
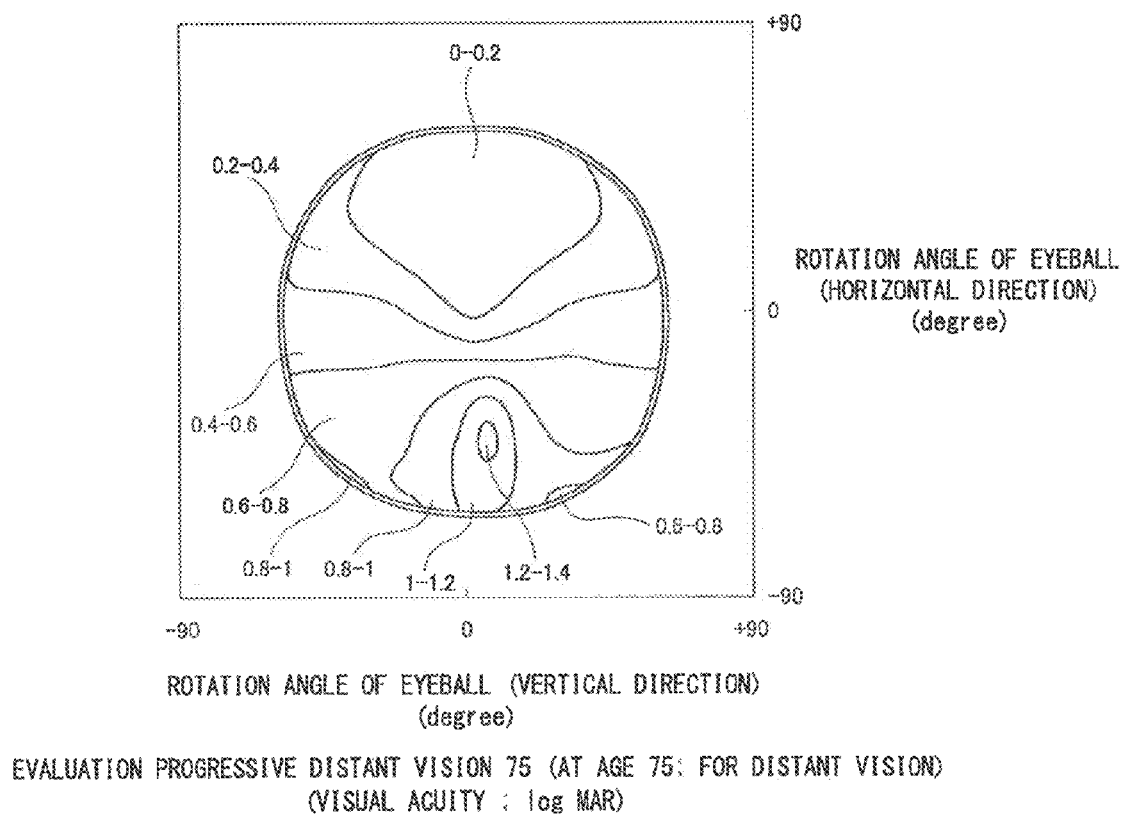
[FIG. 34] is a log MAR diagram illustrating a result obtained with respect to the age of 75 from the evaluation of the fourth spectacle lens at a long distance utilizing the visual acuity function according an embodiment of the present invention.
Figure 35:
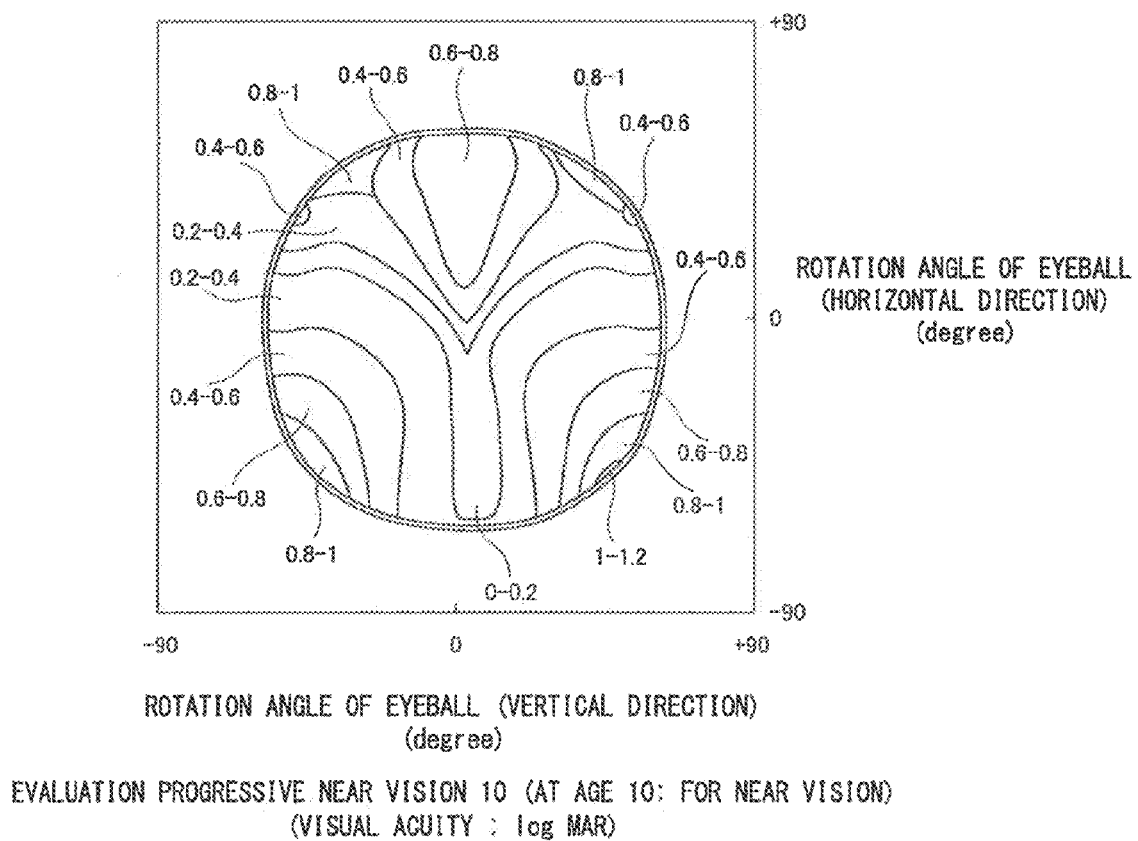
[FIG. 35] is a log MAR diagram illustrating a result obtained with respect to the age of 10 from the evaluation of the fourth spectacle lens at a short distance utilizing the visual acuity function according an embodiment of the present invention.
Figure 36:
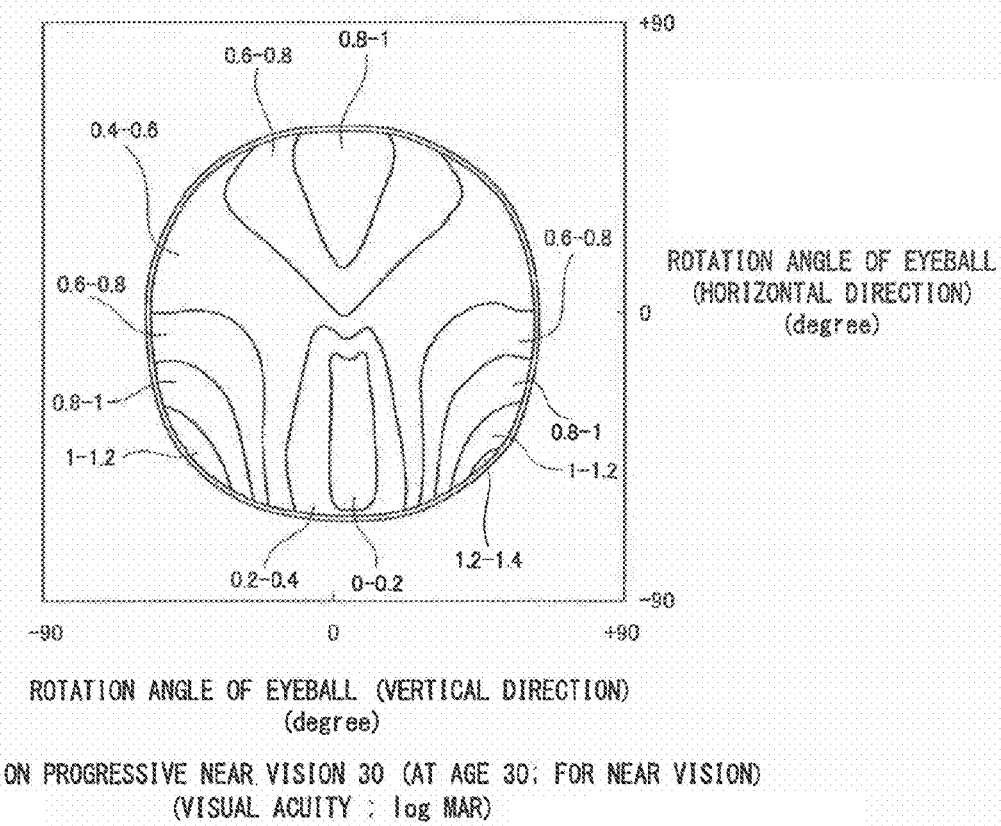
[FIG. 36] is a log MAR diagram illustrating a result obtained with respect to the age of 30 from the evaluation of the fourth spectacle lens at a short distance utilizing the visual acuity function according an embodiment of the present invention.
Figure 37:
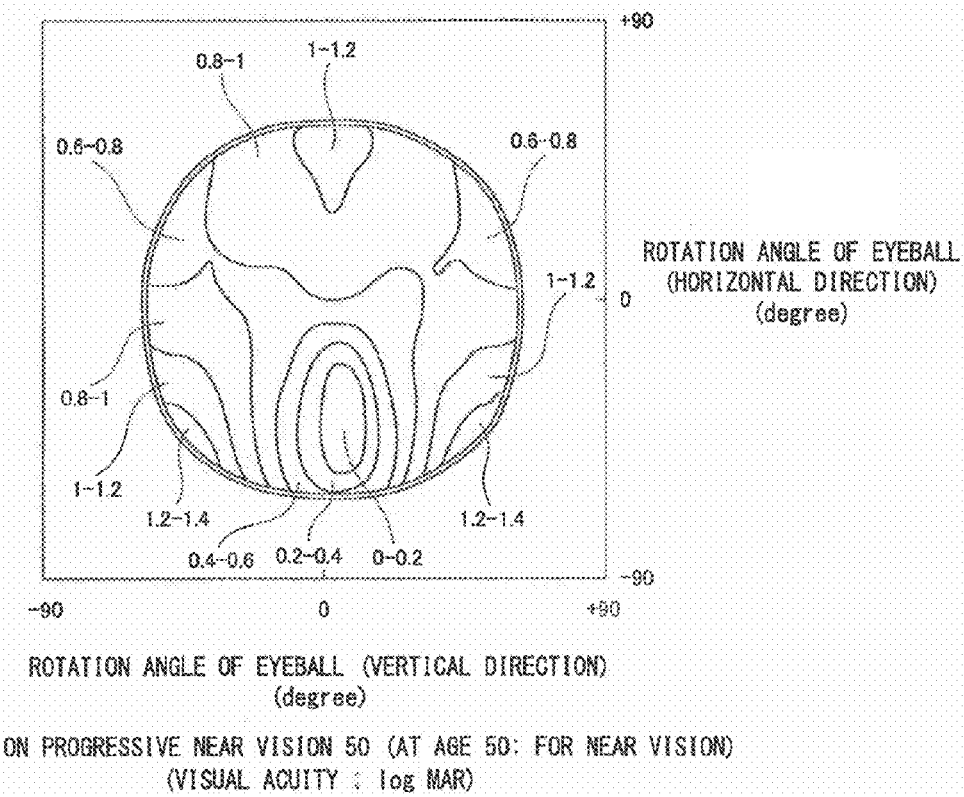
[FIG. 37] is a log MAR diagram illustrating a result obtained with respect to the age of 50 from the evaluation of the fourth spectacle lens at a short distance utilizing the visual acuity function according an embodiment of the present invention.
Figure 38:
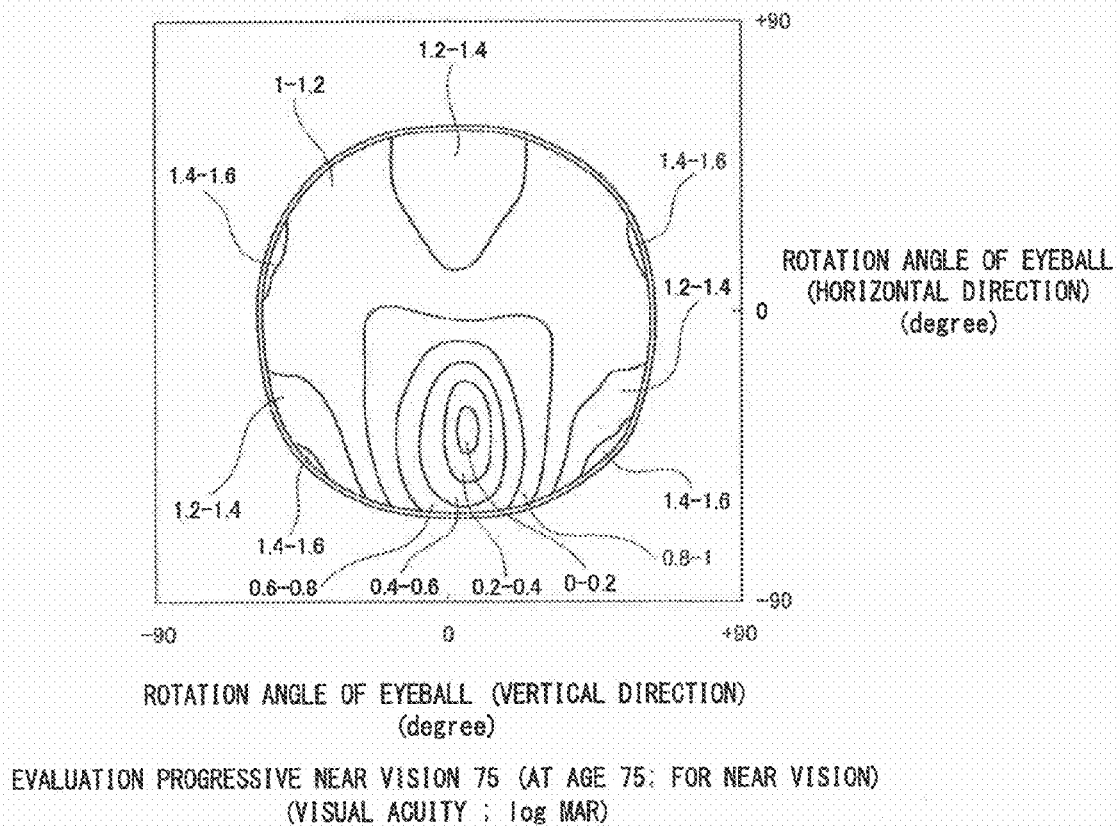
[FIG. 38] is a log MAR diagram illustrating a result obtained with respect to the age of 75 from the evaluation of the fourth spectacle lens at a short distance utilizing the visual acuity function according an embodiment of the present invention.

Next, for the purpose of easing the comparison with respect to the above-mentioned first spectacle lens, the second spectacle lens of +6.00 D was designed for ages 10, 30, 50, and 75 by forming the convex plane in the same conventional manner as above and optimizing only the concave plane utilizing the visual acuity function according to the present embodiment. The results obtained from the design are denoted as design 10, design 30, design 50, and design 75, and shown in FIGS. 23 through 26, respectively. Not surprisingly, the design 75 shown in FIG. 26 is the same as that of the evaluation 75 for the first lens. It is noticed, regarding the design 10, design 30, and design 50 shown in FIGS. 23 through 25, respectively, that the performance has been greatly improved from the viewpoint of the visual acuity, although it is rare for single-vision lenses, in considerable contrast to the evaluation 10, evaluation 30, and evaluation 50. At the same time, considering the large influence by the relative accommodation power, since the relative accommodation power has large variations among individuals, individual measurement is necessary, and it is understood that the values assumed only from the age are not sufficient from the viewpoint of optimization. Considering these points as well, it is understood that the spectacle lens evaluation method and the spectacle lens design method according to the present embodiment meet the evaluation and design objectives for individual custom-made spectacle lenses.

3: Embodiment 3

Next, the convex surface plane is made in the same conventional manner as that mentioned earlier, and only the concave surface plane is optimized utilizing the visual acuity function according to the present embodiment. In the present example, the spectacle lens is a lens for use in near vision with +6.00 D for viewing the subject having convergence angle FU=2.5 (about 40 cm ahead of eyes). As a target for the relative accommodation power, the results obtained from the design for ages 10, 30, 50, and 75 are denoted as near vision design 10, near vision design 30, near vision design 50, and near vision design 75, and shown in FIGS. 27 through 30, respectively. Unlike the above-mentioned results on the first and second spectacle lenses for which in a way only the evaluation was performed, large improvements of the field of view have been made from the visual acuity point of view. In addition, it is noted that the visual acuity is different at the age 75 unlike the second lens mentioned above.

When the comparison is made only on the visual acuity for the same age, the following relation is deduced; Third spectacle lens>second spectacle lens>first spectacle lens. The difference appears to be few at the same age between the third and second spectacle lenses, and it might be mistaken that there is no inconvenience in using these lenses interchangeably. Even though they are the same from the viewpoint of the visual acuity, attention is needed to the point that they are not exactly the same lens, since the design condition differs from each other in that the convergence angle FU=2.5 for the present near vision third lens, while FU=0.0 for the second lens. Therefore, although the convex surface plane is made the same and the curve of the concave surface differs only by about 0.01 at the center, the change of the curve toward the periphery differs greatly, and it can therefore be understood that the second and third lenses are different ones.

4: Embodiment 4

Next, the evaluation was carried out concerning the fourth spectacle lens having progressive-power lens prescription values with the S dioptric power 0.00, C dioptric power 0.00, and addition power 2.0. The distant subject convergence angle is taken as FU=0 and the near subject convergence angle as FU=2.5, and other conditions such as the ages of 10, 30, 50, and 75, the refractive power and so forth are the same. The exemplary results for distant vision are denoted as evaluation progressive distant vision 10, evaluation progressive distant vision 30, evaluation progressive distant vision 50, and evaluation progressive distant vision 75, and shown in FIGS. 31 through 34, respectively. In addition, the results for near vision are denoted as evaluation progressive near vision 10, evaluation progressive near vision 30, evaluation progressive near vision 50, and evaluation progressive near vision 75, and shown in FIGS. 35 through 38, respectively. The comparison made in a brief period of time gives the impression that the results are similar with respect to the distant vision, while considerably different with respect to the near vision. When observed more closely, however, it is noted that with respect to the distant vision, the visual field is slightly wider from the visual acuity point of view as the age becomes younger, i.e., as the relative accommodation power becomes larger. The diagram of this sort appears similar to that of the average power distribution in normal progressive-power lens comparison. However, with respect to the near vision, the difference in the evaluation becomes quite evident to the degree that the evaluation results could not be obtained from the same lens. If one is not accustomed to the diagram, even the interpretation thereof is difficult.

Therefore, the above-mentioned difference will be explained briefly. When the distant vision convergence angle FU of the visual acuity function is 0, there is a trend of increasing the accommodation power out of relative accommodation power, so that while the positive relative accommodation power is present, the negative relative accommodation power, which by contrast decreases the accommodation power, is practically nonexistent. As a result, it can be said that for progressive distant vision, there is very few range for increasing the visual acuity by increasing the accommodation power. Conversely, in either of the relative accommodation power and the accommodation power, it comes to reason that no progressive-power lens is necessary if the above-mentioned increasing capability is abundant. Next, in the case of near vision, with respect to both the positive relative accommodation power and the negative relative accommodation power, since the region where the relative accommodation power can be momentarily increased or decreased becomes larger for the younger people, i.e., those having larger relative accommodation power, the portion in which the visual acuity gains by adjustment of the spectacle lens becomes large.

Therefore, at the age 75, although the region where the visual acuity gains is as small as a point shown in the drawing of the aforementioned FIG. 15, in the case of being worn by one at the age 10, by contrast, the negative relative accommodation power is large as shown in FIG. 12, and the area of comfort in the present embodiment (area capable of momentary adjustment) is large, i.e., the region where the visual acuity gains by easing the adjustment of the progressive-power lens becomes large, so that it follows that the visual acuity gains in almost all the progressive portions and thereby a wider visual field can be obtained. That is the reason for the considerable difference shown in the drawings with respect to near vision.

Note that the physiological astigma is considered to have a considerable influence on the visual acuity. Since the progressive-power lens is adapted to deal with the accommodation power beside the relative accommodation power unlike the single-vision lens, the design improvement is complicated. However, in the case where the evaluation results are different due to the relative accommodation power in the evaluation of the above-mentioned first spectacle lens, it can be improved considerably from the visual acuity point of view as illustrated in the embodiments 2 and 3. Similarly, utilizing the present patent, the improvements of the progressive-power lens are feasible in principle, regarding primarily its near vision portion.

The presence or absence of the effect of such physiological astigma will be described briefly herein below. Firstly, shown in FIGS. 39, 40, and 41 are visual acuity functions (each expressed in the decimal point visual acuity) in the format of the Peters diagram, respectively, i.e., the conventional visual acuity function without including relative accommodation power, the visual acuity function without physiological astigma and with relative accommodation power, and the visual acuity function according to the present invention with both physiological astigma and relative accommodation power.

Figure 39:
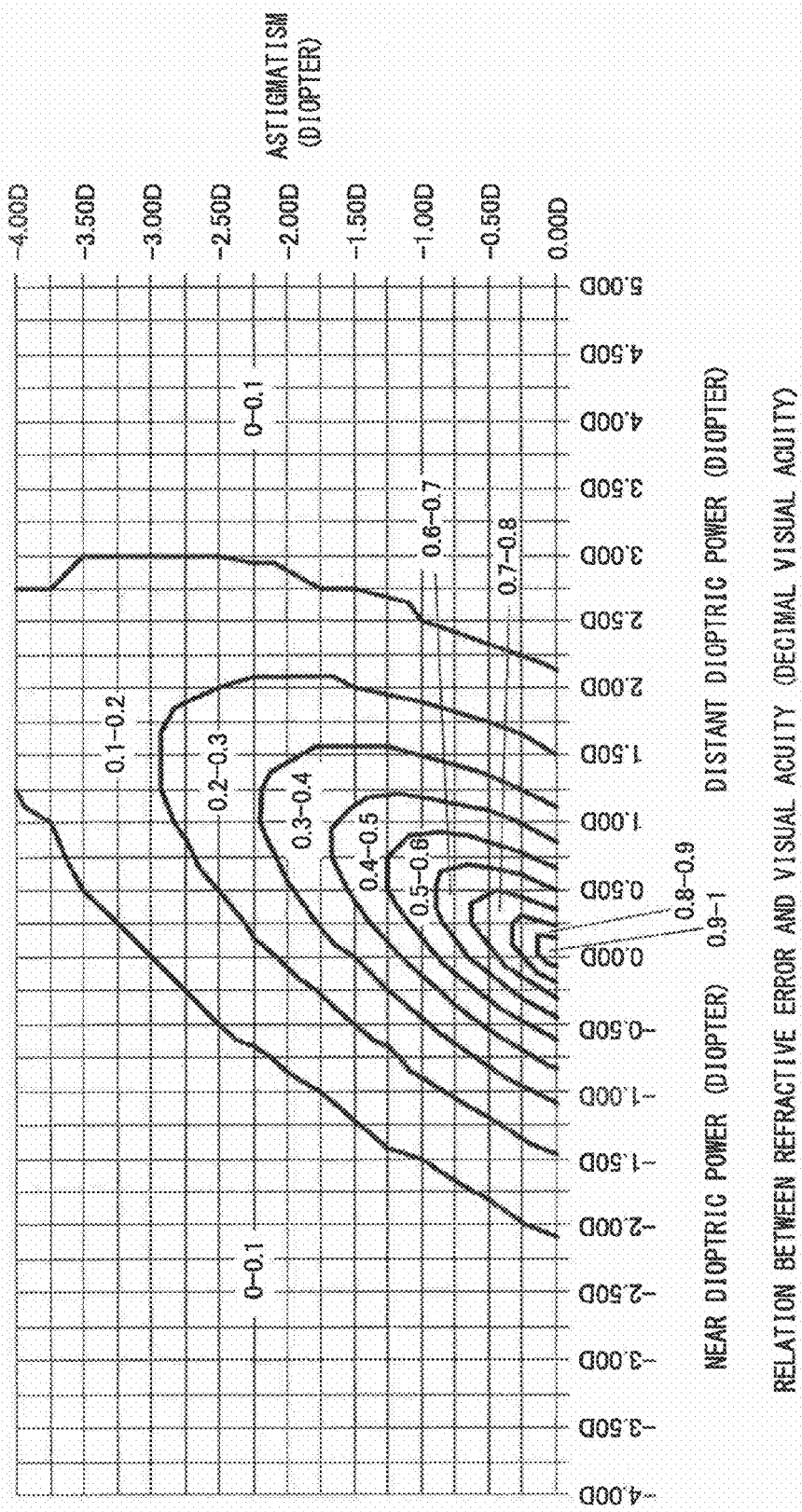
[FIG. 39] is a drawing illustrating a visual acuity function without relative accommodation power, represented in the format of the Peters diagram.
Figure 40:
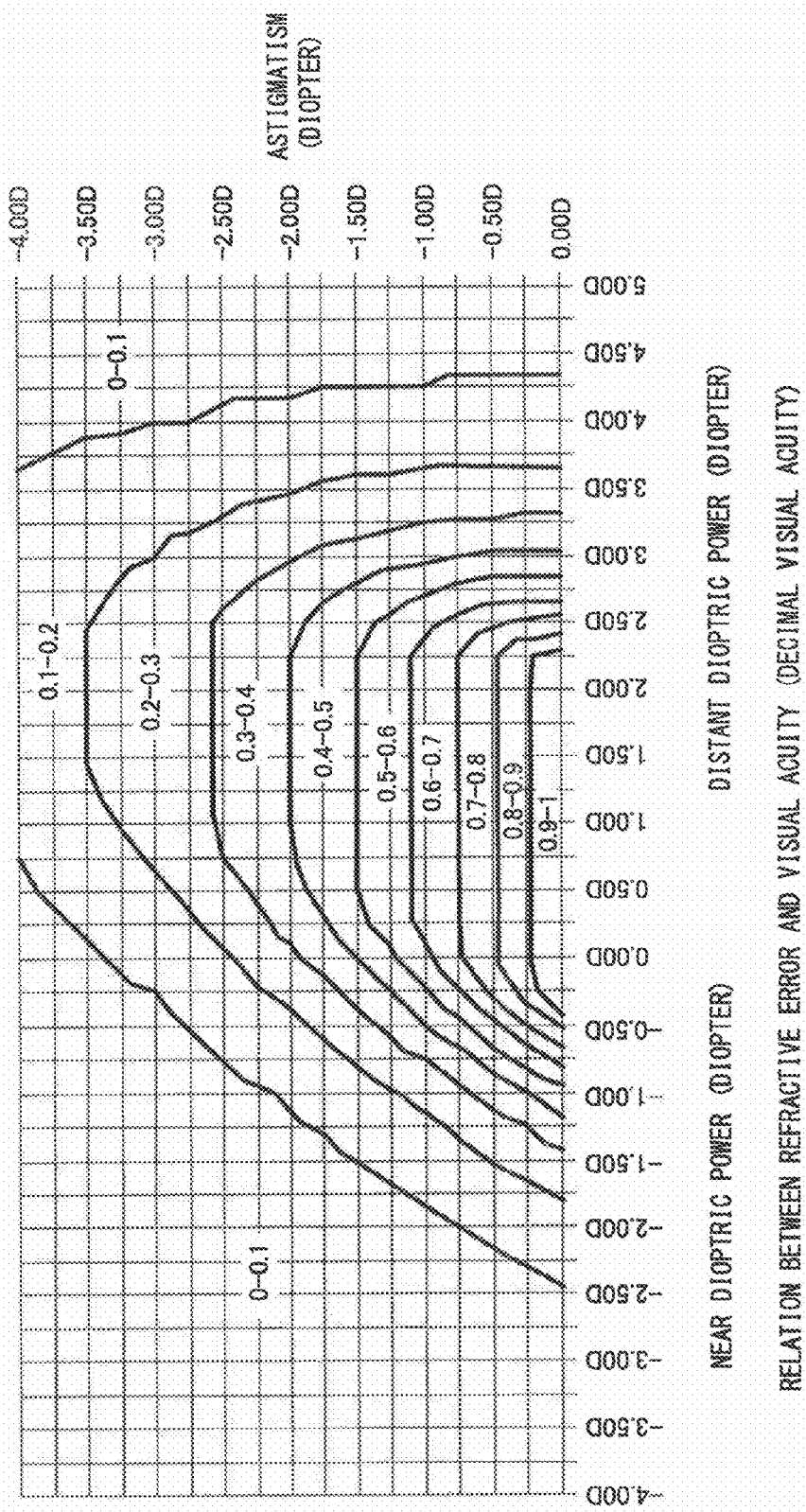
[FIG. 40] is a drawing illustrating a visual acuity function without physiological astigma and with relative accommodation power, represented in the format of the Peters diagram.

As indicated clearly in the drawings, concerning FIGS. 39 and 40 first, the region where the visual acuity gains due to the relative accommodation power is appreciably broadened in FIG. 40 along the direction of the horizontal axis. Next, regarding the comparison between FIGS. 40 and 41, it is clearly shown that the region where the visual acuity gains is widened more appreciably in FIG. 40 in the range from approximately +3.00 D on the horizontal axis to −0.75 D on the vertical axis. Although the elucidation of this phenomenon has not advanced yet, this portion has been defined as the physiological astigmatic phenomenon as described above, and this is the spirit of the present invention. It is well known that with the increase of the region where the visual acuity gains, the flexibility of designing is widened and the design of more appropriate lenses becomes feasible, i.e., the lenses achieving, by the optimization in optical calculation, broader design ranges where the visual acuity gains.

Figure 41:
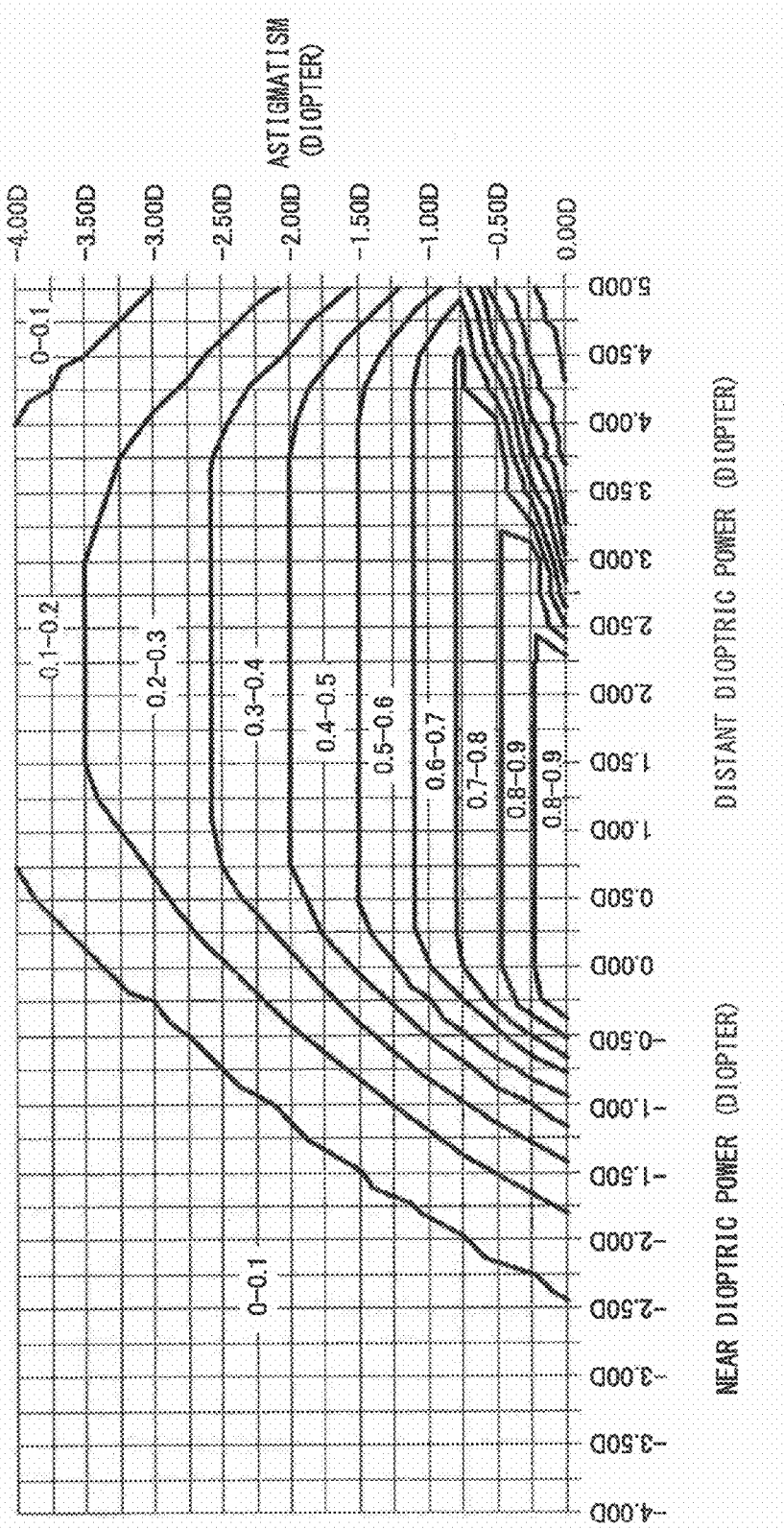
[FIG. 41] is a drawing illustrating a visual acuity function with both of physiological astigma and relative accommodation power, represented in the format of the Peters diagram.

Accordingly, when the lens with the refractive index 1.76, diameter 70, and dioptric power +6.00 D is designed utilizing the visual acuity functions of FIGS. 39, 40, and 41, the aspheric coefficients expressed in terms of a conventional format (International Publication WO 2002/088828 and International Publication WO 2004/018988) are obtained as shown in FIGS. 42, 43, and 44, respectively.

Figure 45:
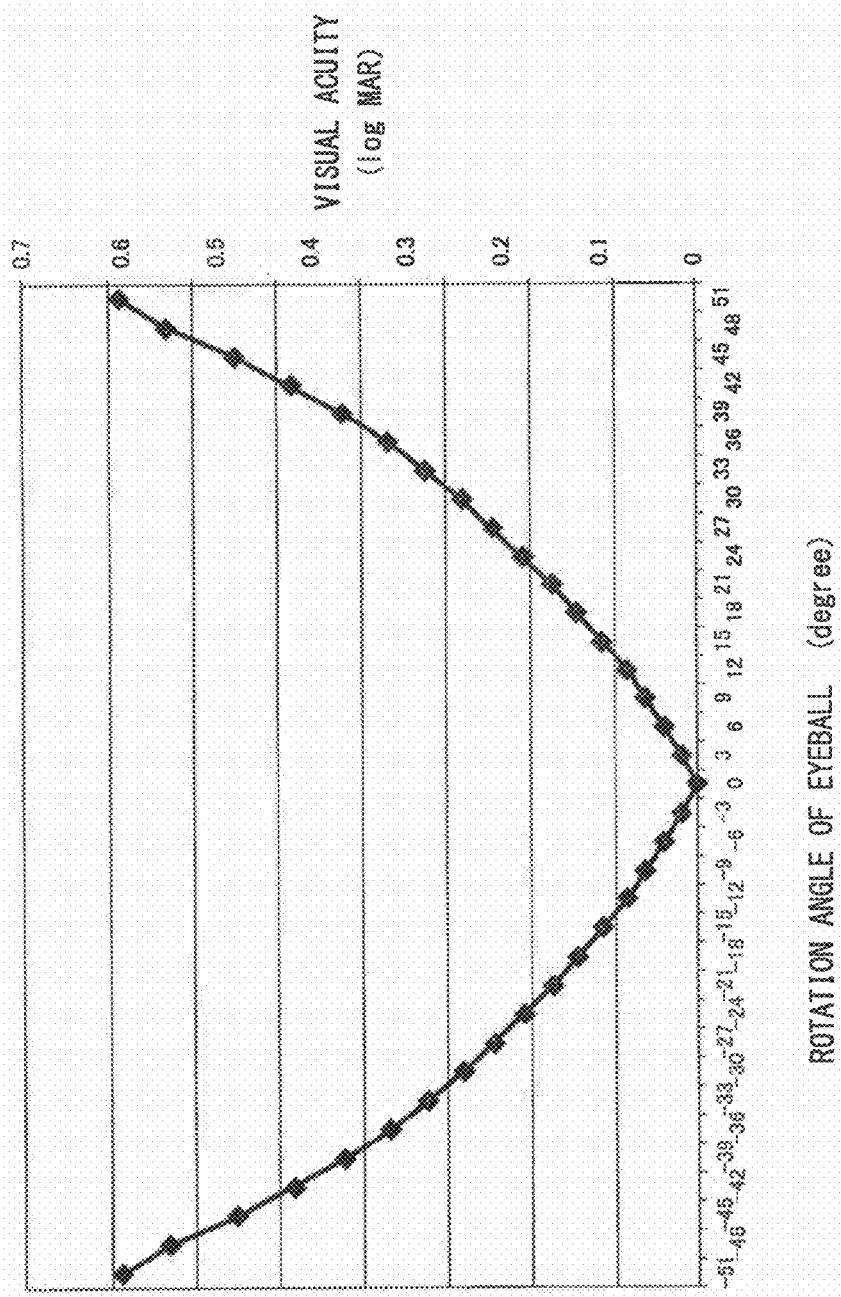
[FIG. 45] is a drawing illustrating the visual acuity distribution of a lens, obtained using the aspheric coefficients shown in FIG. 42.
Figure 46:
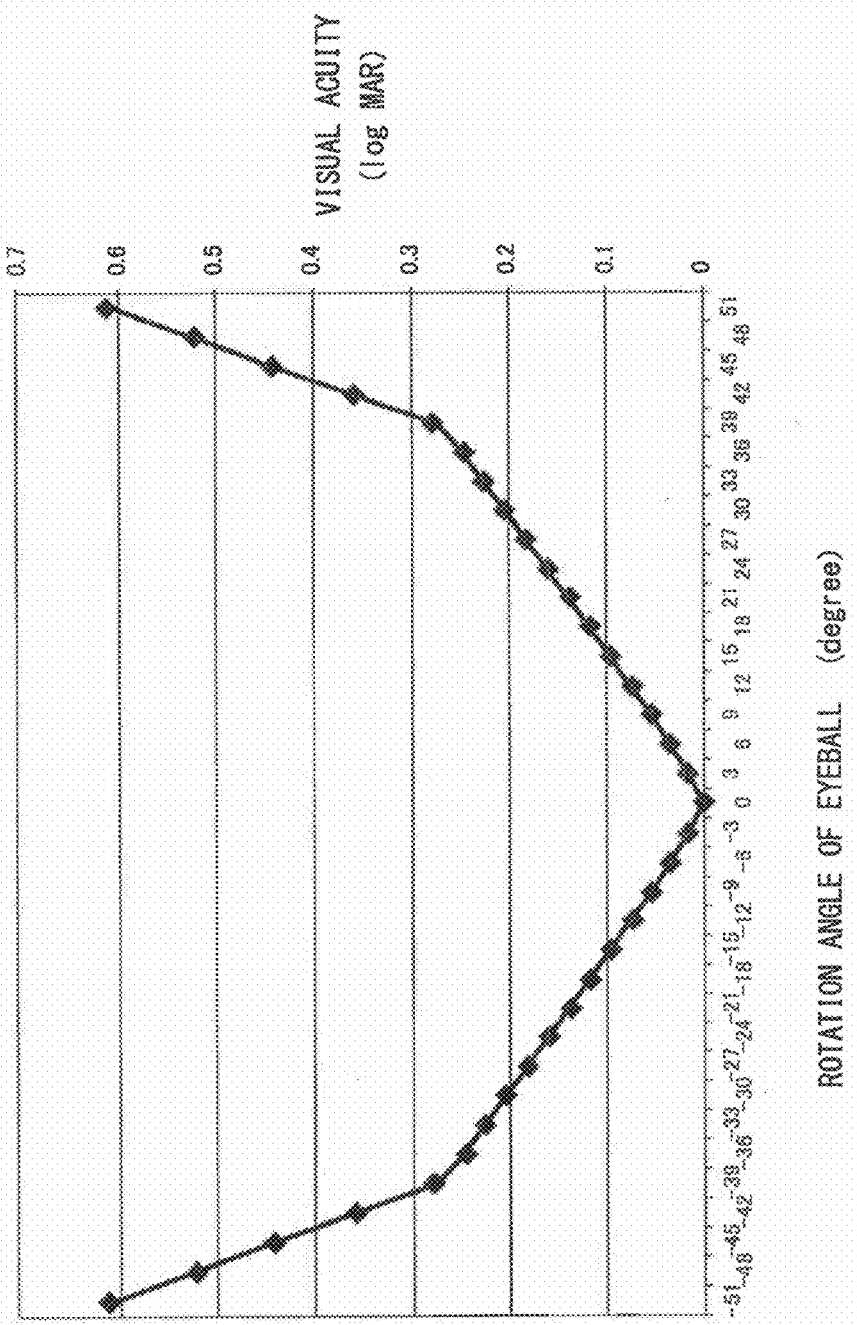
[FIG. 46] is a drawing illustrating the visual acuity distribution of a lens, obtained using the aspheric coefficients shown in FIG. 43.
Figure 47:
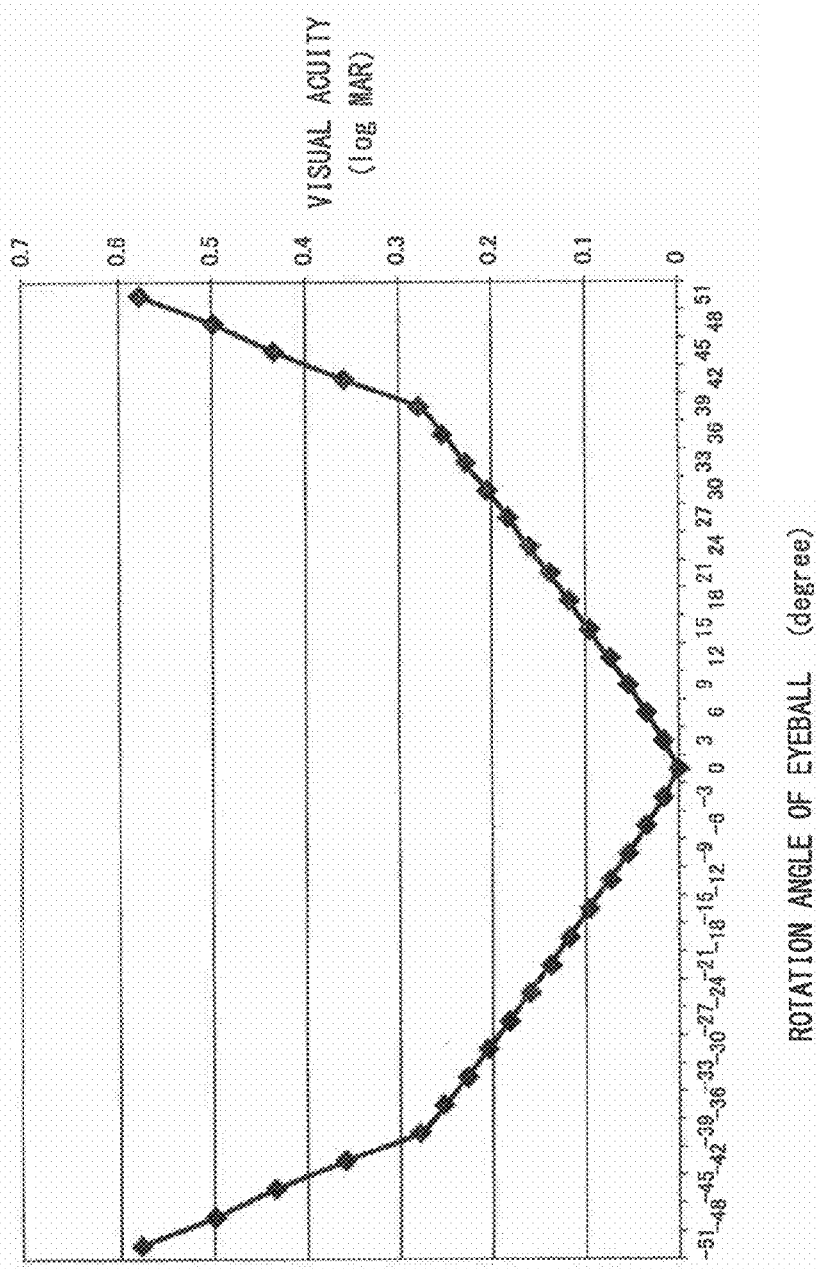
[FIG. 47] is a drawing illustrating the visual acuity distribution of a lens, obtained using the aspheric coefficients shown in FIG. 44.

In addition, the visual acuity distributions (in log MAR representation) of the lenses obtained using the above-mentioned aspheric coefficients are shown in FIGS. 45, 46, and 47, respectively. In FIGS. 45 through 47, the eyeball rotational angle in an arbitrary direction is indicated on the horizontal axis. As clearly seen from FIGS. 45 through 47, the range close to the normal vision (0.0 in log MAR representation) is widened in the order that the visual acuity gains, i.e., more in the example shown in FIG. 46 than the example of FIG. 45, and further more in the example of FIG. 47 than the example of FIG. 46.

From the examples shown above, it is clear that the effect enabling broadening of the region where the visual acuity gains can be achieved by using the factor representing relative accommodation power and further the factor representing physiological astigma, in the visual acuity function.

Incidentally, although the above-mentioned embodiments are primarily aimed at custom-made spectacle lenses, by treating the relative accommodation power and/or physiological astigma in the same manner as the average refractive power, astigmatic refractive power, and so forth, they also lend themselves to stocking spectacle lenses corresponding to various relative accommodation powers in advance and picking them up according to received orders.

In this case, it is desirable to use the average values of physiological astigma according to ages for class assortment of spectacle lenses for stocking. For example, four kinds of spectacle lenses are prepared according to ages. The classification is made into four classes, such as ages 10 to 20, 21 to 40, 41 to 59, and 60 to 75, and spectacle lenses adapted to the average physiological astigma are placed in stock for respective age groups. The prescription at the time of order receipt includes age or relative accommodation power, and the supplier selects the spectacle lenses conforming to the prescription from the stock to subsequently deliver them to the user. However, since there are variations among individuals in the relative accommodation power or physiological astigma, if possible, by specifying user's relative accommodation power or physiological astigma, appropriate lenses may be selected from another age group irrespective of the age of the user.

Thus, the present embodiments have the advantage that by placing lenses in stock, that have been evaluated and designed and subsequently manufactured utilizing the visual acuity function including physiological astigma corresponding to respective age levels as a factor, spectacle lenses can be delivered to the user within a shorter period of time.

INDUSTRIAL APPLICABILITY

This invention is widely applicable to evaluation of optical performances of spectacle lenses, and design and manufacture of spectacle lenses.

The invention claimed is:

1. A spectacle lens evaluation method for evaluating optical design values of a spectacle lens using a visual acuity function including a factor representing physiological astigma, wherein the physiological astigma is defined as predetermined cylindrical dioptric power that is different from prescription in a phenomenon that visual acuity is improved when the predetermined cylindrical dioptric power that is different from prescription is added.

2. The spectacle lens evaluation method described in claim 1, wherein the visual acuity function is expressed in units of log MAR that is defined by $\log_{10}(1/V)$ when V represents decimal visual acuity or fractional visual acuity.

3. The spectacle lens evaluation method described in claim 1, wherein said spectacle lens is a custom-made spectacle lens.

4. The spectacle lens evaluation method described in claim 1, wherein the visual acuity function includes relative accommodation power as a factor, and the factor indicating relative accommodation power further includes the factor representing physiological astigma.

5. The spectacle lens evaluation method described in claim 4, wherein the visual acuity function includes a factor capable of offsetting a power error by relative accommodation power.

6. The spectacle lens evaluation method described in claim 4, wherein the visual acuity function includes, as a factor, astigmatism having a coefficient increasing with age or a coefficient decreasing according to relative accommodation power corresponding to variations among individuals.

7. The spectacle lens evaluation method described in claim 4, wherein the evaluation method uses a following mathematical expression (1) as the visual acuity function, $$\text{Visual acuity function}(\log MAR) = \alpha \times \sqrt{(PE - AA(PRA, NRA))^2 + (bk \times AS/2)^2} \quad (1),$$

α is taken to be in a range of $0.25 \leq \alpha \leq 0.65$ and is defined as a coefficient for correlating visual acuity as one of visual functions to relative accommodation power as another visual function and PE and AS as optical aberrations;

PE is defined as a power error (dioptric power error);

AA (PRA, NRA) is defined as a function including relative accommodation power as a major term, and includes a correction term expressing a phenomenon of physiological astigma;

bk is in a range of $0.6 \leq bk \leq 1.1$, expresses a phenomenon that visual acuity increases in a direction of astigma with lowering age, and is a coefficient increasing with age or a correction coefficient decreasing according to relative accommodation power corresponding to variations among individuals; and AS is defined as astigmatism.

8. The spectacle lens evaluation method described in claim 4, wherein the visual acuity function including accommodation power or relative accommodation power as a factor is derived based on data of a relation between an eyeball refractive error and visual acuity obtained by measurement on plural test subjects, data of a relation between conversion and accommodation power obtained by measurement on plural test subjects, and data of age and accommodation power obtained by measurement on plural test subjects.

9. The spectacle lens evaluation method described in claim 8, wherein data of measured values of visual acuity by age measured by Peters are used as the data of a relation between an eyeball refractive error and visual acuity obtained by measurement on plural test subjects.

10. The spectacle lens evaluation method described in claim 8, wherein any of a diagram formed by Duane, a diagram formed by Hofstetter, and a diagram formed by Landolt is used as the data of accommodation power and age obtained by measurement on plural test subjects.

11. The spectacle lens evaluation method described in claim 8, wherein Donders diagrams devised by Donders are used as the data of a relation between convergence and accommodation power obtained by measurement on plural test subjects.

12. The spectacle lens evaluation method described in claim 11, wherein data included in a region indicating a convergence limit in short-time presentation set in the Donders diagrams are used as the data of a relation between convergence and accommodation power obtained by measurement on plural test subjects.

13. The spectacle lens evaluation method described in claim 12, wherein a time for the short-time presentation is in a range between 0.05 to 0.7 second.

14. The spectacle lens evaluation method described in claim 11, wherein, as the data of a relation between convergence and accommodation power obtained by measurement on plural test subjects, data is used that is included in a central region within two thirds of a region interposed by two Donders curves set in the Donders diagrams or in a region within two thirds of the region interposed by the two Donders curves with a Donders line that is set as one straight line in the Donders diagrams placed at a center thereof.

15. The spectacle lens evaluation method described in claim 11, wherein, as the data of a relation between convergence and accommodation power obtained by measurement on plural test subjects, data is used that is included in a central region within one third of a region interposed by two Donders curves set in the Donders diagrams or in a region within one third of the region interposed by the two Donders curves with a Donders line that is set as one straight line in the Donders diagrams placed at a center thereof.

16. A spectacle lens design method, comprising the step of carrying out optimization calculation using a visual acuity function as an evaluation function, the visual acuity function including physiological astigma as a factor, wherein the physiological astigma is predetermined cylindrical dioptric power that is different from prescription in a phenomenon that visual acuity is improved when the predetermined cylindrical dioptric power that is different from prescription is added.

17. A spectacle lens manufacture method, comprising the process of carrying out optimization calculation using a visual acuity function as an evaluation function, the visual acuity function including physiological astigma as a factor, and manufacturing a spectacle lens based on optical design values obtained by the optimization calculation, wherein the physiological astigma is defined as predetermined cylindrical dioptric power that is different from prescription in a phenomenon that visual acuity is improved when the predetermined cylindrical dioptric power that is different from prescription is added.

18. A spectacle lens manufacturing system, comprising:

an ordering party side computer provided on a spectacle lens ordering party side and having a function of performing processing necessary for placing an order of an spectacle lens; and a manufacture side computer having a function of receiving information from said ordering party side computer and performing processing necessary for receiving the order of said spectacle lens, wherein said manufacture side computer and said ordering party side computer are interconnected through a network, wherein said ordering party side computer transmits information necessary for designing said spectacle lens including a factor representing physiological astigma to said manufacture side computer, the physiological astigma being predetermined cylindrical dioptric power that is different from prescription in a phenomenon that visual acuity is improved when the predetermined cylindrical dioptric power that is different from prescription is added, wherein said manufacture side computer includes
- a data input section configured to input data including the factor representing physiological astigma transmitted from the ordering party side computer,
- a visual acuity function calculating section configured to calculate, based on the inputted data, optical performance values with respect to a plurality of evaluation points on said spectacle lens, as a visual acuity function including a factor representing the physiological astigma,
- an evaluation function optimization section configured to optimize the optical performance values by using the visual acuity function calculated by the visual acuity function calculating section as an evaluation function,
- a visual acuity function evaluation section configured to compare the visual acuity function with a predetermined threshold value to thereby evaluate the optical performance values,
- a design data correcting section configured to correct design data of said spectacle lens when a value of the visual acuity function does not reach predetermined visual acuity as a result of an evaluation performed by the visual acuity function evaluation section,
- an optical design value determination section configured to determine design data from a result of completing an evaluation by the visual acuity function evaluation section with respect to each of the plurality of evaluation points on said spectacle lens, and
- a design data output section configured to supply final design data determined by said optical design value determination section to a lens processing device.

19. The spectacle lens manufacturing system described in claim 18, wherein either of a measured value of relative accommodation power and age is used as the information necessary for designing said spectacle lens including the factor representing physiological astigma, transmitted from said ordering party side computer.

20. A spectacle lens formed based on optical design values obtained by carrying out optimization calculation using a visual acuity function as an evaluation function, the visual acuity function including a factor representing physiological astigma, wherein the physiological astigma is defined as predetermined cylindrical dioptric power that is different from prescription in a phenomenon that visual acuity is improved when the predetermined cylindrical dioptric power that is different from prescription is added.

* * * * *